(12) United States Patent
Wookey et al.

(10) Patent No.: US 7,260,623 B2
(45) Date of Patent: Aug. 21, 2007

(54) REMOTE SERVICES SYSTEM COMMUNICATION MODULE

(75) Inventors: Michael J. Wookey, Santa Clara, CA (US); Trevor Watson, Sheffield (GB); Jean Chouanard, Redwood City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 1118 days.

(21) Appl. No.: 10/185,557

(22) Filed: Jun. 27, 2002

(65) Prior Publication Data

US 2004/0001514 A1   Jan. 1, 2004

(51) Int. Cl.
G06F 15/173 (2006.01)
G06G 15/16 (2006.01)
H04J 3/16 (2006.01)

(52) U.S. Cl. .................. 709/223; 709/230; 370/465

(58) Field of Classification Search ................ 713/168; 380/200, 201, 25, 4, 23; 709/203, 105, 202
See application file for complete search history.

(56) References Cited

U.S. PATENT DOCUMENTS

| | | | |
|---|---|---|---|
| 5,245,616 A | 9/1993 | Olson | 714/748 |
| 5,432,798 A | 7/1995 | Blair | 714/748 |
| 5,528,677 A | 6/1996 | Butler et al. | 379/196 |
| 5,541,927 A | 7/1996 | Kristol et al. | 370/94.2 |
| 5,677,918 A | 10/1997 | Tran et al. | 371/32 |
| 5,729,537 A | 3/1998 | Billström | 370/329 |
| 5,796,723 A | 8/1998 | Bencheck et al. | |
| 5,805,804 A | 9/1998 | Laursen et al. | 395/200.02 |
| 5,809,145 A * | 9/1998 | Slik et al. | 705/52 |
| 5,884,316 A | 3/1999 | Bernstein et al. | 719/315 |
| 5,892,754 A | 4/1999 | Kompella et al. | 370/236 |
| 5,905,871 A | 5/1999 | Buskens et al. | 395/200.75 |
| 5,933,140 A | 8/1999 | Strahorn et al. | 345/338 |
| 5,974,417 A | 10/1999 | Bracho et al. | 707/10 |
| 5,987,514 A | 11/1999 | Rangarajan | 709/224 |
| 6,014,437 A | 1/2000 | Acker et al. | 379/219 |
| 6,023,507 A | 2/2000 | Wookey | 380/21 |
| 6,023,698 A | 2/2000 | Lavey, Jr. et al. | 707/10 |
| 6,044,402 A | 3/2000 | Jacobson et al. | |
| 6,055,364 A | 4/2000 | Speakman et al. | 395/200.59 |
| 6,085,244 A | 7/2000 | Wookey | 709/224 |
| 6,094,688 A | 7/2000 | Mellen-Garnett et al. | 709/328 |
| 6,097,720 A | 8/2000 | Araujo et al. | 370/355 |
| 6,098,093 A | 8/2000 | Bayeh et al. | 709/203 |
| 6,131,112 A | 10/2000 | Lewis et al. | 709/207 |

(Continued)

OTHER PUBLICATIONS

G. Cugola, E. Di Nitto and A Fuggetta, "Exploiting an Event-Based Infrastructure to Develop Complex Distributed Systems" *Software Engineering, 1998. Proceedings of the 1998 International Conference on Kyoto, Japan* Apr. 19-25, 1998.

(Continued)

*Primary Examiner*—Hanh Nguyen
(74) *Attorney, Agent, or Firm*—Michael C. Martensen; Hogan & Hartson LLP

(57) ABSTRACT

The invention relates to a remote services communication module which includes: a communication protocol and a communication encryption module. The communication protocol module provides support for an application level protocol used in a remote services system. The communication encryption module supports plug-in encryption modules.

20 Claims, 34 Drawing Sheets

U.S. PATENT DOCUMENTS

| | | | |
|---|---|---|---|
| 6,141,759 A | 10/2000 | Braddy | 713/201 |
| 6,145,096 A | 11/2000 | Bereiter et al. | 714/25 |
| 6,148,337 A | 11/2000 | Estberg et al. | 709/224 |
| 6,151,683 A | 11/2000 | Wookey | 714/2 |
| 6,154,128 A | 11/2000 | Wookey et al. | 340/506 |
| 6,167,431 A | 12/2000 | Gillies et al. | 709/203 |
| 6,182,249 B1 | 1/2001 | Wookey et al. | 714/47 |
| 6,185,606 B1 | 2/2001 | Bereiter | 709/206 |
| 6,205,119 B1 | 3/2001 | Kaczynski | |
| 6,216,173 B1 | 4/2001 | Jones et al. | 709/302 |
| 6,219,700 B1 | 4/2001 | Chang et al. | 709/222 |
| 6,230,319 B1 | 5/2001 | Britt et al. | |
| 6,237,040 B1 | 5/2001 | Tada | 709/246 |
| 6,237,114 B1 | 5/2001 | Wookey et al. | 714/47 |
| 6,243,451 B1 | 6/2001 | Shah et al. | 379/201 |
| 6,275,953 B1 | 8/2001 | Vahalia et al. | 714/11 |
| 6,332,163 B1 | 12/2001 | Bowman-Amuah | 709/231 |
| 6,335,927 B1 | 1/2002 | Elliott et al. | 370/352 |
| 6,338,088 B1 | 1/2002 | Waters et al. | 709/226 |
| 6,347,374 B1 | 2/2002 | Drake et al. | 713/200 |
| 6,349,340 B1 | 2/2002 | Dyer et al. | 709/231 |
| 6,353,854 B1 | 3/2002 | Cromer et al. | 709/224 |
| 6,357,017 B1 | 3/2002 | Bereiter et al. | 714/27 |
| 6,442,571 B1 | 8/2002 | Haff et al. | 707/201 |
| 6,442,690 B1 | 8/2002 | Howard et al. | |
| 6,449,719 B1 * | 9/2002 | Baker | 713/168 |
| 6,466,976 B1 | 10/2002 | Alles et al. | 709/224 |
| 6,466,981 B1 | 10/2002 | Levy | 709/227 |
| 6,473,794 B1 | 10/2002 | Guheen et al. | 709/223 |
| 6,523,035 B1 | 2/2003 | Fleming et al. | 707/10 |
| 6,542,992 B1 * | 4/2003 | Peirce et al. | 713/153 |
| 6,552,999 B2 | 4/2003 | Iwase et al. | 370/230 |
| 6,553,129 B1 | 4/2003 | Rhoads | 382/100 |
| 6,615,258 B1 | 9/2003 | Barry et al. | 709/223 |
| 6,621,801 B1 | 9/2003 | Wright et al. | 370/319 |
| 6,633,898 B1 | 10/2003 | Seguchi et al. | 709/201 |
| 6,640,244 B1 | 10/2003 | Bowman-Amuah | 709/207 |
| 6,665,754 B2 | 12/2003 | Mann | 710/52 |
| 6,687,735 B1 | 2/2004 | Logston et al. | 709/203 |
| 6,691,165 B1 | 2/2004 | Bruck et al. | 709/227 |
| 6,691,302 B1 | 2/2004 | Skrzynski et al. | 717/118 |
| 6,711,611 B2 | 3/2004 | Hanhan | 709/218 |
| 6,757,710 B2 | 6/2004 | Reed | |
| 6,760,861 B2 | 7/2004 | Fukuhara et al. | 709/203 |
| 6,765,864 B1 | 7/2004 | Natarajan et al. | 370/224 |
| 6,779,030 B1 | 8/2004 | Dugan et al. | 709/223 |
| 6,781,999 B2 | 8/2004 | Eyuboglu et al. | 370/399 |
| 6,785,728 B1 | 8/2004 | Schneider et al. | 709/229 |
| 6,792,461 B1 | 9/2004 | Hericourt | 709/225 |
| 6,816,882 B1 | 11/2004 | Conner et al. | 709/203 |
| 6,822,961 B1 | 11/2004 | Constantinof et al. | 370/395.2 |
| 6,850,893 B2 | 2/2005 | Lipkin et al. | 705/8 |
| 6,856,676 B1 | 2/2005 | Pirot et al. | 379/201.01 |
| 6,868,441 B2 | 3/2005 | Greene et al. | 709/220 |
| 6,895,586 B1 | 5/2005 | Brasher et al. | 719/313 |
| 6,957,260 B1 | 10/2005 | Mighdoll et al. | 709/225 |
| 7,020,645 B2 | 3/2006 | Bisbee et al. | |
| 7,024,474 B2 | 4/2006 | Clubb et al. | |
| 2001/0004595 A1 | 6/2001 | Dent | 455/435 |
| 2001/0034782 A1 | 10/2001 | Kinkade | 709/219 |
| 2001/0047386 A1 | 11/2001 | Domenikos et al. | 709/203 |
| 2001/0047420 A1 | 11/2001 | Talanis et al. | |
| 2002/0038340 A1 | 3/2002 | Whipple et al. | 709/203 |
| 2002/0042849 A1 | 4/2002 | Ho et al. | 709/329 |
| 2002/0046294 A1 | 4/2002 | Brodsky et al. | 709/246 |
| 2002/0059425 A1 | 5/2002 | Belfiore et al. | 709/226 |
| 2002/0065929 A1 | 5/2002 | Kamentsky et al. | 709/231 |
| 2002/0073236 A1 | 6/2002 | Helgeson et al. | 709/246 |
| 2002/0087657 A1 | 7/2002 | Hunt | 709/217 |
| 2002/0114305 A1 | 8/2002 | Oyama et al. | 370/338 |
| 2002/0136201 A1 | 9/2002 | Buchsbaum et al. | 370/352 |
| 2002/0156871 A1 | 10/2002 | Munarriz et al. | 709/219 |
| 2002/0156975 A1 | 10/2002 | Staub et al. | 711/114 |
| 2002/0174340 A1 | 11/2002 | Dick et al. | 713/178 |
| 2002/0178262 A1 | 11/2002 | Bonnell et al. | 709/225 |
| 2002/0199182 A1 | 12/2002 | Whitehead | 725/1 |
| 2003/0145117 A1 | 7/2003 | Bhat | 709/249 |
| 2003/0237016 A1 | 12/2003 | Johnson et al. | 714/4 |
| 2004/0002978 A1 | 1/2004 | Wookey et al. | 707/10 |
| 2004/0221292 A1 | 11/2004 | Chiang et al. | 719/310 |

OTHER PUBLICATIONS

R. Droms "RFC1541 Dynamic Host Configuration Protocol" *Request for Comments* www.cis.ohio-state.edu/htbin/rfc/rfc1541.html Oct. 1993 (retrieved Dec. 21, 1999).

R. Kowalchuk, R. Hilderman and H. Hamilton "vnews: A Multicast, Multimedia News Service with Virtual Messages" *Computers and Communications, 1996, Conference Proceedings of the 1996 IEEE 15th Annual International*, Mar. 1996.

Fricke, Stefan et al., "Agent Based Telematic Services and Telecom Applications" Communications of the AM, Apr. 2001, vol. 44, No. 4, pp. 43-48.

Glenn, Ariel "Access Management of Web-Based Services" D-Lib Magazine, Sep. 1998, http://www.dlib.org/dlib/september98/millman/09millman.html, printed May 10, 2005, pp. 1-14.

Hoffman, Paul "Designs on Internet Mail," Putting it Together, Feb./Mar. 1998, pp. 19-23.

"Java Management API Architecture" Sun Microsystems, Inc., Part No. 805-0084-01, Revision A, Sep. 1996, XP2264630.

"Sun Microsystems JavaBeans" Jul. 24, 1997, Version 1, XP2956519.

W. R. Stevens, "TCP/IP Illustrated," Addison-Wesley, vol. 1 pp. 463-464.

D. Comer et al, "Internetworking with TCP/IP Client-Server Programming and Applications," vol. 3, p. 282.

http://dictionary.reference.com/search?q=segmented, printed Apr. 4, 2006.

* cited by examiner

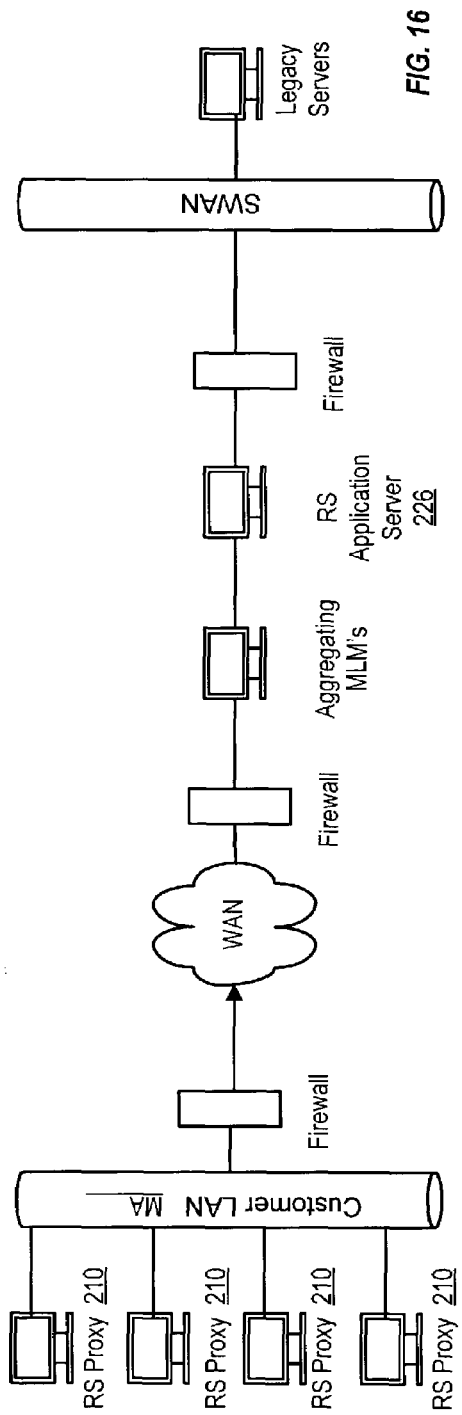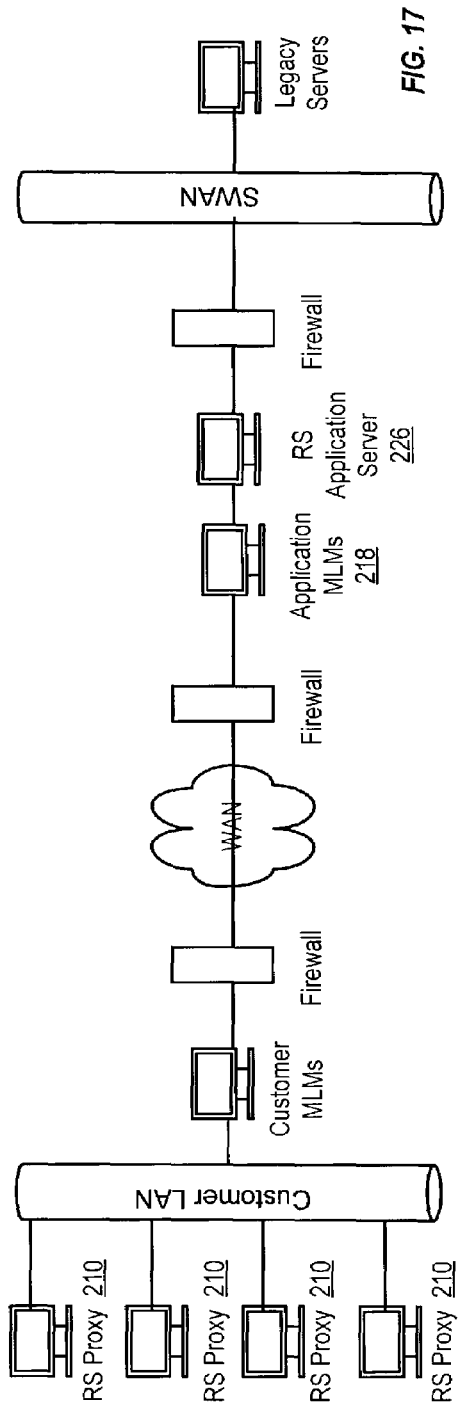

REMOTE SERVICES SYSTEM COMMUNICATION MODULE

CROSS REFERENCE TO RELATED APPLICATIONS

This application relates to U.S. patent application Ser. No. 10/067,074, filed on Feb. 4, 2002, entitled "Remote Services Message System to Support Redundancy of Data Flow" and naming Michael J. Wookey, Trevor Watson and Jean Chouanard as inventors, the application being incorporated herein by reference in its entirety.

This application relates to U.S. patent application Ser. No. 10/186,073, filed on Jun. 27, 2002, entitled "Remote Services System Relocatable Mid Level Manager" and naming Michael J. Wookey, Trevor Watson and Jean Chouanard as inventors, the application being incorporated herein by this reference in its entirety.

This application relates to U.S. patent application Ser. No. 10/185,558, filed on Jun. 27, 2002, entitled "Bandwidth Management for Remote Services System" and naming Michael J. Wookey, Trevor Watson and Jean Chouanard as inventors, the application being incorporated herein by this reference in its entirety.

This application relates to U.S. patent application Ser. No. 10/186,106, filed on Jun. 27, 2002, entitled "Remote Services System Service Module Interface" and naming Michael J. Wookey, Trevor Watson and Jean Chouanard as inventors, the application being incorporated herein by this reference in its entirety.

FIELD OF THE INVENTION

The present invention relates to remote service systems and more particularly to communication modules used in remote service systems

BACKGROUND OF THE INVENTION

It is known to provide a variety of services that are delivered remotely to a customer. These services range from point solutions delivering specific service to more complex remote service instantiations supporting multiple services. The technology behind these services has a number of things in common: they are generally a good idea; they provide a valuable service to a set of customers; and, they are generally isolated from one another.

The number of remote services available show the need and demand for such services. However, the fragmentation of the services reduces the overall benefit to the service provider as well as to the customer. The customer is presented with an often confusing issue of which services to use, why the services are different and why the service provider cannot provide a single integrated service.

SUMMARY OF THE INVENTION

In accordance with the present invention, a remote services communication module includes a communication protocol and a communication encryption module. The communication protocol module provides support for an application level protocol used in a remote services system. The communication encryption module supports plug-in encryption modules.

In another embodiment, the invention relates to a remote services system which includes a remote services proxy, an applications server, and a communication module. The remote services proxy provides communications flow management. The applications server is coupled to the remote services proxy module and provides persistent storage of remote services infrastructure information. The communication module includes: a communication protocol module and a communication encryption module. The communication protocol module provides support for an application level protocol used in a remote services system and the communication encryption module supports plug-in encryption modules.

In another embodiment, the invention relates to a remote services system which includes a remote services proxy, an intermediate mid level manager, an applications mid level manager, an application server coupled to the remote services proxy and a communication module. The remote services proxy module provides communications flow management. The intermediate mid level manager provides data queue management, transaction integrity and redundancy. The applications mid level manager provides data normalization, and integration with a mail server data flow. The application server provides persistent storage of remote services infrastructure information. The communication module includes: a communication protocol module and a communication encryption module. The communication protocol module provides support for an application level protocol used in a remote services system. The communication encryption module supports plug-in encryption modules.

BRIEF DESCRIPTION OF THE DRAWINGS

The present invention may be understood, and its numerous objects, features, and advantages made apparent to those skilled in the art by referencing the accompanying drawings.

FIGS. 16, 17 and 18 show different deployment architectures for the mid level managers.

DETAILED DESCRIPTION

Figure 1:
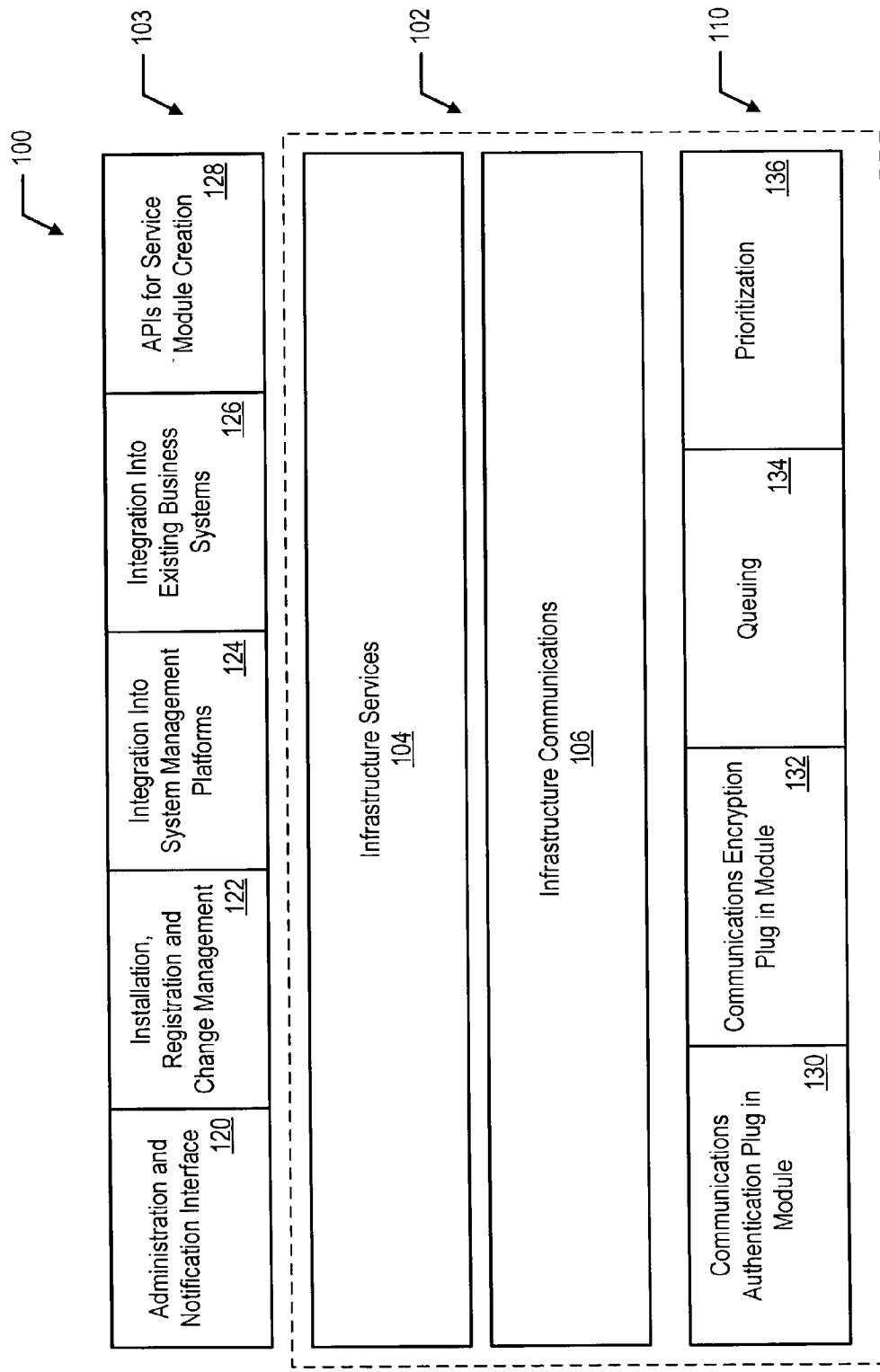
FIG. 1 shows a block diagram of a remote service delivery architecture.

FIG. 1 shows a block diagram of an architecture for a remote service delivery system 100 that meets the needs of both the service provider and the customer. The architecture of the present invention is modularized to provide broad support for both the customer and the service provider in terms of evolution of service functionality to the architecture and within the architecture.

The architecture is broadly comprised of the remote service infrastructure 102, a group of service modules 103 and a plurality of communications modules 110. The remote services infrastructure 102 provides reliable remote service delivery and data management. The remote services infrastructure 102 supports the needs of a service creator by focusing the service creator on the needs and the design of the service by eliminating the need for the service creator to be concerned about how data is transferred and managed to and from a customer site.

The remote services infrastructure 102 provides an interface to support the development of services that use a set of common service parameters to develop customized services for a specific service provider or customer. The infrastructure 102 is separately segmented from, but actively interacts with, the service modules 103.

Within the group of software modules 103 are individual software modules that analyze data collected by the remote services infrastructure 102 and provides service value based on that data to a customer. Thus, the remote services infrastructure 102 and the service modules 103 can be differentiated as follows: the remote services infrastructure 102 is concerned with how data is collected, while the service module 103 is concerned with what is done with the data.

The remote services infrastructure 102 includes an infrastructure services portion 104 and an infrastructure communications portion 106. The infrastructure services portion 104 interacts with the plurality of service modules 103, as described in greater detail below. The remote services infrastructure 102 provides a set of application program interfaces (API's) that are used by a service module developer to leverage common services of the infrastructure such as database access, software delivery and notification services. The infrastructure communications portion 106 includes a plurality of communications modules 110.

The infrastructure services portion 104 interacts with a plurality of service modules 103. Examples of service modules that the remote services architecture may include are an administration and notification interface module 120, an installation, registration and change management module 122, an integration into system management platforms module 124, an integration into existing business systems module 126 and an API's for service module creation module 128. The administration and notification interface 120 allows a customer and service provider to control the remote services infrastructure. The installation, registration and change management module 122 supports the infrastructure and service modules deployed on top of the infrastructure. The module 122 may include automatic registration of new software components, delivery of software and detection of changes within an environment. The integration into systems management platforms module 124 provides an integration point to systems management platforms in general. The integration into existing business systems module 126 allows the remote services infrastructure 102 to integrate into existing business systems to leverage data, processing capacities, knowledge and operational process. The module 126 allows the infrastructure 102 to integrate into the required business systems and provides interfaces to the service module creator to use those systems. The API's for service module creation module 128 allows a service module creator to abstract the complexity of remote data management. The module 128 provides an API of abstracted services to the service module creator.

The infrastructure communications portion 106 provides an abstraction of different protocol and physical network options. Examples of protocol options include an HTTP protocol and an email protocol. Examples of physical network options include Internet based communications, private network based communications and fax communications. The different protocol and physical network options are provided to meet the needs of as many customers as possible.

The infrastructure communications portion 106 supports a number of plug-in communications modules 110. Examples of the communications modules 110 include a communications authentication module 130, an encryption module 132, a queuing module 134, and a prioritization module 136. The communications authentication module 130 is related to the communications protocol that is used and provides the customer with authentication of a communication session. The encryption module 132 is related to the protocol being used and provides encryption of the data stream. The queuing module 134 provides the ability of the infrastructure to queue data being sent through the infrastructure to provide data communications integrity. The prioritization module 136 provides the ability for data within the system to be prioritized for delivery.

Figure 2:
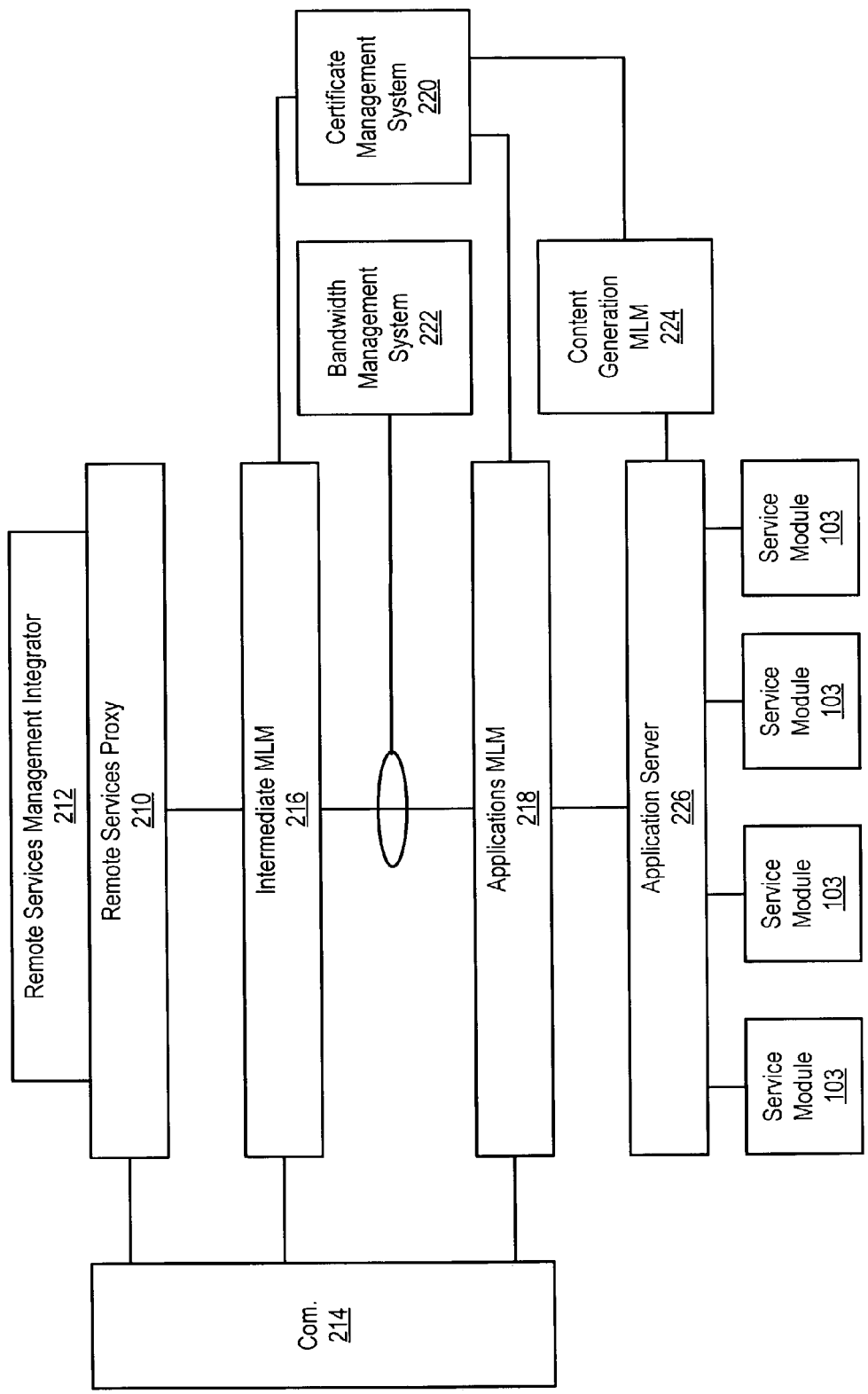
FIG. 2 shows a schematic block diagram of the components relating to the remote services infrastructure.

Referring to FIG. 2, the remote services infrastructure architecture 205 includes a plurality of components. More specifically, the remote services infrastructure architecture 205 includes a remote services proxy 210, a remote services system management integrator 212, a remote services communications module 214, an intermediate mid level manager (MLM) 216 (which may be a customer MLM or an aggregation MLM), an applications MLM 218, a certificate management system 220, a bandwidth management system 222, a remote services content generation MLM 224, a remote services application server 226. The remote services infrastructure architecture 205 interacts with a plurality of external service modules 103.

The remote services proxy 210 provides an API to the systems management systems. This API supports data normalization to the remote services data format. The remote services proxy 210 also provides receptors for the communications modules and in turn provides communications flow management using queuing. The remote services proxy 210 also manages allocation of remote services identifiers (ID's), which are allocated to each component of the remote services infrastructure, and the support instances that are registered with the remote services system 100.

The remote services system management integrators 212 are written to a remote services integrator API supported by the remote services proxy 210. One remote services proxy 210 can support many integrators (also referred to as integration modules). The integration modules provide the glue between the remote services system 100 and the systems management platform. There is at least one integration module for each support systems management platform.

The remote services communications modules 214 provide protocol, encryption and communications authentication. These modules plug-in through a semi-private interface into the remote services proxy 210, the intermediate MLM 216 and the remote services application MLM 218.

The intermediate MLM 216 may be either a customer MLM or an aggregation MLM. The remote services customer MLM is an optional deployable component.

The remote services customer MLM provides a higher level of assurance to the customer-deployed environment, providing transaction integrity, redundancy and data queue management. The remote services customer MLM also provides an extensible environment through an API where service module components can be deployed. When no customer MLM is deployed, the aggregation MLM, hosted by the remote services provider and handling multiple customers, provides the data queue management, transaction integrity and redundancy. While the customer MLM is very similar to an aggregation MLM, a customer MLM may be required by a service module that needs to be localized. An aggregation MLM, being shared by multiple customers, may not be customizable.

The applications MLM 218 provides a series of functions that can exist on different MLM instantiations as applicable. The applications module provides data normalization, integration with the mail server data flow and integration with the certificate management system 220. This module acts as the gateway to the remote services application server 226 and controls data access.

The certificate management system 220 provides management of certificates to verify connection authentication for the remote services system 100. The certificate management system 220 may be horizontally scaled as necessary to meet the load or performance needs of the remote services system 100.

The bandwidth management system 222 provides control over bandwidth usage and data prioritization. The bandwidth management system 222 may be horizontally scaled as necessary to meet the load or performance needs of the remote services system 100.

The remote services content generation MLM 224 provides HTML content based on the data held within the remote services application server 226. This module provides a high level of HTML caching to reduce the hit rate on the application server for data. Accordingly, visualization of the data is done through the content generation MLM 224. Separating the visualization processing in the content generation MLM 224 from the data processing in the applications server 226 provides two separate scale points.

The remote services application server 226 provides the persistent storage of remote services infrastructure information. The application server 226 also provides the data processing logic on the remote services infrastructure information as well as support for the service module API to create service module processing within the application server 226. The application server 226 provides access to directory services which support among other things, IP name lookup for private network IP management. The application server 226 also provides access to the service modules 103.

In operation, the remote services proxy 210 uses the communication module 214 to connect to the intermediate MLM 216, whether the intermediate MLM is a customer MLM or an aggregation MLM. The applications MLM 218 and the intermediate MLM 216 use the certificate management system 220 to validate connections from customers. Dataflow bandwidth between the intermediate MLM 216 and the applications MLM 218 is controlled by the bandwidth management system 222. Data that has been formatted by the applications MLM 218 is sent on to the application server 226 for processing and persistent storage.

The content generation MLM 224 provides visualization and content creation for users of the remote services system 100. Remote services infrastructure administration portal logic is deployed to the content generation MLM 224 to provide users of the remote services system 100 with the ability to manage the remote services system 100.

All of the remote services components are identified by a unique remote services identifier (ID). A unique customer remote services ID is generated at customer registration. For remote services infrastructure components, remote services IDs are generated, based on the customer remote services ID, at a component registration phase. For remote services entities reporting to a remote services proxy 210, such as a support instance or an integration module, the remote services ID is allocated by the proxy 210 itself, based on the remote services ID of the proxy 210.

Within the remote services architecture, there are instances where detection, collection and management logic (also referred to as systems management logic) may have already been created by another service module. In this instance, the service module creator reuses this functionality. The reuse then creates a more complex relationship within the system to be managed. The segmentation and re-use of data is available within the architecture. Instrumentation is made up of a large number of small data types. These data types are shared by the different service modules 103 using a publish and subscribe model.

Figure 3:
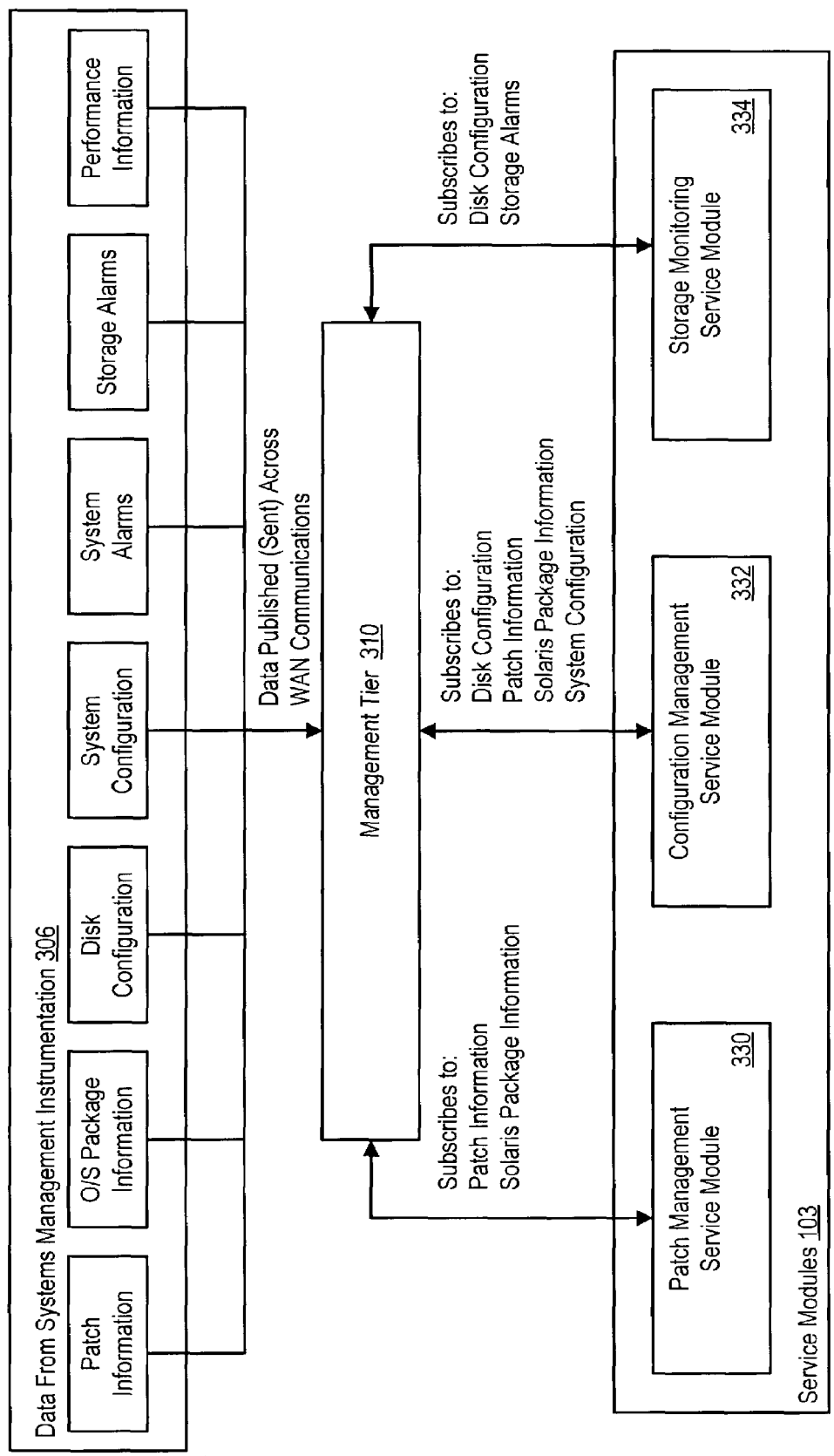
FIG. 3 shows a publish and subscribe example using the remote services delivery architecture.

In a publish and subscribe model, the remote services proxies (and therefore the systems management systems) publish their data to a service provider. The service modules 103 register interest in specific types of data that are needed to fulfill the respective service module processing. FIG. 3 provides an example of the publish and subscribe model using example data and services.

More specifically, data from a systems management instrumentation proxy 306 may include patch information, operating system package information, disk configuration information, system configuration information, system alarms information, storage alarms information and performance information. This information is published via, e.g., a wide area network (WAN) to a management tier 310. Various service modules 103 then subscribe to the information in which they are respectively interested. For example, a patch management service module 330 might be interested in, and thus subscribe to, patch information and operating system package information. A configuration management service module 332 might be interested in, and thus subscribe to, the disk configuration information, the patch information, the operating system package information and the system configuration information. A storage monitoring service module 334 might be interested in, and thus subscribe to, disk configuration information and storage alarms information.

Thus, with a publish and subscribe model, many different types of data are published by a customer using the remote services customer deployed infrastructure. Service modules then subscribe to these data types. More than one service module 103 can subscribe to the same data. By constructing the instrumentation data in a well segmented manner, the data can be shared across many services.

Sharing data across many services reduces duplication of instrumentation. By making data available to newly developed service modules, those service modules need to only identify instrumentation that does not exist and reuse and potentially improve existing instrumentation. Sharing data across multiple services also reduces load on customer systems. Removing the duplication reduces the processing load on the customer's systems. Sharing data across multiple services also reduces development time of service modules 103. As more instrumentation is created and refined, service modules 103 reuse the data collected and may focus on developing intelligent knowledge based analysis systems to make use of the data.

Accordingly, the separation and segmentation of the infrastructure from the service modules enables services to be created in a standardized manner ultimately providing greater value to the customer.

Figure 4:
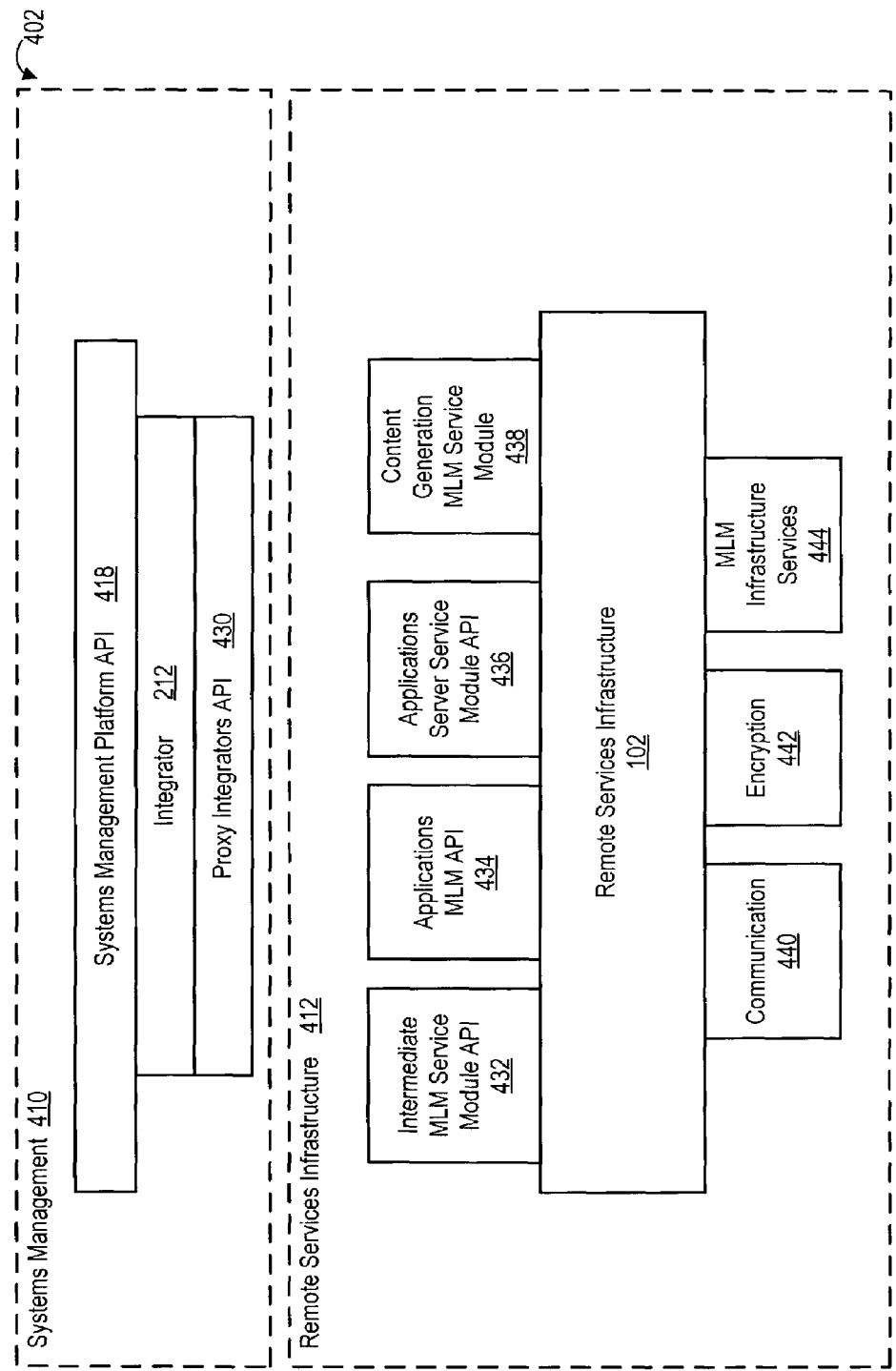
FIG. 4 shows a block diagram of the application program interfaces (API's) of the remote service delivery architecture.

Referring to FIG. 4, the remote services architecture includes a remote services API 402 which may be conceptualized in two areas, systems management API's 410 and remote services infrastructure API's 412.

The systems management API's 410 includes systems management API's 418, integrator 212 and proxy integrators API 430. The proxy integrator API 430 interfaces with integrator module service logic. The integrator module service logic is a general term for the configuration rules that are imparted on the systems management system to collect or detect the information for the integrator 212. While the proxy integrator API's 430 are not technically a part of the remote services system 100, the proxy integrator API 430 is used within the integration modules which form the boundary between the remote services system 100 and the system management. The integration module creator provides the instrumentation to fulfill the collection and detection needs of the service via the systems management API 418.

The proxy integrators API 430 provides an interface between the systems management system and the remote services infrastructure 102. This interface provides a normalization point where data is normalized from the system management representation to a remote services standard. By normalizing the data, the remote services system 100 may manage similar data from different systems management systems in the same way. The proxy integrators API 430 interfaces with the remote services proxy 210 as well as the systems management integrator 212.

The remote services infrastructure API's are used by a service module creator and the systems management integrator 212. The remote services infrastructure API's 412 include an intermediate MLM Service Module API 432, an applications MLM API 434 and an applications server service module API 436 as well as a content generation MLM service module API 438. These API's provide the interface with the remote services infrastructure 102.

The intermediate MLM Service Module API 432 describes a distributed component of the infrastructure. The intermediate MLM service module API 432 allows modules to be loaded into this distributed component that provides mid data stream services such as data aggregation, filtering, etc. The intermediate MLM service module API 432 provides access and control over the data that flows through the intermediate MLM 216 to the service module provider. The intermediate MLM service module API 432 allows intercept of data upstream and on the back-channel to mutation, action and potential blocking by the service modules 103. The intermediate MLM service module API 432 interfaces with a service module creator as well as with the intermediate MLM 216 and intermediate MLM based service modules.

The applications MLM API 434 allows additional modules to be loaded on the applications MLMs. The applications MLM API 424 allows modules to be built into the applications MLMs 218 such as data normalization. The applications MLM API 424 interfaces with the applications MLMs 218 and modules within the applications MLM 218.

The applications server service module API 436 provides all of the needs of a data processing service module. The applications server service module API 436 provides access to many functions including data collected through a database and access to a full authorization schema. The applications service module API 436 is based around the J2EE API. The applications service module API 436 provides a rich interface for service module creators to interact with and build services based on Enterprise Java Beans (EJB's) and data available to them. The application server service module API 436 interfaces with the remote services application server 226 and the service modules 103.

The content generation MLM API 438 is based around the J2EE web container and provides the service module creator a way of building a browser based presentation. The content generation API 428 interfaces with the content generation MLM 224 as well as with MLM generation based service modules.

The remote services infrastructure API's 412 also include a plurality of communication interfaces which are based around the extendibility of the remote services communications system. The communication interfaces include a communication protocol module 440, a communication encryption module 442 and an MLM infrastructure services portion 444. The communications interfaces interface with the remote services proxy 210 as well as all of the remote services system MLM's. The communications interfaces provide an interface between the communications modules and the components that use the communications modules.

The communications protocol module 440 provides support of the application level protocol that is used for the communication through the system. Modules of this type interface to support the use of Email and HTTP communications protocols. The communication protocol module 440 interfaces with remote services communications engineering personnel.

The communications encryption module 442 supports plug-in encryption modules. The plug-in encryption modules can either provide encryption at the protocol level or encryption of the data within the protocol. The communication encryption module 442 interfaces with remote services communications engineering personnel.

The MLM infrastructure services portion 444 represent a number of services that are included within the MLM that provide services that are relevant to the infrastructure 102. These services manage and manipulate the data as it passes through the different parts of the architecture. These services, such as queuing, utilize an API to access and manipulate the API.

Figure 5A:
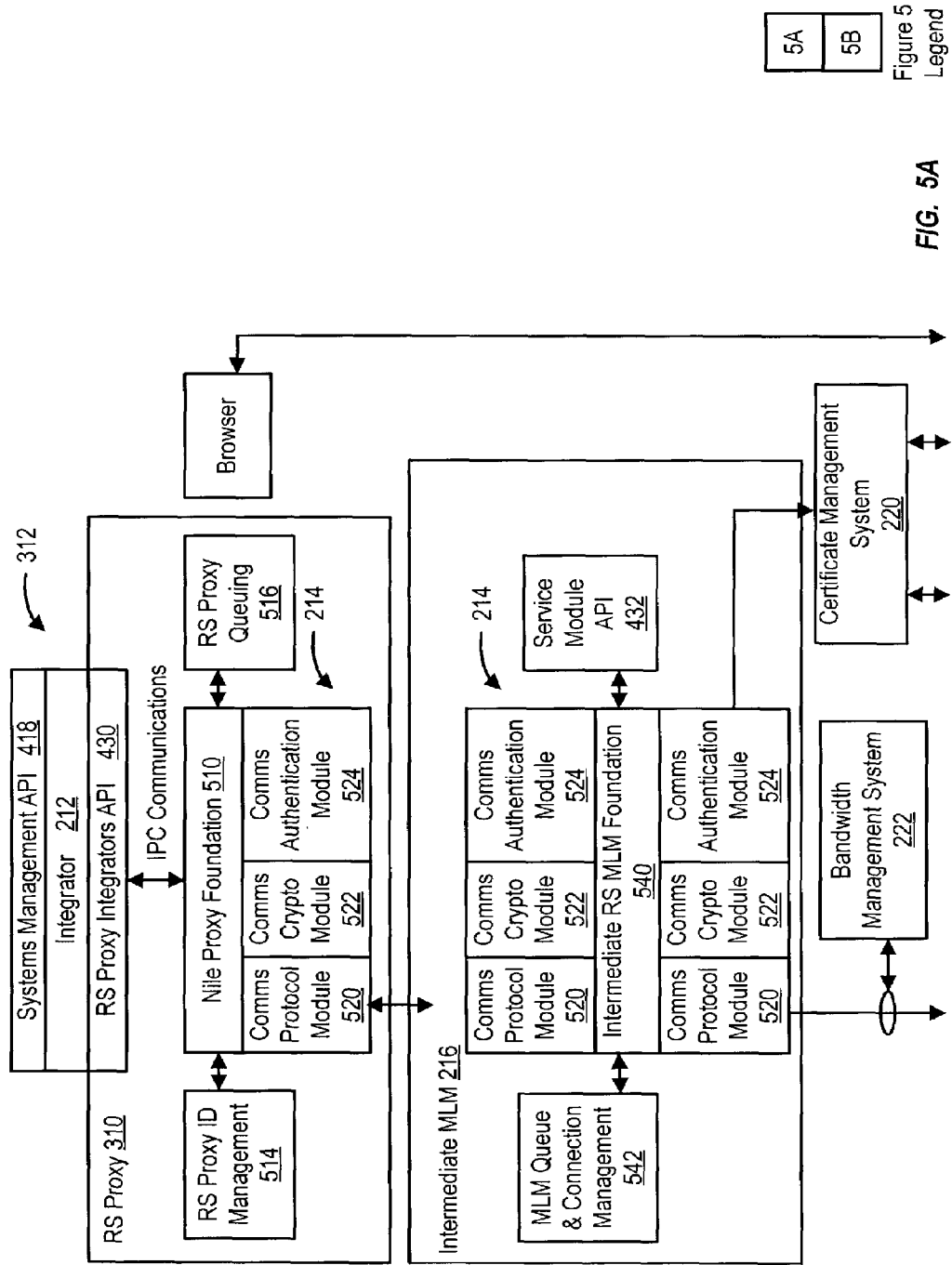
FIGS. 5A and 5B show a more detailed version of the components of FIG. 2.
Figure 5B:
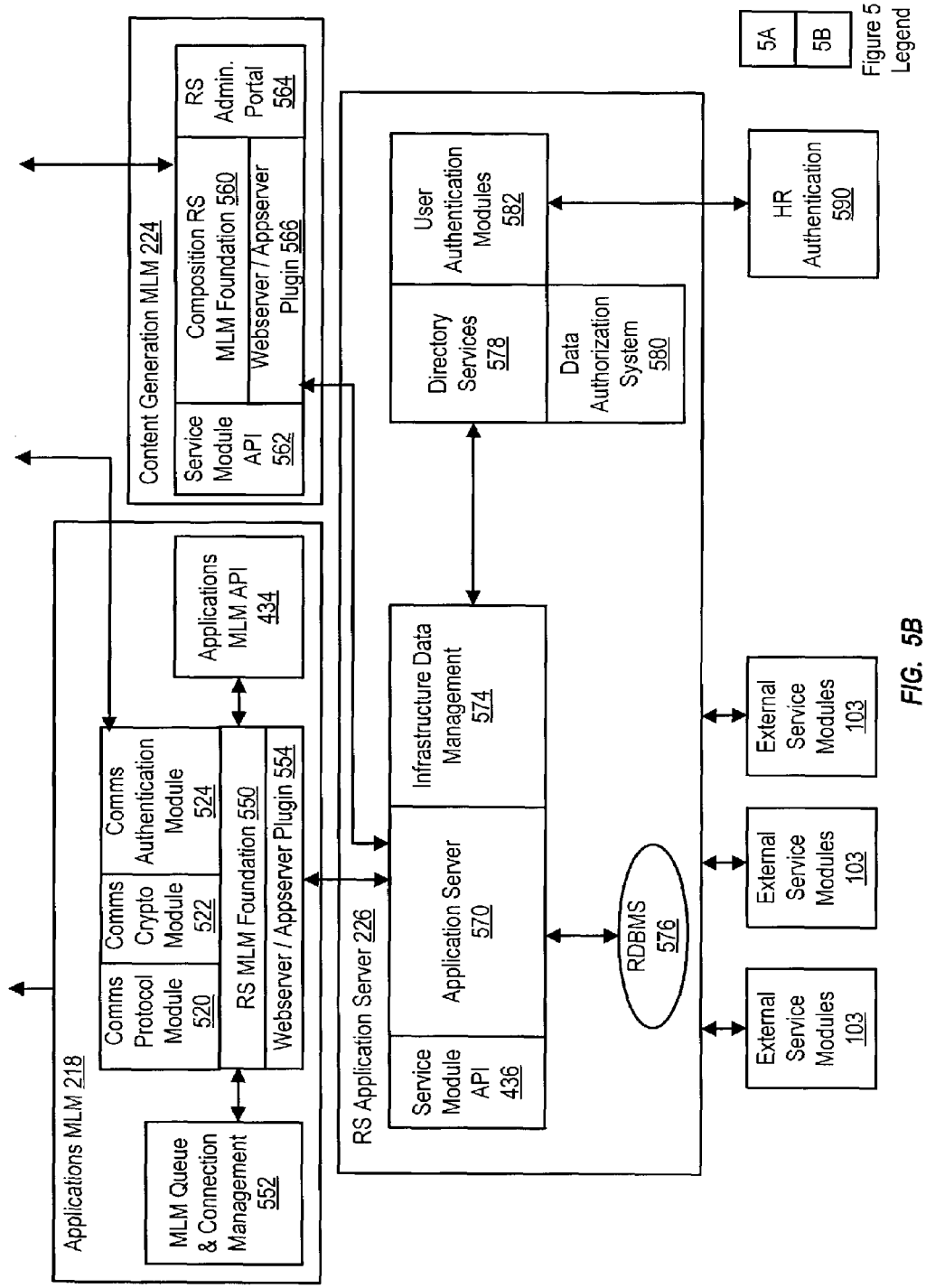

FIGS. 5A and 5B show a more detailed block diagram of the remote services architecture depicted in FIG. 2. Within this more detailed block diagram, the remote services communications modules 214 are shown distributed across the remote services proxy 210, the intermediate MLM 214 and the applications MLM 218.

The remote services proxy 210 includes a remote services proxy foundation module 510 which is coupled to a communications module 214 as well as to a remote services proxy integrator API module 430, a remote services proxy ID management module 514 and a remote services proxy queuing module 516.

The remote services system management integrator 212 includes a systems management API 418 and a remote services integrator 212. The remote services integrator 212 is coupled to the remote services proxy integrators API module 430 of the remote services proxy 210.

Each communication module 214 includes a communications protocol module 520 and a communications crypto module 522. A communications module 214 may also include a communications authentication module 524.

The intermediate MLM 216 includes an intermediate remote services MLM foundation module 540 which is coupled between communication modules 214. The intermediate remote services MLM foundation module 540 is also coupled to a MLM queue and connection management module 542 and an intermediate service module API module 432. Communications modules 214 couple the intermediate MLM 216 to the remote services proxy 210 and the applications MLM 218.

Bandwidth management system 222 controls bandwidth usage and data prioritization on the communications between intermediate MLM 216 and applications MLM 218. Certificate management system 220 is coupled between the communications authentication modules 524 for the intermediate MLM communications module 214 and the applications MLM 218 communications module 214.

The applications MLM 218 includes a remote services MLM foundation module 550 that is coupled to the communications module 214 for the applications MLM 218. The remote services MLM foundation module 550 is also coupled to an MLM queue and connection management module 552 and the applications MLM API module 434 as well as a web server application server plug-in module 554.

Content generation MLM 224 includes a composition MLM foundation module 560. The composition MLM foundation module 560 is coupled to a service content generation module API module 438 and a remote services administration portal 564 as well as a web server application server plug-in module 566.

Remote services application server 226 includes an application server module 570 coupled to an application server service module API 436 and an infrastructure data management module 574. The application server module 570 is also coupled to relational database management system (RDBMS) 576. The infrastructure data management module 574 is coupled to a directory services module 578. The directory services module 578 is coupled to a data authorization system module 580 and user authentication modules 582. The user authentication modules 582 are coupled to human resources (HR) authentication module 590. The remote services application server 226 is coupled to a plurality of external service modules 230.

FIGS. 6, 7, 8, 9 and 10 show expanded views of the remote services proxy 210 and remote services system management integrator 212, intermediate MLM 216, applications MLM 218, applications server 226 and content generation MLM 224, respectively.

Figure 6:
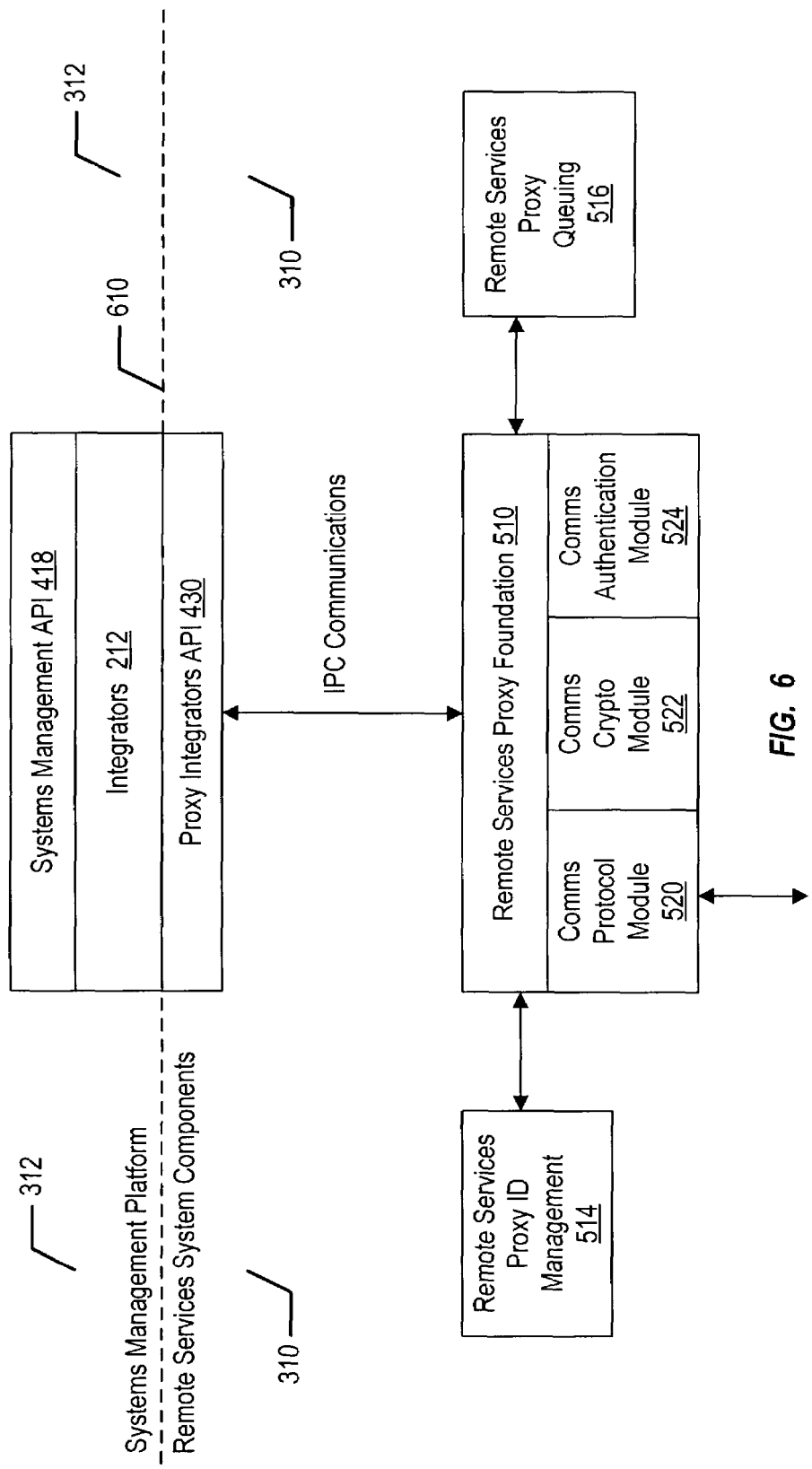
FIG. 6 shows a block diagram of a remote services proxy and a remote services system management integrator.

FIG. 6 shows a block diagram of the remote services proxy 210 and the remote services system management integrator 212. The block diagram shows the delineation between the systems management software and the remote services system components as indicated by line 610.

The remote services proxy 210 provides an API via remote services proxy integrators API 430 which communicates using the operating system's Inter-Process Communication (IPC) implementation with the remote services proxy foundation module 510. This communication allows the API to be implemented with a number of different languages to meet the needs of the systems management developers while leaving a single native implementation of the remote services proxy foundation module 510. Examples of the languages used for the API include Java and C++.

The remote services proxy foundation module 510, together with the API 430, manage data normalization tasks. This ensures that systems management data is carried independently through the system. For example, an event from one type of service, such as a SunMC service, would have the same structure as an event from another type of service, such as the RASAgent service. Accordingly, the service modules may deal with the data types that are specific to the respective service and are independent of their source.

In the remote services architecture, the integrator 212 and proxy 210 are represented by two separate processes (e.g., address spaces). By representing the integrator 212 and the proxy 210 as two separate processes, a faulty integrator 212 is prevented from taking down the whole proxy 210.

The remote services proxy queuing module 516 allows data to be queued for transmission when communications to the intermediate MLM(s) 216 become unavailable. This queuing is lightweight and efficient which in turn reduces the capabilities of length of time data can be queued and of reconnection management. The remote services proxy queuing module 516 provides a number of features that can be used to manage the queue, such as priority and time for data to live.

The remote services proxy ID management module 514 manages the allocation of unique identifiers for the proxy 210 itself and any support instances that are registered through the API. The remote services system 100 relies on the creation of unique ID's to manage individual support instances. This function is provided within the proxy 210 because there is no unique cross platform identifier available within the remote services system 100. The proxy 210 manages the mapping between the systems management ID (e.g., IP address) and the remote services ID, which is keyed off the unique customer ID provided at installation time within the deployed system.

Figure 7:
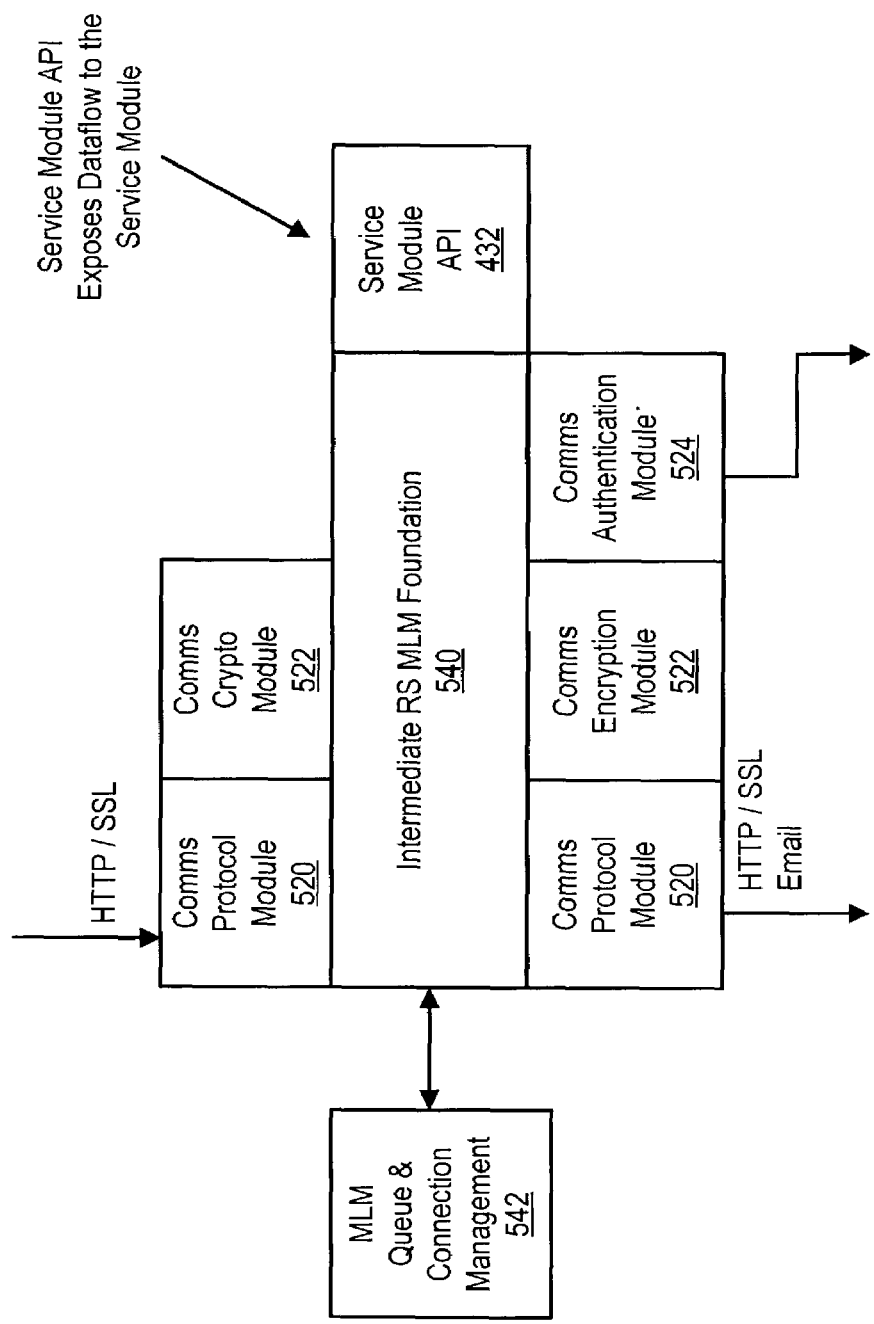
FIG. 7 shows a block diagram of a remoter services intermediate mid level manager (MLM).

FIG. 7 shows a block diagram of the remote services intermediate MLM 216. The intermediate MLM may be a customer MLM or an aggregation MLM.

The customer MLM is an optional component that can be deployed to support scaling of both support instances and services as well as provide enhanced availability features for a deployed remote services environment. The intermediate MLM 216 receives information via the HTTP protocol from the remote services proxy 210. This information may optionally be encrypted. Connections are not authenticated by default on the server side, as it is assumed that the connection between the intermediate MLM 216 and the proxy 210 is secure.

The intermediate remote services MLM foundation module 540 exposes the data flow to the service module API 432 where registered service modules can listen for new data of specific types and mutate the data as required. Examples of this function include filtering of certain types of data or data aggregation. The customer MLM does not keep state from an infrastructure perspective. However, the service module could choose to keep persistent state information. The recoverability fail-over support of that state, however, is in the domain of the service module, although the basic session replication features that provide the redundancy features of the infrastructure data flow may be reused.

The queue and connection management module 542 provides a highly reliable secure connection across the wide area network to the service provider based MLM farms. The queue manager portion of module 542 also manages back-channel data that may be intended for specific remote services proxies as well as for the applications MLM 218 itself.

The intermediate remote services MLM foundation module 540 manages the rest of the MLM's roles such as session management, fail-over management and shared queuing for the back-channel.

Aggregation MLM's, while provided by the service provider, function much the same as customer MLM's. Strong security is turned on by default between such MLM's and the remote services proxy 210. Accordingly, a communications authentication module 524 is used on the receiving portion of the intermediate MLM 216.

Figure 8:
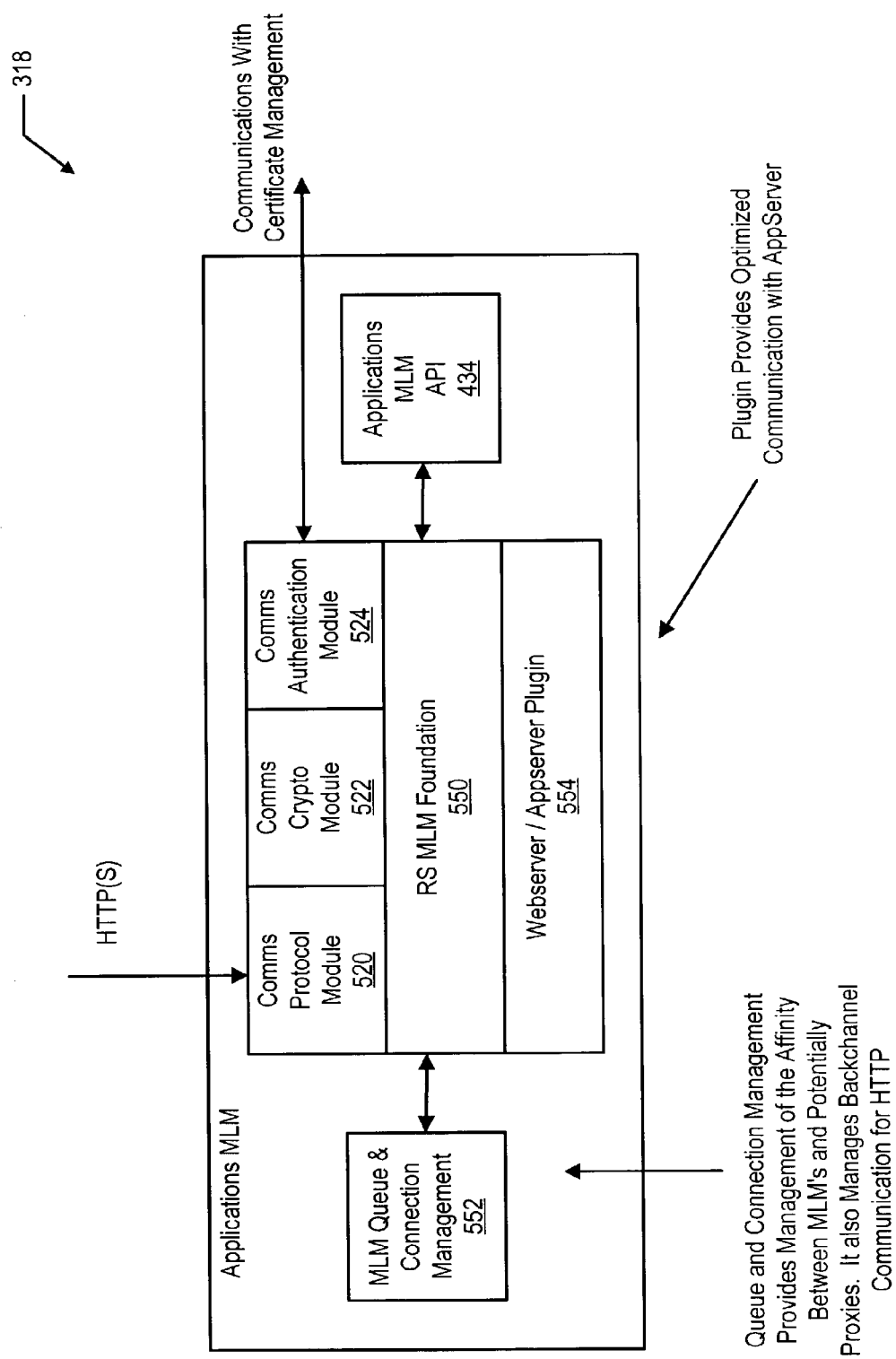
FIG. 8 shows a block diagram of a remote services applications MLM.

Referring to FIG. 8, the remote services application MLM 218 provides several functions (applications) for the remote services system 100. The remote services application 218 hosts applications as well as functioning as a content creation MLM. The host applications within the application MLM 218 include data normalization, customer queue management and remote access proxy. The data normalization application supports normalization and formatting of data being sent to the application server 226. The customer queue management application handles general connections to and from customer remote services deployments. The customer queue management application also manages back-channel requests and incoming request. The remote access proxy application provides a remote access point as well as functioning as a shared shell rendezvous point. The applications MLM 218 uses the application server plug-in to communicate directly with the application server 226.

The communications authentication module 554 communicates with the certification management system 220 to validate incoming connections from customers. Each customer is provided a certificate by default although more granular allocations are available. Certificates are distributed at installation time as part of the installation package for both the remoter services proxy module and for the remoter services customer MLM.

Figure 9:
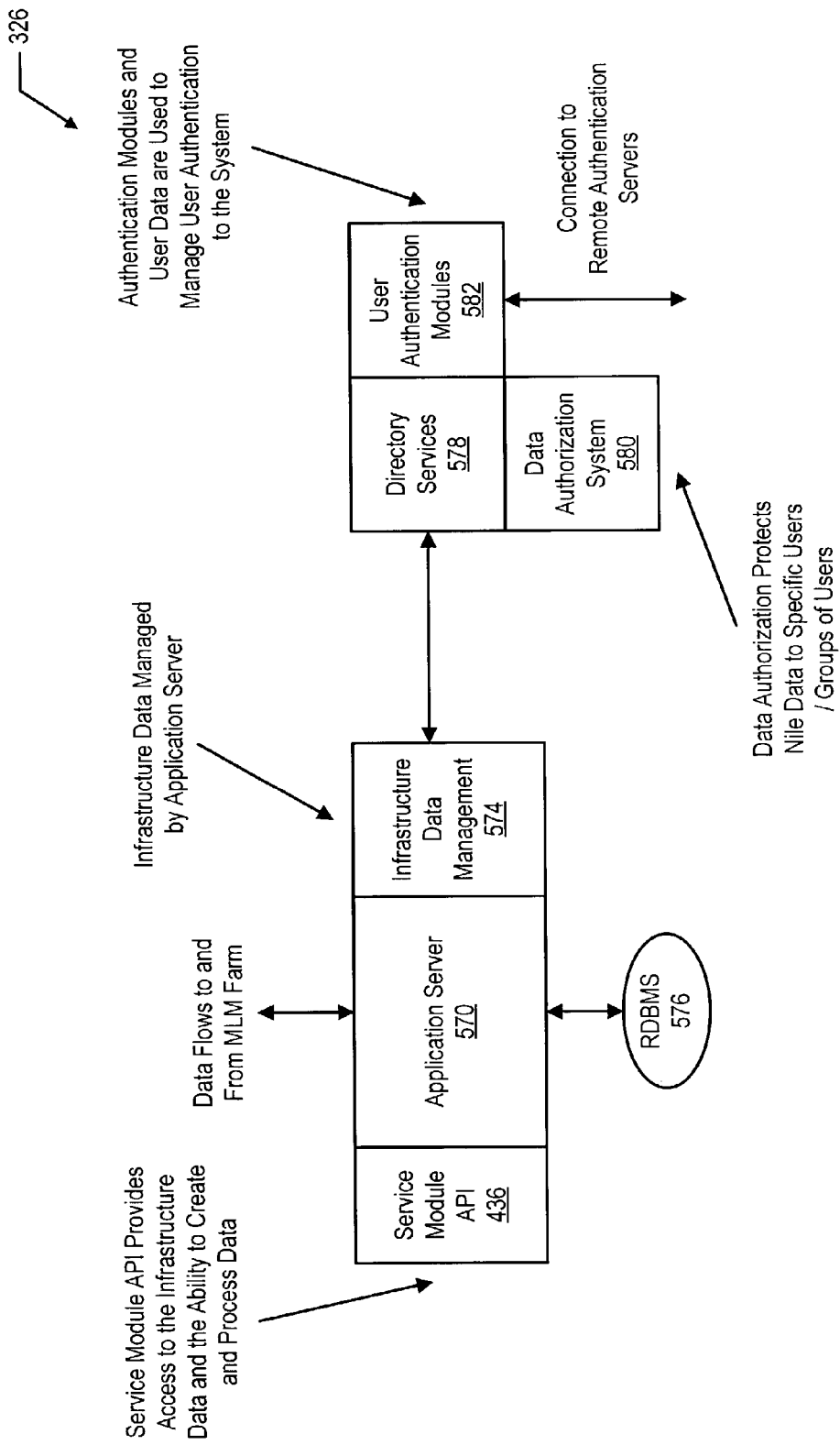
FIG. 9 shows a block diagram of an application server module.

Referring to FIG. 9, the application server 226 manages the persistence and data processing of the remote services infrastructure 102 and the service modules 103.

The application server 226 provides the core service module API 436 to the service module creator. The service module API 436 is based upon the J2EE API. The service module API 436 allows the service module creator to register for certain types of data as the data arrives and is instantiated. This data can then be processed using the support of the application server 226 or alternatively exported from the remote services system 100 for external processing.

The infrastructure data is held within the application server 226 and stored within the RDBMS 576 associated with the application server 226. Access to this data is available via the service module API 436 and is managed via the infrastructure data management module 574.

The directory services implementation supports user authentication, data authorization and private network data support. User authentication uses a pluggable authentication module (PAM) so support a plurality of authentication methods such as a lightweight directory assistance protocol (LDAP) method for service provider employees and a local login method for a remote services based login schema. Other methods may be added. The LDAP login is processed using a replicated copy of an LDAP server running within the remote services infrastructure 102.

Data authorization is designed to protect the data held within the application server 226 to specific groups of users. This protection allows customers to grant or deny access to their service data to specific users. This data protection is managed down to the service module granularity. So for example, a customer could grant information about advanced monitoring on a subset of their support instances to members of a service provider monitoring staff.

Figure 10:
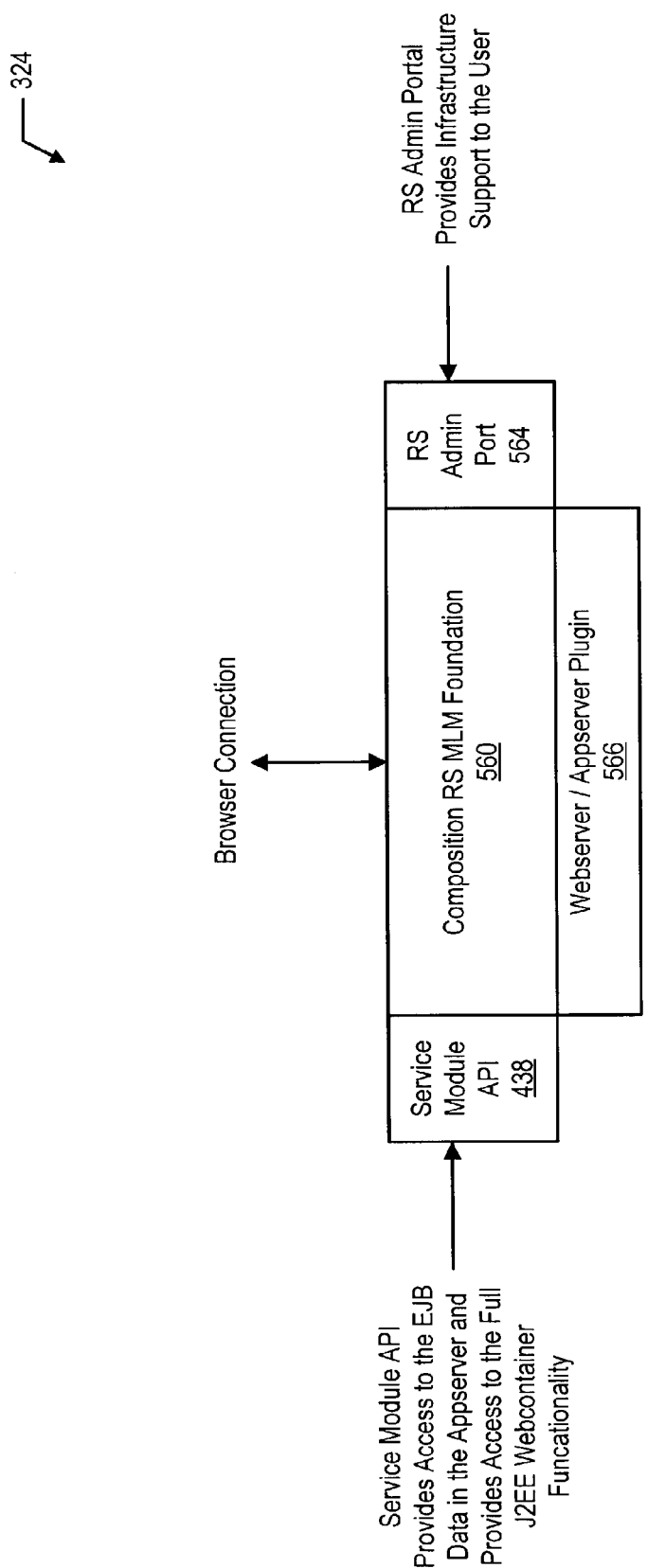
FIG. 10 shows a block diagram of a content generation MLM module.

Referring to FIG. 10, the remote services content generation MLM 224 provides HTML generation bases on the data held within the application server 226. The content generation MLM 224 provides a service module API 438 for service module creators to develop content composition for their data which is processed by the application server 226. The content is in the form of J2EE web container which supports Java servlets and Java servlet pages (JSP) API's.

The content generation MLM 224 communicates with the application server 226 using the same Netscape API (NSAPI) plug-in as the remote services applications MLM 218. Instances of these two MLMs make up an MLM farm. The composition remote services foundation layer provides support for caching of HTML pages and associated data to reduce the data request hit back to the application server 226.

The remote services administration portal 564 provides control of the deployed customer infrastructure to the customer and control over the total infrastructure to trusted users.

Figure 11:
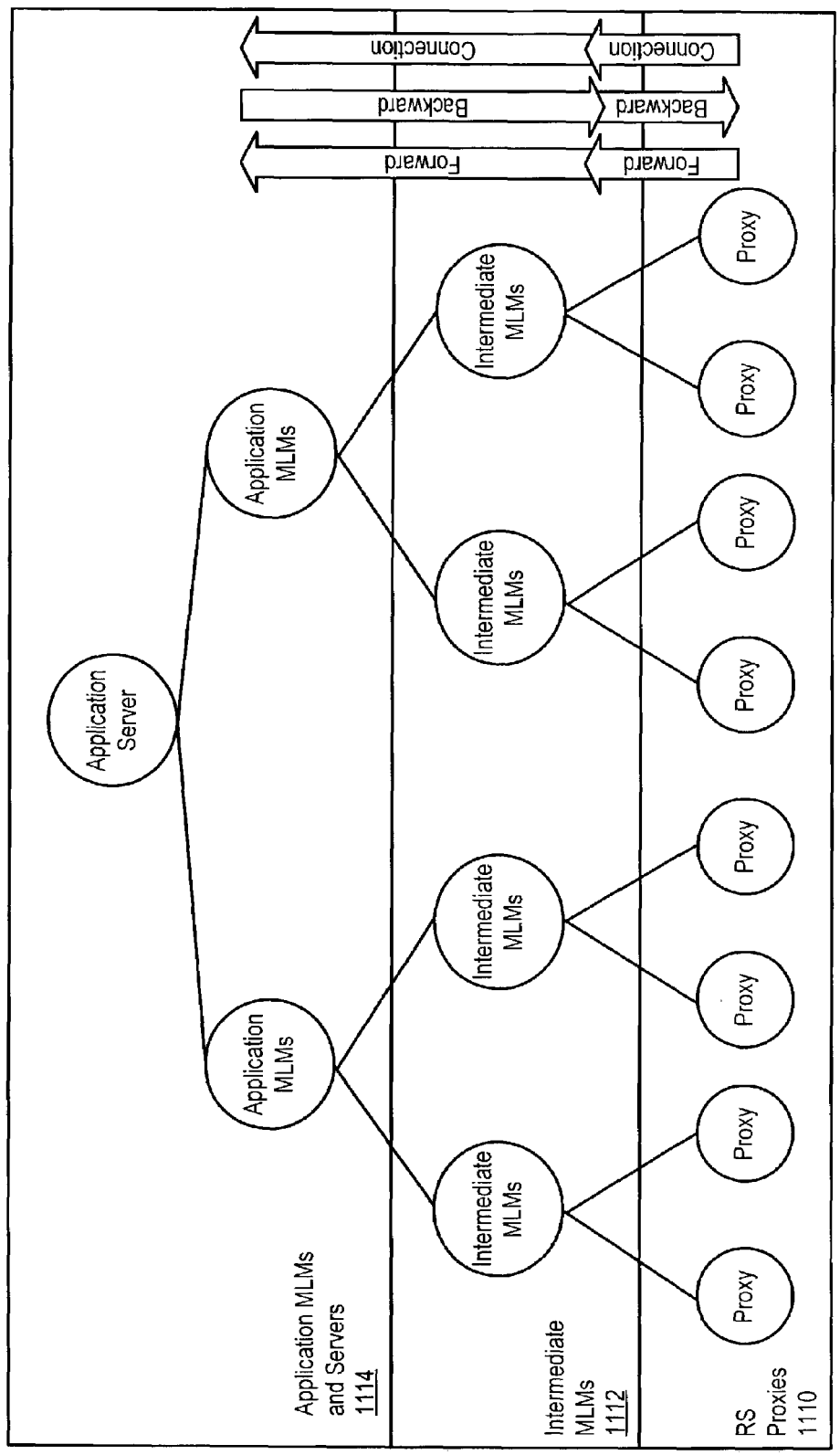
FIG. 11 shows a flow diagram of a remote services system communication.

FIG. 11 shows a flow diagram of communications within a remote services architecture. In one embodiment, the communications between a customer and a service provider is via a wide area network (WAN). Communications within the remote service architecture includes three tiers, a remote services proxy tier 1110, an intermediate MLM tier 1112 and an application MLM and server tier 1114. Communication is established and connections are made from the bottom tier (the remote services proxy tier) to the top tier.

The remote services architecture supports two application protocols for the majority of its services classification support: HTTP and Email messaging. There are a plurality of service module classifications that each have specific communications protocol relationships. More specifically, the service module classifications include a data collection classification, a monitoring classification, a remote access classification and an infrastructure administration classification.

With the data collection classification, the connection orientation is message based, the physical connection support may be Internet, private network or fax, and the protocols supported may be Email or HTTP. Examples of service modules of this classification include an inventory management service module and a performance management service module.

With the monitoring classification, the connection orientation is message based, the physical connection support may be Internet, private network or fax, and the protocols supported may be Email or HTTP. Examples of service modules of this classification include basic self service monitoring and full hardware monitoring with service action.

With the remote access classification, the connection orientation is session based, the physical connection support may be Internet, private network or fax, and the protocol supported is HTTP. The session based connection orientation is one way initiation from the customer. Examples of service modules of this classification include remote dial in analysis and remote core file analysis.

With the infrastructure administration classification, the connection orientation is session based or off-line installation, the physical connection support may be Internet, private network or fax, and the protocol supported includes HTTP, email or physical (e.g., telephone or CD). The session based connection orientation is one way initiation from the customer and the off-line installation is via, e.g., a CD. Examples of service modules of this classification include remote services administration, installation, updates, configuration and notification.

Encryption options are related to the protocol. A secure socket layer (SSL) protocol, for example, is likely to be the chosen protocol for an HTTP transmission, i.e., an HTTPS transmission. The remote services communication architecture does not enforce this however. So, for example, data could be sent by encrypting the body of an HTTP stream. This provides an advantage when a customer's HTTPS proxy infrastructure is not as resilient as their HTTP proxy infrastructure.

Email uses an email encryption option such as s-mime or encrypting the body using a third party encryption method such as PGP. Encryption is optional at all stages. If the customer does not require encryption, then encryption need not be used.

Authentication of the remote services communication is standard for all protocols. Accordingly, the service provider may validate the sender of data and the customer may validate that the service provider is the receiver. Authentication is managed via certificates.

Certificates are used in both the client and server to authenticate a communications session. Client certificates are generated during the customer registration process and are built into the remote services proxy and the customer MLM. By default, each customer is provided a client certificate. The customer can, however, define specific security groups within their service domain and request additional client certificates for those domains. Remote services processes include a certificate distribution mechanism, supporting either the creation of a new security group within an existing customer or the redeployment of a new certificate after a certificate is compromised.

Figure 12:
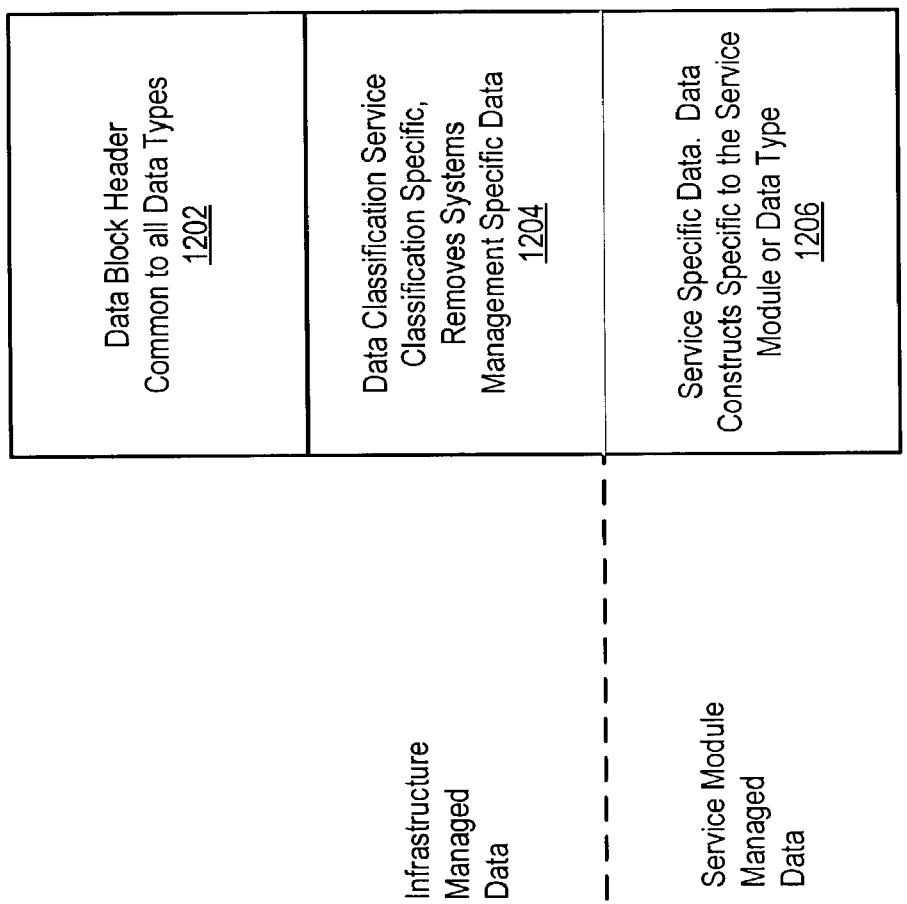
FIG. 12 shows a block diagram of the data blocks that comprise the data that flows through the remote services infrastructure.

FIG. 12 shows a block diagram of the data blocks that comprise the data that flows through the remote services infrastructure. Each system management system conforms to the data definitions that are part of the remote services proxy integrators API 430. The remote services communications architecture provides a normalized view of the data, regardless of in which systems management framework the data originated.

Data block header 1202 is common to all data types. Data block header 1202 contains items such as source, routing information, time to transmit and source type. Data block header 1202 is used to route the data correctly through the remote services system 100 to the correct service module 103. Data block header 1202 is used to provide diagnostic and quality of service measurement built into the system.

Infrastructure data block 1204 provides data classification service classification specific data. Infrastructure data block 1204 removes systems management specific data.

Service module data block 1206 provides format based on each service classification that drives the system the systems management normalization of the data that flows through the system. For example, alarm data includes general characteristics defined such as severity, state and originating support instance.

Figure 13A:
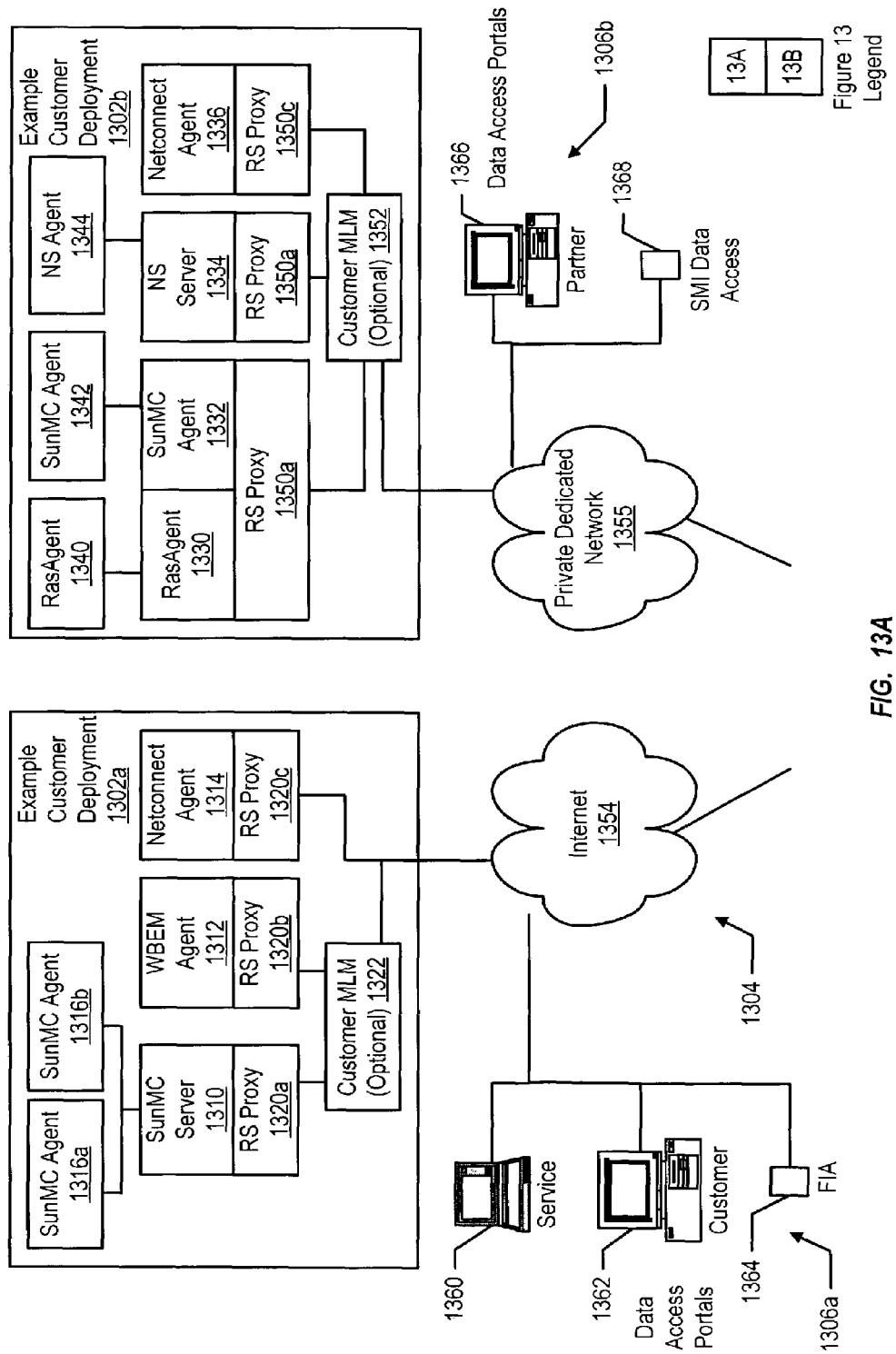
FIGS. 13A and 13B show an example of the high level architecture component relationships of a remote services system that is configured according to the remote services architecture.
Figure 13B:
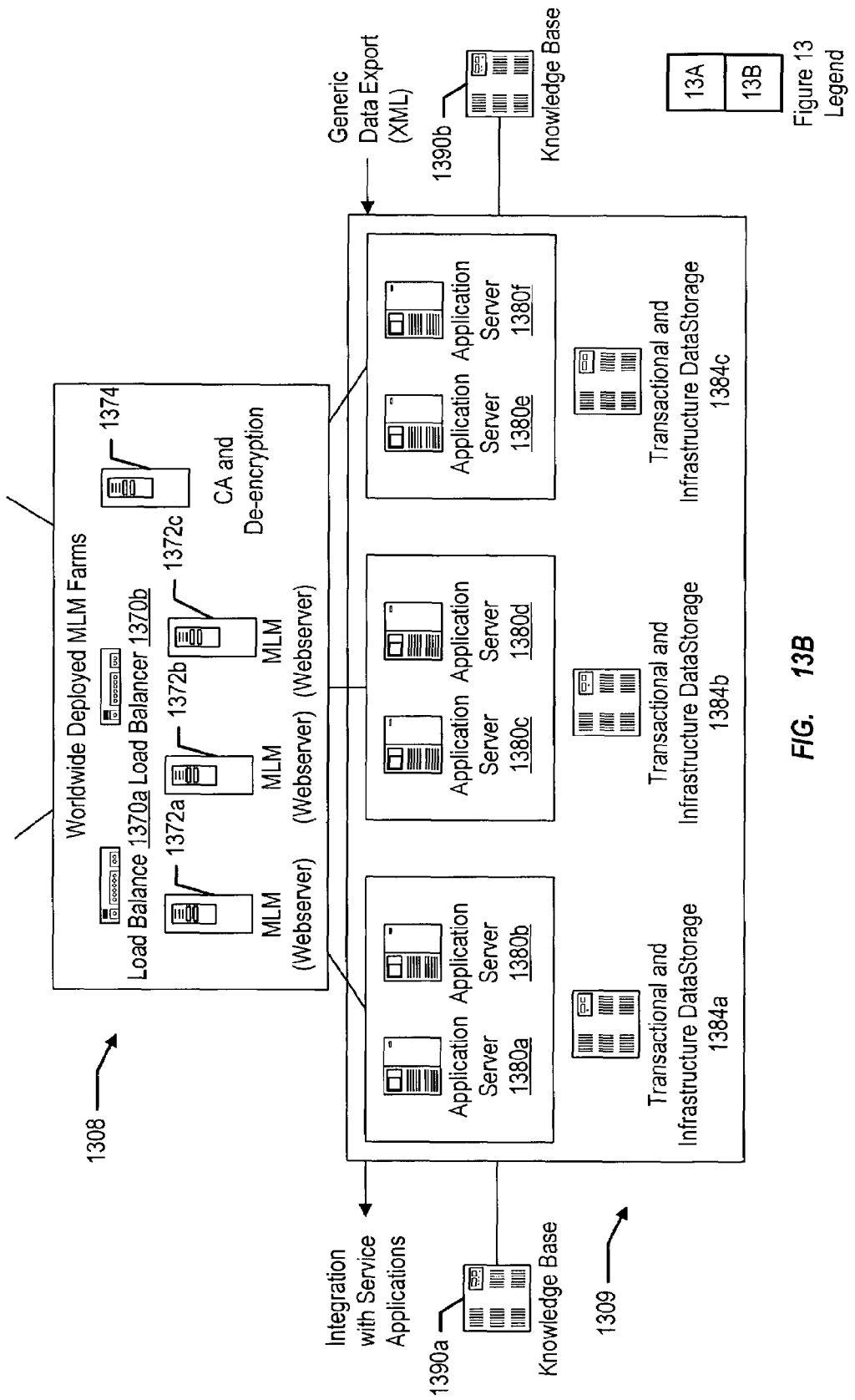

FIGS. 13A and 13B show an example of the component relationships of a remote services system 100 that is configured according to the remote services architecture. Various components of the remote services system 100 execute modules of the remote services infrastructure architecture 205. Remote services system 100 includes customer deployment portion 1302a, 1302b, network portion 1304, data access portal 1306a, 1306b, Mid Level Manager (MLM) portion 1308, and application server portion 309.

Customer deployment portion 1302a sets forth an example customer deployment. More specifically, customer deployment portion 1302a includes SunMC server 1310, WBEM agent 1312, and Netconnect Agent 1314. SunMC agents 1316a, 1316b are coupled to SunMC server 1310. Server 1310, Agent 1312 and Agent 1314 are each coupled to a respective remote services proxy 1320a, 1320b, 1320c. Remote services proxies 1320a, 1320b, 1320c are coupled to network portion 1304, either directly, as shown with proxy 1320c, or via customer MLM 1322, as shown with proxies 1320a and 1320b. Proxies 1320a and 1320b may also be directly coupled to network portion 304 without the MLM 1322 present. The SunMC server is a provider specific systems management server (i.e., health management server). The SunMC agents are provider specific systems management agents (i.e., health management agents). The WEBM agent is a web based enterprise management agent. The Netconnect agent is a basic collection agent. Customer deployment portion 1302a illustrates that the systems management may be 2-tier (e.g., agent, console) or 3-tier (e.g., agent, server, console).

Customer deployment portion 1302b sets forth another example customer deployment. More specifically, customer deployment portion 1302b includes RasAgent 1330, SunMC agent 1332, NS server 1334 and Netconnect Agent 1336. RasAgent 1340 is coupled to RasAgent 1330. SunMC Agent 1342 is coupled to SunMC Agent 1332. NSAgent 1344 is coupled to Netconnect Agent 1336. RasAgent 1330 and SunMC Agent 1332 are coupled to remote services proxy 1350a. Metropolis Server 1334 is coupled to remote service proxy 1350b. Netconnect Agent 1336 is coupled to remote services proxy 1350c. Remote services proxies 1350a, 1350b, 1350c are coupled to network portion 1304 either via customer MLM 1352 or directly. The RasAgent is a reliability, availability, serviceability agent. The NSagent is a network storage agent and the NS server is a network storage server. Both the NSagent and the NS server are reliability, availability, serviceability type devices.

Network portion 1304 includes at least one interconnection network such as the Internet 1354 and/or a private dedicated network 1355. Internet 1354 is assumed to be an existing connection that is reused by the remote services system. The private dedicated network 1355 is a dedicated link that is used exclusively by the remote services system to connect the customer to the service provider. The data to manage the private network is provided by directory services technology held within the application server portion 1308. The directory services technology handles all of the domain name service (DNS) services used to manage name to allocated internet protocol (IP) information. The remote services infrastructure also offers transmission over fax from the customer's environment (not shown). The fax communication is for service modules where the fax transmission makes sense. For example, fax transmission may be used in a military site which does not allow electronic information to be transmitted from it.

Data access portal portions 1306*a* and 1306*b* provide access to the remote services system 100. More specifically, data access portal portion 1306*a* includes a service access portion 1360, a customer access portion 1362 and a field information appliance (FIA) 1364. Data access portal portion 1306*b* includes a partner access portion 1366 and a system management interface (SMI) data access portion 1368.

Mid level manager portion 1308 includes load balancers 1370*a*, 1370*b*, MLM webservers 1372*a*, 1372*b*, 1372*c* and communication authentication (CA) and de-encryption server 1374.

Application server portion 1309 includes a plurality of application servers 1380*a*-1380*f*. Application servers 1380*a*, 1380*b* are associated with transactional and infrastructure data storage 1384*a*. Application servers 1380*c*, 1380*d* are associated with transactional and infrastructure data storage 1384*b*. Application servers 1380*e*, 1380*f* are associated with transactional and infrastructure data storage 1384*c*. Application server portion 1309 also includes knowledge base 1390*a*, 1390*b*. Application server portion 1309 integrates with service applications as well as via generic data export (such as, e.g., XML).

Remote services proxies 1320, 1350 provide a System Management Integrators API. Using this API, system management products can integrate their customized handling of data into the common data format that is used by the remote services architecture. Accordingly, the system management component of the overall system is effectively segmented away from the remote services architecture.

Additionally, by using the remote services proxies 1320, 1350, the remote services architecture leverages much of a pre-existing instrumentation and data collection mechanisms that already exist. Accordingly, already deployed instrumentation agents within a remote service provider existing system such as those from SunMC and Netconnect may be integrated into a remote services system. Additionally, third party systems management systems may also be supported and integrated via the remote services proxies.

Customer deployment portions 1302*a*, 1302*b* each show an optional customer MLM component deployed to the customers environment. Whether to deploy the customer MLM component depends on a number of factors. More specifically, one factor is the number of support instances installed in the customer's environment and the number of services being utilized by the customer. A deployed MLM component can allow greater scale capabilities. Another factor is the type of services deployed within the customer environment. Some services are optimized when an MLM component is deployed to the customer environment to support service specific tasks such as filtering and data aggregation. Another factor is the quality of service. Deploying an MLM component provides a greater level of quality of service because the MLM component provides enhanced data communications technology within the MLM infrastructure modules.

The decision of whether to deploy a remote services MLM component (or more) to the customer's environment is a deployment decision. There are a number of architecture deployment classes which are used to meet the varying customer needs.

The remote services system communicates via two main protocols, HTTP and email. Security considerations for these protocols can be chosen by the customer and plugged into the system. For example, the HTTP protocol may use SSL. Additionally, the email protocol may use some well known form of encryption.

The connections from the customer deployment portion 1302 feed into MLM farms which reside within the SMI service provider environment. These MLM farms are sets of redundant web servers 1372 that are balanced using conventional load balancing technologies. Alongside these web servers 1372 are infrastructure servers 1374 which provide specific infrastructure acceleration for decryption and distribution of certificates for communications authentication.

These MLM farms provide a plurality of functions. The MLM server farms provide remote proxy connections. In deployments when an MLM is not deployed to the customer, the customer's proxy connects to the MLM farms within MLM portion 1308. Also, in deployments when a customer MLM 1322, 1372 is present, the MLM farm communicates and manages communication with the deployed customer MLM 1322, 1372. Also, the MLM server farms provide data processing capabilities, e.g., the MLM farms provide application specific tasks to prepare data for passing to the remote services application server portion 1309. Also, the MLM server farms provide access points for the customer and service personnel via browser like connections. The MLM farm generates the HTML that is presented to the browser.

The MLM technology is based upon known web server technology such as that available from Sun Microsystems under the trade designation iPlanet. Plug-in functionality is provided by the servlet and JSP interfaces available as part of the web server technology.

The remote services application servers 1380 provide data processing and storage for the remote services infrastructure as well as for any hosted service modules. The remote services application servers 1380 are based upon known application server technology such as that available from Sun Microsystems under the trade designation iPlanet application server 6.0. The remote services application server 1380 provides support for horizontal scalability, redundancy and load balancing. Thus providing the back-end components of the remote services architecture with a high level of built in assurance and flexibility. Application partitioning of the application servers 1380 provides processing distribution to ensure that heavy processing that may be required by more complex services are handled appropriately without affecting the remainder of the remote services architecture.

Application server portion 1309 provides integration into existing business systems, generic data export and tight integration with existing knowledge base implementations 1390. Data export is handled through structured XML, data can be exported asynchronously by a client registering to receive data of a particular type or synchronously by the application server 1380 accepting a request from a client.

The core service module API is provided by the application server 1380 using a J2EE implement API. The basic container services of J2EE are extended to provide remote services specific functions and to create the basis of the API. Accordingly, a service module creator can rely on a number of provided for services, such as database persistency, high levels of atomic, consistent, isolated, and durable (ACID) properties, directory service access, authorization protection for the data and access to the data collected by the remote services infrastructure itself.

The creation of a service module, which provides the technology to support a specific remote service, involves at least one of the following components: a creation of detection/collection logic component; a mid-stream analysis and management of data component; an analysis and storage of data component; and, a presentation and management of the data/knowledge component.

The detection/collection logic is created within the domain of a systems management toolkit. The mid-stream analysis and management of data is an optional step and effectively provides analysis of the data within the customer's environment. Inclusion of this logic would mean that the mid-stream analysis and management of data service module would have a remote services MLM deployed to the customer's environment 1302a, 1302b. The deployment of the remote services MLM to the customer's environment reduces and manages the data being sent over the WAN to the remote services provider. The analysis and storage of data component is performed within the application servers domain (the component may be exported). This analysis and storage of data component turns data into knowledge and service value that can then be presented back to the customer. The presentation and management of the data/knowledge component is where the data and knowledge that is developed from the analysis and storage of data component is presented to the customer or service personnel. The presentation and management of data/knowledge component may include interactive support to provide modification of the data values.

Figure 14:
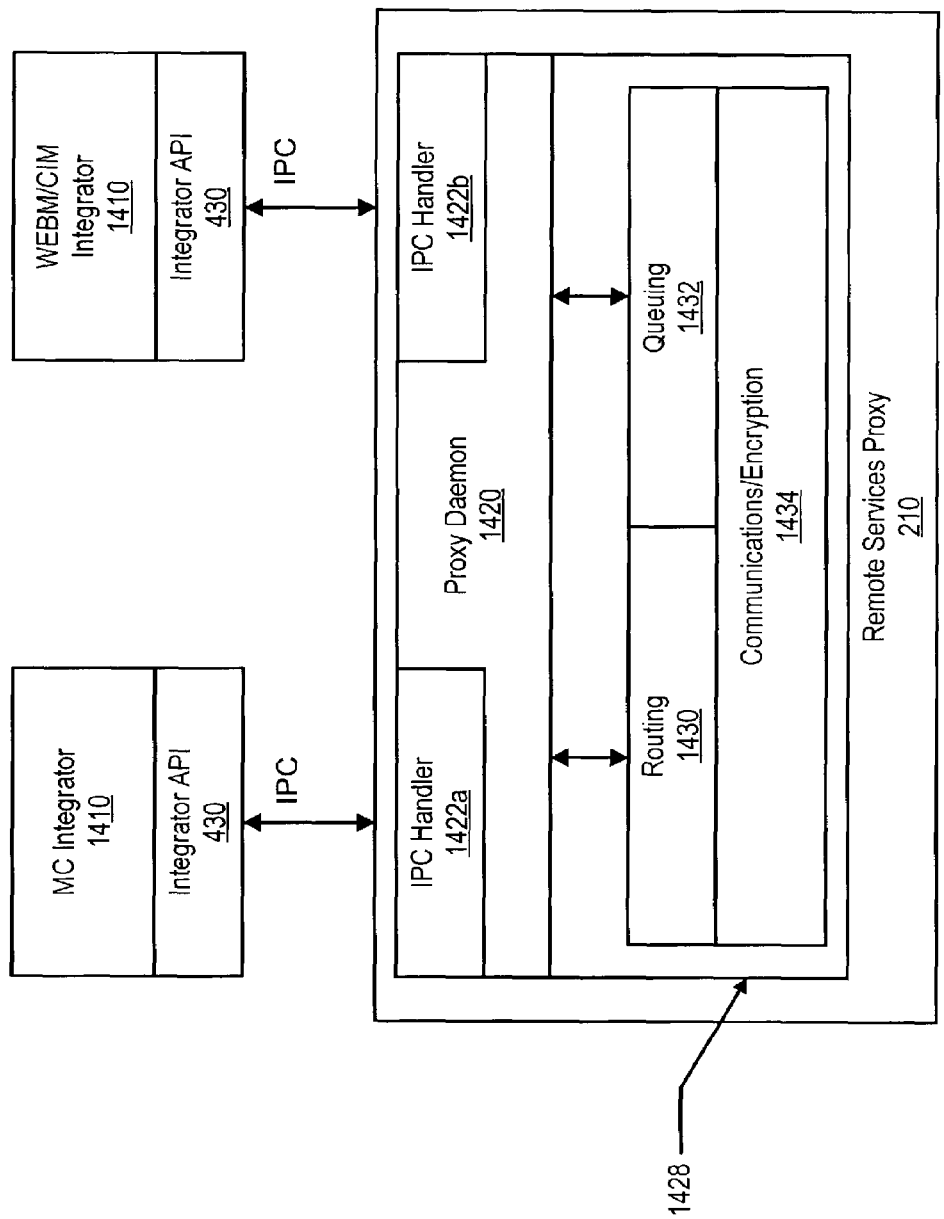
FIG. 14 shows a block diagram of a remote services proxy.

Referring to FIG. 14, remote services proxy 210 provides the interface between a systems management platform and the remote services infrastructure 102 on the customer site. The system management platform includes a plurality of integration modules 1410 which coupled to a remote services proxy 210 via a systems management integrator API 430. The remote services proxy 210 includes a proxy deamon 1420, as well as a plurality of IPC handlers 1422a, 1422b coupled to respective integrator API's 430. The proxy daemon 1420 is coupled to a communications module 1428 which includes a routing module 1430, a queuing module 1432 and a communications/encryption module 1434.

Communication between the integrator API 430 and the remote services proxy 210 is via an Inter-Process Communication (IPC) mechanism, local to the host, which is platform specific. For example, on a system running a Unix type operating system, this communication might be via shared memory, message queues, unit-domain Berkley System Design (BSD) sockets or named pipelines. Alternately for example, on a system running a Windows NT operating system, this communication might be via shared memory, named pipelines or COM.

While the communication between the proxy daemon 1420 and the remote services proxy 210 stays local to the host, the communication between the proxy daemon 1420 and the agent or system management may use networked IPC.

The remote services proxy daemon 1420 is tightly coupled to the proxy 210 and provides infrastructure management services to the proxy 210, such as software upload, software updates and proxy status.

Figure 15:
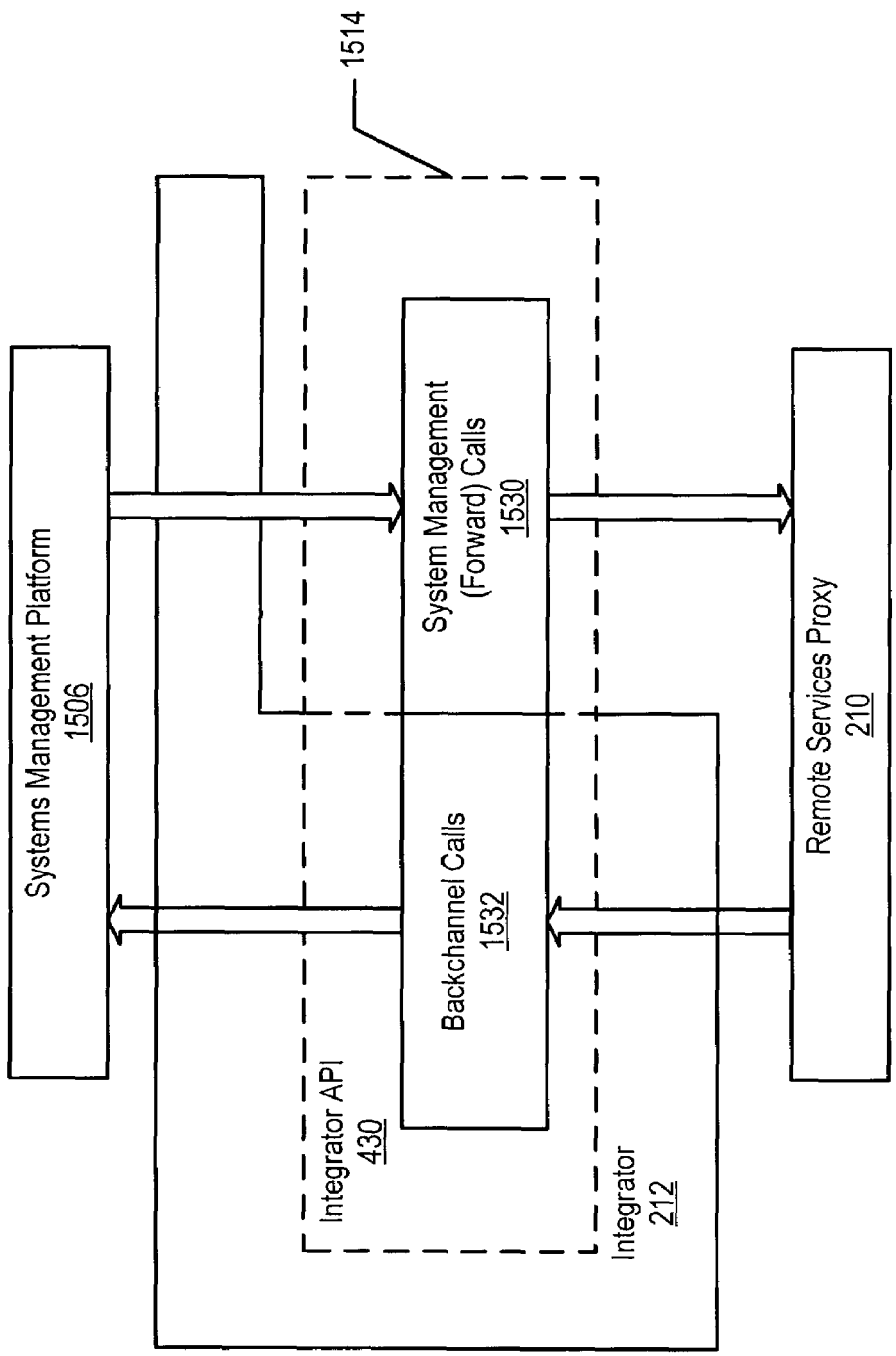
FIG. 15 shows a block diagram of the communications between a system management platform and a remote services proxy.

Referring to FIG. 15, the system management integrator API 430 provides a mechanism by which data can be sent from the systems management platform 1506 to the remote services system 100 and received by the systems management platform 1506 from the remote services system 100.

There are two components to the system management integrator API 430, a forward calls component 1530, which provides forward calls from the system management platform 1506 to the proxy 210, and a back-channel calls component 1532, which provides back-channel calls from the proxy 210 to the system management platform 1506. The forward calls component 1530 is implemented by the service provider. The back-channel calls component 1532 is implemented by the developer of the integration module.

Bindings are provided for the systems management integrator API 430 in both the C programming language and the Java programming language. Bindings for other programming languages may also be provided. The access to the IPC facilities, the Java binding may use native Java calls such as Java Native Interface (JNI) calls.

The systems management integrator API 430 provides generic message interfaces as well as some more specific interfaces (such as, e.g., sendEvent and sendAlarm). The more specific interfaces are provided so that messages can be wrapped to make it easier for services modules 103 on the MLM's to determine whether or not the service module needs to handle the message without detailed introspection of the message contents.

The systems management integrator API 430 provides function calls which facilitate generating appropriate XML headers for the message to be posted to the remote services system 100. For example, to send an event, the systems management integrator API 430 provides a function which includes parameters for the event type, severity and state.

While Alarm and Event are two specific types of messages which can be sent to the remote services system 100, the generic message is simply data. Because the service modules 103 running with the remote services application server 226 need to know about a particular message to determine whether or not the service module 103 should process the message, it is important that the class of the data is set. The classification and sub-classification of these generic messages is a responsibility of the integrator 212 and is set by the parameters in the API call: sendData. Because the integrator 212 itself does not know about all different data types, it is the function of the integrator 212 to get the data class and subclass (if any) from the systems management platform 1506 before calling the setData API call. In some cases, the class may be the name of the module from which the data originated, on other cases, the class may be the systems management platform name itself (for e.g., simple data collectors).

Although the name and version of an integrator 212 are sufficient to identify the capabilities of the module to the application server 226, the systems management platform 1506 too may have capabilities which change over time. For example, an integrator 212 may get loaded into an agent to provide, e.g., patch management capabilities. The capabilities may be required by certain service modules to provide a service. However, unless the service module 103 can find out what the capabilities are from the system management platform 1506 (or agent), the ability of the service module 103 to take actions may be limited.

Accordingly, the systems management integrator API 430 provides support for declaring the capabilities of a support instance at registration time and for the request of the capabilities through a back-channel request at any time thereafter. The back-channel request is serviced by a forward-channel message containing the requested capabilities.

A capability set is described by a well formed XML string (e.g., a char * string) which is generated by the integrator 212 or by the systems management platform 1506.

Where return values in the C API programming language calls are shown as int, the return values follows the standard Unix pattern: 0 for success; −1 for errors which relate to parameter values (the global variable errno is set to indicate the nature of the problem more precisely) −2 for errors which occur as a result of some infrastructure problem either in the remote services proxy 210 or in the system management integrator API 430 (the srserrno global variable is set to indicate the nature of the failure).

Referring again to FIG. 14, the remote services proxy 210 enables multiple integrators 212 running on the same host to connect through a shared service layer to the remote services system 100. The remote services proxy 210 also provides a means by which requests from the remote services system 100 to the systems management platform 1506 can be received and routed correctly. The proxy 210 is fast and lightweight by running in native code on the host.

On startup, the remote services proxy 210 consults its configuration file (persistent data) to determine whether or not the remote services proxy 210 needs to register itself with the remote services system 100.

If the remote services proxy 210 has not previously registered, the remote services proxy 210 sends a registration message to the remote services system 100 through the preconfigured communications module 214.

In session mode (i.e., there is a forward and back-channel for messages), the remote services proxy daemon 1414 expects to get a positive acknowledgement of registration before the proxy daemon 1414 begins full operation. Receipt of positive acknowledgement is stored in persistent data of the remote services proxy 210. Where there is no back-channel capability, however, (i.e., the system is in message mode) the remote services proxy 210 determines whether session or message mode is active through the communications layer API 440.

In session mode, the remote services proxy 210 accepts connections from integrator 212 and queues (where necessary) registration requests of the integrators 212. All other API calls which send data are accepted by the remote services proxy 210, but the data is silently dropped until such time as the positive acknowledgement to the proxy registration is received from the remote services system 100.

When the proxy 210 is expecting acknowledgement of its registration request, the acknowledgement is received in a back-channel call from the remote services proxy's heartbeat to the intermediate MLM 216. A positive acknowledgement contains default configuration information for the proxy 210. When waiting for acknowledgement, the number of heartbeats that the remote services proxy 210 waits before resending the registration request is configurable, but has a predefined default.

When starting, an integrator 212 registers itself. The integrator 212 sends a registration request containing its name and version through the integrator API 430 to the remote services proxy 210. Upon receipt of this request, the remote services proxy 210 first checks its cache (persisted to the local file-system) to determine whether the integrator 212 had previously registered with the remote services system 100. The content of the cache entry contains the remote services ID of the integrator 212. If there is an entry in the cache for the integrator 212, an opaque value is returned to the integrator 212 for the integrator 212 to identify itself in future communications with the remote services proxy 210. This value is constructed either from the remote services ID of the integrator 212 or from the name and version of the integrator 212 or a combination of the two.

The integrator 212 not appearing in the cache indicates that either the integrator 212 was never registered or that the cache configuration was deleted or lost. In this case, the remote services proxy 210 allocates a remote services ID for the integrator 212 and sends this, together with other information (e.g., module id, version) to the remote services application server 226 in a registration message.

In a deployment which uses message mode, the integrator 212 may send data as soon as the registration message has been sent. This is because there is no way for the remote services proxy 210 to know whether or not the registration was successful as there is no back-channel communications. The application server 226 drops data from unregistered proxies/integration modules and notifies the customer of any corrective action through an administration portal.

In a deployment which uses session mode, the integrator 212 is not permitted to send data to the remote services system 100 until a positive acknowledgement of the integrator's registration has been received from the remote services application server 226. Registration of support instances are queued by the proxy 210 and sent upon confirmation of registration of the integrator 212. The remote services proxy 210 rejects all other requests from the integrator 212 with an appropriate error condition.

The next stage of the registration process is for the integrator 212 to register all support instances that the integrator 212 is managing. A support instance is a device, host or software component which is being managed by the systems management platform 1506 to which the integrator 212 is connected. Registration of support instances allows the remote services system 100 to perform entitlement checking against the instance and the services being provided to the customer and enables the remote services system to send data or instructions to that particular support instance to provide a particular service action.

The process of registration of a support instance is similar to the process for integrator registration. That is, the integrator 212 sends a registration request for the support instances to the remote services proxy 210. The proxy 210 checks its persistent cache to determine whether or not the support instance has previously been registered, and if not, sends a registration message to the remote services system 100. However, if the integrator 212 has not successfully registered and the remote services proxy communications are in session module, the support instance registration requests are queued on the proxy 210 and only sent when acknowledgement of the integration module registration is received.

A consideration when registering a support instance is if two different integrators 212 are registered through the same proxy 210, it is possible that the same support instance will be monitored by both systems management platforms. It is also likely in this case that both systems management platforms will have a different identifier for the support instance. It is important for the remote services system 100 to be able to determine the case when two different support instance id's refer to the same support instance for consistency (especially in monitoring). Thus, when support instance registration is performed for the second (and subsequent) integrator 212 to register through the proxy 210, the application server 226 accepts the registration, but notifies the customer through a customer portal that the customer needs to correlate (where necessary) the new support instances with those already registered. That is, link common support instances with different id's.

Support instance registration occurs dynamically during the lifetime of the integrator's 212 connection to the system management platform 1506. For example, when a new agent (i.e., support instance) is added to the system management topology, the system management platform notifies the integrator 212 which then sends a registration request for that support instance. The integrator 212 only registers support instances which have an agent installed.

When a support instance is registered, the registration is cached to a local file system (as happens with the integration module registration) to save the proxy 210 from having to reregister support instances each time an integrator 212 is started. A mapping is also generated to enable the proxy 210 to route request to the support instance through the correct integrator 212. This mapping is cached (in memory) for the life of the proxy 210, but is not persistent across sessions (the mapping is recreated when an integrator 212 next registers, which happens if either the proxy 210 or the integrator 212 is restarted). The mapping of all support instances for a particular integrator 212 is cleared when the integrator 212 disconnects from the proxy 210.

To facilitate the registration of large numbers of support instances without causing massive network usage overhead, the integrator API 430 supports a call to register multiple support instances in one request. The proxy 210 handles this call by creating a single registration message including all of the support instances had not previously registered.

When the integrator 212 is notified that a support instance has been removed from the system management's topology, the integrator 212 sends a deregistration event to the remote services system 100. The deregistration event causes the support instance's id to be removed from the local (persistent) cache of the proxy 210 and is sent on to the remote services system 100, where the support instance data structure is marked as removed (or inactive) indicating that the support instance is no longer to be monitored.

The support instance data model is not removed from the database at this point because, although the support instance is no longer active, the support instance may be being reinstalled or down for maintenance. Additionally, even after being removed, it is likely that the customer will want to be able to see reports on the activity of the support instance.

When the application server 226 has marked the support instance as removed, the application server 226 sends a message to a customer administration portal asking the customer whether the support instance is to be removed permanently. If the customer acknowledges this, there is a grace period before the support instance and all of the data associated with the support instance is removed from the database. During the grace period, the customer can revoke the removal request. Additionally, once removed from the database, it may still be possible to retrieve the support instance data from an archive.

In addition to the removal message sent to the customer administration portal, an audit record is logged indicating the time and date at which the support instance was marked as removed. The audit record ensures that any issues arising from missed alarms for that support instance can be tracked.

Referring again to Figure M, the remote services proxy 210 uses queuing module 1432 to provide persistent queuing of requests to be sent to the remote services system 100. Accordingly, in the event of a temporary network outage, or the failure of a local or remote MLM, data is not lost.

The queue of messages is managed according to the time to live (TTL) precedence and persistence attributes specified in the quality of service (QoS) parameters in the API calls by the integrator 212. Higher precedence messages are inserted toward the front of the queue and lower precedence messages toward or at the end of the queue. A new message with the same precedence as a previously queued message is queued behind the earlier message. Accordingly, correct delivery order for messages such as events, where the order could be important for correlation or aggregation purposes in the MLM is maintained. Queue persistence is implemented using the file system of the remote services proxy host.

The proxy 210 tracks the sizes of all queued messages and limits the total size of the queue according to a configuration parameter. When the queue reaches its upper limit, the queue is managed according to the following queue management method (until enough space is freed for the new message).

The proxy 210 first locates the oldest message whose TTL has expired and discards this message. Next, the proxy 210 locates the oldest message whose precedence is bulk and whose persistence is set to normal, and discards this message. Next the proxy 210 determines whether the new message's precedence is bulk and discards this message. If the new message's precedence is urgent, then the proxy 210 locates the oldest message whose precedence is normal and whose persistence is normal and discards this message. Finally, if none of these criteria are met, then the proxy 210 rejects the new message.

The rejection of an incoming message has consequences which may impact service delivery, accordingly, this rejection is considered an error condition by the proxy 210 (perhaps indicating that an MLM has failed or been moved without the proxy configuration being updated.) The proxy 210 uses separate size limits for each message priority as well as aggregated limits. Where separate size limits are used, the queue management method is modified accordingly.

The proxy 210 also supports data throttle using the queuing module 1432. The throttle control includes a plurality of throttle parameters including the maximum number of bytes per time period (e.g., hour/day), the maximum number of bytes per message, and the maximum number of messages per time period. The throttle control provides a manual start stop interface to allow system administration control over when data can be sent. Any or all of the throttle parameters may be set to unlimited, which is the default configuration.

All messages passing through the remote services proxy 210 to the MLMs include a unique remote services identification number in the message header. The identification number is used by the remote services system 100 both in acknowledgement packets and for marshaling of specific operations (such as request to send bulk data).

All packets received on the back-channel by the proxy 210 include a destination designator, which is the remote services ID of the intended recipient. This destination information is looked up in the proxy's map of integrator 212 so that the packet can be forwarded to the appropriate module.

The proxy 210 may also be the recipient of data from the remote services system 100. Thus, the proxy 210 includes a specific integrator 212 to handle data intended for the proxy 210. A destination designator is used to address the proxy's own integrator 212 to allow for consistent treatment of modules by the proxy 210.

There are a plurality of routing exceptions with which the proxy routing handler deals. These routing exceptions include when the destination field with a remote services ID is not known to the proxy 210 and when the destination field with a remote services ID is known to the proxy 210 but is offline.

The destination field being unknown to the proxy 210 indicates that the message is effectively a misrouted message. The misrouted message is discarded by the proxy 210 and a notification message is sent back to the remote services system 100 so indicating.

The destination field being offline indicates that the message was correctly routed. However, the integrator 212 which is the destination is disconnected from the proxy 210 for some reason. The message is queued in a simple queue and delivered when the integrator 212 next connects. Configuration parameters for the proxy 210 indicate the amount of time such a message should be queued before being discarded. If the message is discarded, then a message is sent back to the remote services system 100 so indicating.

Data received on the back-channel for routing is run through an XML parser on receipt for a check on well-formattedness of the XML. This check relieves the load on the integrator 212 by providing the integrator 212 with well-formed XML.

The majority of the data forwarded by the proxy 210 is in small packets (e.g., a few Kbytes) in response to events in the system management platform. However, there are services which require the transfer of bulk data which may have significant size.

The impact of transferring multi-megabyte files through the MLMs could impact the ability of the infrastructure 102 to deliver more time critical information. Thus, the method of transferring bulk data from the proxy 210 is slightly different to the method for transferring smaller packets.

More specifically, when transferring bulk data, the proxy 210 first sends a small request packet to the remote services system 100 containing information such as the type of the data (for determining the services module(s) which are interested) and the amount of data. The remote services system 100 responds with a packet containing the identification number of the original request and a URL to which the data should be directed. This URL could be on the intermediate MLM 216. Upon receiving this information, the proxy 210 initiates a new connection to the specified URL and begins transferring the data.

The status returned by the MLM in response to a request for bulk transfer of data is okay, deferred or rejected. With an okay status, the request is accepted and the proxy 210 now sends the data. The content of the acknowledgement message also includes a URL to which the data is to be sent.

With a deferred status, the request is deferred because the MLM or application server 226 is unable to process the request at this time. The reason for the deferral is detailed in the deferral response. In the case of a deferral, the proxy 210 re-queues the bulk transfer request so that the request is sent with the next heartbeat to the MLM. The proxy 210 logs all deferred requests. The number of times that the proxy 210 attempts to send data before aborting the transfer is configurable. If the transfer is aborted, this information is logged along with the details of the message and the reason for the deferral and the message is discarded.

With a rejected status, the request is rejected by the MLM or application server 226. The proxy 210 removes the bulk data message from its queue and logs that the request was rejected. The rejection message contains a code indicating the reason that the request was rejected. This reason is recorded by the proxy 210.

Similarly, in response to the actual bulk data transfer, the recipient sends a message with the status of the transfer. The status may be okay or rejected. An okay status indicates that the transfer was successful. A rejected status indicates that the bulk data transfer failed. The rejected message contains an error indicator which is logged by the proxy 210.

For availability purposes, the proxy 210 sends a status heartbeat back to the remote services system 100 at regular periods. The period depends on the deployment model and the communications module in use. The period is configurable. Where the communications module 1428 allows for back-channel communications, the proxy 210 may receive a back-channel request when sending out the status heartbeat message. The proxy 210 makes a regular callback on the back-channel of the integrator API 430 to each of the integrators 212 which have registered with the proxy 210. This callback requests the status of the integrator 212, the status of the system management platform and optionally the status of each support instance. Once the status has been gathered for all active integrators 212, the proxy 210 adds its own status and sends the entire status as a message back to the remote services system 100.

In the remote services system 100, remote access to customer systems is initiated by the customer, thus ensuring that the customer has control of when and how a support engineer is able to access the customer's systems. The remote access application communicates with the application servers 226 to initiate a session.

A remote access integration module is provided which allows a connection from the remote access application to the proxy 210 for the purpose of establishing the remote access session. The remote access integration module makes a call to the remote services system 100 requesting the remote access session and upon success, passes the connection parameters back to the remote access applications so that the application can establish the link. The communication link may rely on the HTTP proxy running on the intermediate MLM 216 to establish connectivity back to the application servers 226.

It may be necessary for the remote services system 100 to request data from an integrator 212. The integrator API 430 supports this via a managmentAction call. This back-channel API call takes, as parameters, the ID of the integration module or support instance to which the request is to be routed and an XML format string which includes a unique identifier, the request name and any parameters needed. Data to be sent in response to this request is sent on the forward channel (via e.g., the sendData API call) and includes the request identifier to enable a service module 102 or application server 226 to correlate the response with the original pull request.

Occasionally updates from the infrastructure 102 are handled by the proxy 210. Updates handled by the proxy 210 include updates to the proxy itself, updates to an integrator 212, new or updated system management modules and proxy configuration changes. Automatically updating software is often undesirable for many customers without first being able to inspect or be advised of an update. Accordingly installation of any of the updates proceeds upon confirmation by the customer via an administration portal.

When the proxy 210 receives a software update for itself, the proxy 210 saves a copy of its present instantiation and then copies the new software into the place of the original.

The proxy 210 then exits to allow the watchdog to restart the proxy 210. Accordingly, if the proxy update fails or is accidentally killed, the original proxy can be restarted.

Because the integrator 212 may be a component of the systems management platform 1506, it may be difficult to update this integrator automatically unless provided for by the systems management vendor. Each integration module includes a capability which determines whether or not the integration module can be updated automatically. If this capability is defined, this functionality is provided for in the integration module's API. The integration module itself then receives the notification of the update via the API and is responsible for locating, installing and starting the update. When an integration module cannot be updated automatically, the customer is notified of the update via an administration portal and is provided instructions (or a script) to perform the update manually.

Not all systems management platforms 1506 support loading of modules into an agent layer, and even those that do may not support the loading programmatically.

The systems management platforms 1506 that do support programmatic loading of modules provide an implementation for the appropriate API call in the integrator API 430. The proxy 210 may then call this API when a new module is to be loaded. To save passing large volumes of data through the API, a file name (or URL) may be passed to the integrator 212. The integrator 212 is then responsible for loading and processing the update. Where the systems management platform 1506 does not support programmatic loading of modules, the customer is advised of a new module (or update) via the administration portal and is provided instructions (or a script) via which the module can be manually added.

Occasionally, the configuration of the proxy 210 itself may be updated. The update may be as a result of a change of communications (e.g., encrypted vs. not encrypted) or to allow new queuing or throttle thresholds to be set. The proxy 210 receives the configuration changes and applies them to its persistent configuration files before reconfiguring itself with the new parameters.

The remote services proxy 210 has two primary functions, to receive and forward messages from integrator 212 and to receive and forward back-channel messages. The functions overlap. More specifically, when a message is received from an integrator 212, the message is placed in the proxy's outbound queue for sending. This allows the receiver to rapidly turn around processing of the incoming data from the integrator 212 without having to wait to send and get a response to the message. Accordingly, the proxy 210 uses two threads: a receive and queue message from integrator 212 thread and a send queued messages and receive back-channel messages thread.

The send queued messages thread creates temporary threads as necessary to forward back-channel requests to the integrator 212. The maximum number of temporary threads simultaneously running is a configurable parameter. In one embodiment, the default number of threads is five threads. A temporary thread is not used in deployments which use Email as the transport protocol.

In addition to the two threads discussed, a periodic temporary thread is created from the mean thread of the proxy 210, the periodic thread is responsible for gathering status information from the integrator 212, incorporating its own status and then queuing this message as its heartbeat to the MLM. Also, when a bulk data transfer is to be performed, a temporary thread is created to send the data. This temporary thread is because there may be a lot of data to send over a relatively slow connection and it is not desirable to block the sending of an urgent alarm when sending this data.

The remote services system 100 may include built-in redundancy to ensure continuity of management even in the event of the failure of the primary management server or agent. The remote services system 100 operates and integrates with such redundant systems seamlessly.

Integration with such redundant systems is via multiple integrators 212, each attached to a different proxy 210. Thus, a redundant communication channel is created that feeds the application servers 226. The application servers 226 then remove duplicated messages. When deploying such a system, the customer first deploys a first proxy and its integration module linking the proxy 210 to one of the redundant agents or system management platforms. Then, the customer creates a second proxy 210 and declares the second proxy object as a redundant instance of the existing proxy 210.

When the second proxy is defined in the data model, the second proxy is installed by the customer using the correct configuration. When the secondary proxy is installed and connected to the remote service system 100, the customer can install the integration module and link the integration module to the redundant instance of the agent or system management platform.

Support instances are registered independently by each integrator 212. However, the application server 226 makes the match between the two remote service IDs based on the external ID used by the system management platform or agent to identify the support instance. This matching enables the application server 226 to remove duplicate messages coming from the same support instance via the redundant channels.

The support instance may exist only on one proxy if a failure happened while the second system was registering the failure. A coherency check tool is provided within the application server 226 to identify such a failure.

With a redundant scheme, during forward data flow messages from the two redundant system management platforms 1506, flow through the remote services system 100 using two different paths. If one system management platform fails, the other continues to feed the remote services system 100. No state of the system management platform is needed within the remote service system. The filtering of the duplicate messages is via the application server 226.

The back-channel of messages for support instances reached through redundant proxies is dynamic. To choose which proxy to use, the application server uses the proxy from which it received the first message from the particular support instance.

The remote services mid level manager (MLM) is a middleware component that manages communications within the remote services system 100. Within the remote services system 100, at a minimum two MLMs are present, an intermediate MLM 216 and a remote services applications MLM 218. Additionally, MLMs running substantially identical services (and located logically at the same point on the path) may be scaled horizontally. The actual number of MLMs used varies depending on the requirements for scalability, network bandwidth, communications auditing, security and quality of service. The MLMs may be classified based upon their location on the communication path and the services that each MLM provides.

The mid level manager is a flexible component that is used at several different points on the communications path between the remote services proxy hosts and the remote services application server 226.

Figure 18:
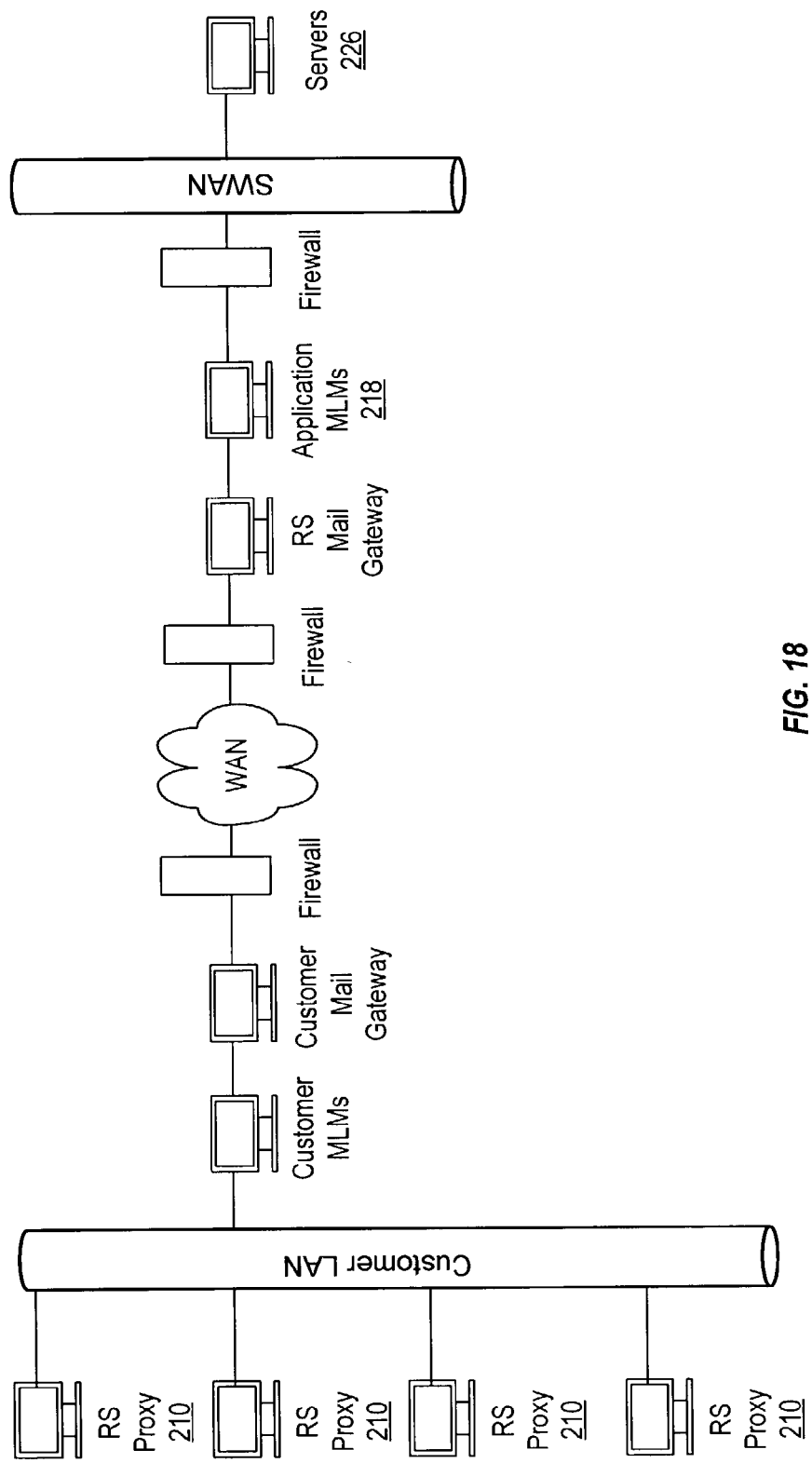

FIGS. 16, 17 and 18 show different deployment architectures for the mid level managers. The term "farms" indicates a horizontally scalable architecture. The number of possible combinations of features and location on the data path is large. To simplify understanding of the possible combinations, distinct combinations, referred to as roles, are defined. The role of a mid level manager is determined by two characteristics: the location of the MLM and the set of services offered by that role that differentiate the role from other roles.

There are at least three different MLM locations as determined by the class of deployment infrastructure: customer, third party service provider, and service provider. When the MLM is located on the customer's site, upstream connections are typically on the customer's local area network. The downstream connection can be via a public WAN. The customer may enable auditing of all communications through an external logging and auditing facility. Locating an MLM at a third party service provider's site enables the service provider with the option of out-sourcing the management of its MLM farms. Both upstream and downstream communications are via a public WAN. When the MLM is located at the service provider, upstream communications is via a public WAN and downstream communication is via a private network. When the MLM is at the service provider location, the MLM is located behind the service provider's firewall.

The mid level manager provides a plurality of services including communication gateway, data filtering and aggregation, data normalization, gateway to the remote services application server and content creation.

The communication gateway function includes concentrating multiple remote services proxy data streams into a single data stream, bulk data transfer gateway and backchannel routing, queuing and delivery. The communication gateway function improves network bandwidth utilization and simplifies the configuration when a firewall or HTTP proxy server is being used.

The data filtering and aggregation function enables the mid level manager to be configured to discard messages (e.g., events) or, in some specific cases, to aggregate messages. Network bandwidth is optimized by discarding uninteresting messages, and customer confidence is improved by blocking the sending of sensitive data to the remote services provider.

The data normalization function enables the MLM to normalize data gathered by the remote services proxy devices into standard forms for communication with the remote services application server 226. This function allows the remote services proxy 210 to be lighter and simpler.

The gateway to the remote services application server function is provided in the final downstream MLM that communicates directly with the applications server, e.g., the applications MLM 218. This function feeds the remote services application server 226 with data received from upstream remote services components and processes the data if needed by the application server 226.

The content creation function is provided in the final downstream MLM that communicates directly with the applications server 226. The content creation function formats service data for presentation to end users. This function thus changes the traditional tightly coupled relationship between an applications server and its web server. This function allows the application servers 226 to scale based on the volume of server data, while the mid level managers scale based on the communications load.

By combining location and services, a plurality of roles may be defined, a customer MLM role, a service provider MLM role, an aggregation MLM role and an applications MLM role.

The customer MLM role supports remote services proxies within the customer's LAN. Aggregation and filtering is enabled. Auditing may be enabled to allow the customer to monitor communications with the service provider. The default security is minimal upstream (on the customer's LAN) and strong downstream (on the WAN). The customer MLM role functionality exists for infrastructure support. The customer MLM may be built to be a full service appliance by layering a series of service modules on top of the customer MLM using the service module API.

The service provider MLM role supports Class A deployments (as shown in FIG. 16) in which the customer has no onsite MLM (i.e., customer MLM). This role is a subclass of a customer MLM role with the difference between the customer MLM role and the service provider MLM role being that strong security is enabled upstream to the customer network.

The aggregation MLM role supports Class A deployments in which the customer has not onsite MLM. Filtering and aggregation are enabled. However, because the aggregation MLM may serve a plurality of customer installations, any filtering or aggregation performed is generic. Strong security is used to prevent access to customer data by unauthorized employees of the service provider.

The applications MLM role provides a data normalization and content generation point for the applications server 226. Strong security is enforced on upstream connections. Downstream connections use the necessary level of security to prevent access by unauthorized employees of the service provider. The applications MLM 218 may include plug-in applications for performing specific tasks.

Figure 19:
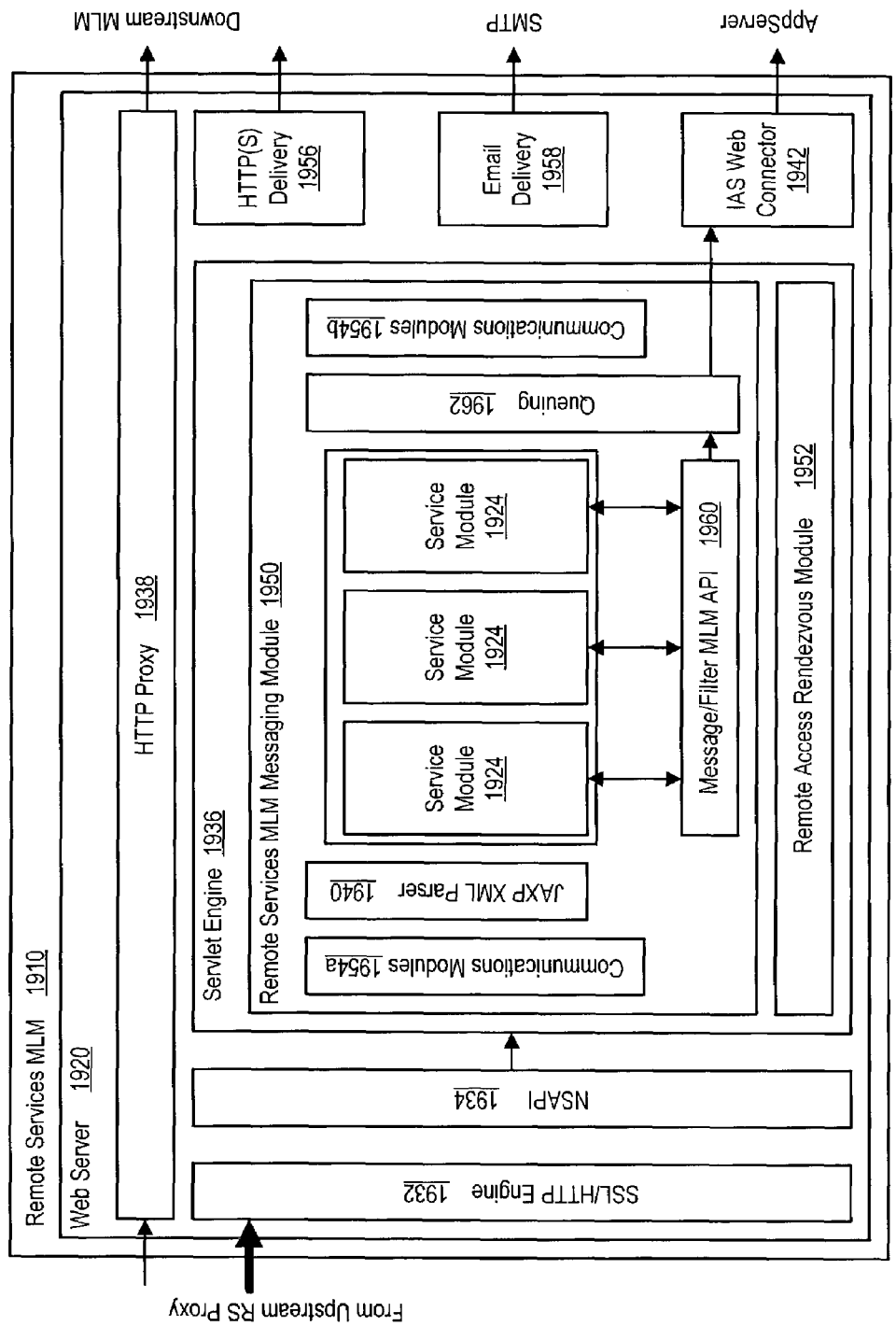
FIG. 19 shows a schematic block diagram of a mid level manager.

Referring to FIG. 19, the mid level manager 1910 includes three sections, a Web server components section 1920, an MLM infrastructure components section 1922, and a service modules section 1924. The Web server components section 1920 provides common web application services. The MLM infrastructure components section 1922 implements the core services of the MLM 1910. The service modules section 1924 provides the data processing for the MLM 1910.

The Web server components section 1920 includes an HTTP engine 1932, an NSAPI engine 1934, a servlet engine 1936, an HTTP proxy 1938, a JAXP Java XML parser 1940 and an iAS Web connector 1942. The HTTP engine 1932 provides the basic HTTP server side protocol support, including connection scheduling and security (SSL). The NSAPI engine 1934 includes a Netscape server API engine which provides a native API into the Web server for implementing web applications. The NSAPI engine offers higher performance than a servlet or CGI interface, but is not as portable. The servlet engine 1936 provides an API for writing portable web applications. The servlet engine 1936 is preferably a Java servlet engine. The JAXP Java XML parser 1940 is a standard J2EE XML parsing service. The iAS Web connector 1942 provides a high speed load balanced communications between a web server and an applications server.

The MLM infrastructure components section 1922 includes an MLM messaging module 1950 and a remote access rendezvous module 1952. The MLM infrastructure components section 1922 also includes communications modules 1954*a*, 1954*b* and delivery agents 1956, 1958. The MLM messaging module 1950 further includes a Message filter module 1960, an aggregation queue module 1962 and a services container 1964.

The MLM messaging module 1950 supports reliable, ordered transfer of short messages between a remote services proxy 210 and the applications server 226. The messaging module 1950 provides an extensibility mechanism, called the remote services container, that allows remote service modules to be loaded and run in the MLM. The container provides all the remote service modules with a consistent interface to the MLM infrastructure features. A message filter allows specific messages to be forwarded to the next MLM, discarded, or diverted to one or more remote service modules 103.

The remote access module 1952 supports requests for fully synchronous bidirectional session between a remote services proxy 210 and the applications server 226. The remote access module is used to get authorization and access parameters to remote access rendezvous servers. Once established, the remote access module 1952 supports interactive services such as remote console login (telnet). The session is first set up with an exchange of short messages between the remote services proxy 210 and the application server 226 via the messaging module 1950. The interactive session may use the HTTP proxy of the MLM to relay the connection to the remote services rendezvous server after authorization.

The communications modules 1954a, 1954b and delivery agents 1956, 1958 encapsulate short messages into XML and send the messages to the next MLM (via HTTP or Email). Alternately, the communications modules 1954a, 1954b and delivery agents 1956, 1958 send messages to the applications server 226. In addition to the delivery agent 1958, when supporting Email delivery of service data, an Email server channel program such as the iPlanet Email server channel program, is used to take delivery of encapsulated short messages and forward those messages into an MLM via the HTTP delivery agent 1958.

The message filter module 1960 is a configurable component that examines the message class, subclass and other message attributes to determine whether to discard the message, forward the message on to a downstream MLM or applications server 226 or to route the message through a service module 103. The service module 103 would then have the option of discarding the message or rewriting the message and then returning the message to the message filter module 1960. All messages received by the MLM 1910 are passed through the message filter module 1960.

When processing a message, all service modules 103 have the option of aggregating the message. The aggregation queue 1962 uses a shared queue to store messages waiting to be aggregated. The queue is shared between all MLMs that are part of the same MLM farm. Heartbeat aggregation is an example of a service module 103 using aggregation.

The service container 1964 is a J2EE type container in which all MLM applications (i.e., service modules 103) are run.

The service modules section 1924 includes a plurality of service modules 1970 that run within the remote service container 1964. The service modules 1970 perform functions such as processing service specific data, making that data available remotely and adding customer value. Most service modules 103 are written by product development teams to integrate a particular management application or service tool into the remote services system 100. However, a basic set of service modules, referred to as foundation services, are implemented as part of the basic remote services system 100.

Additionally, a host system that is running the MLM 1950 may also have its own remote services proxy 210 that gathers service data for the host system. The remote services proxy 210 for the MLM may report to the local MLM or report to a downstream MLM in order to communicate availability data in the event of an MLM fault.

Mid level manager 1910 represents a super set of the components used in each specific mid level manager. For example, a customer MLM does not use the iAS Web connector to communicate with the remote services application server 226. However, the applications MLM 218 would use the iAS Web connector. Alternately, the HTTP Proxy is included only within the intermediate MLM 216, not on the applications MLM 218.

Additionally, the mid level manager 1910 shown in FIG. 19 does not show the handling of back-channel information. Back-channeling is used during session mode communication. Files and short messages are sent down the back-channel for processing either locally by the MLM or for forwarding to the remote service proxy 210 upon its next connection.

Figure 20:
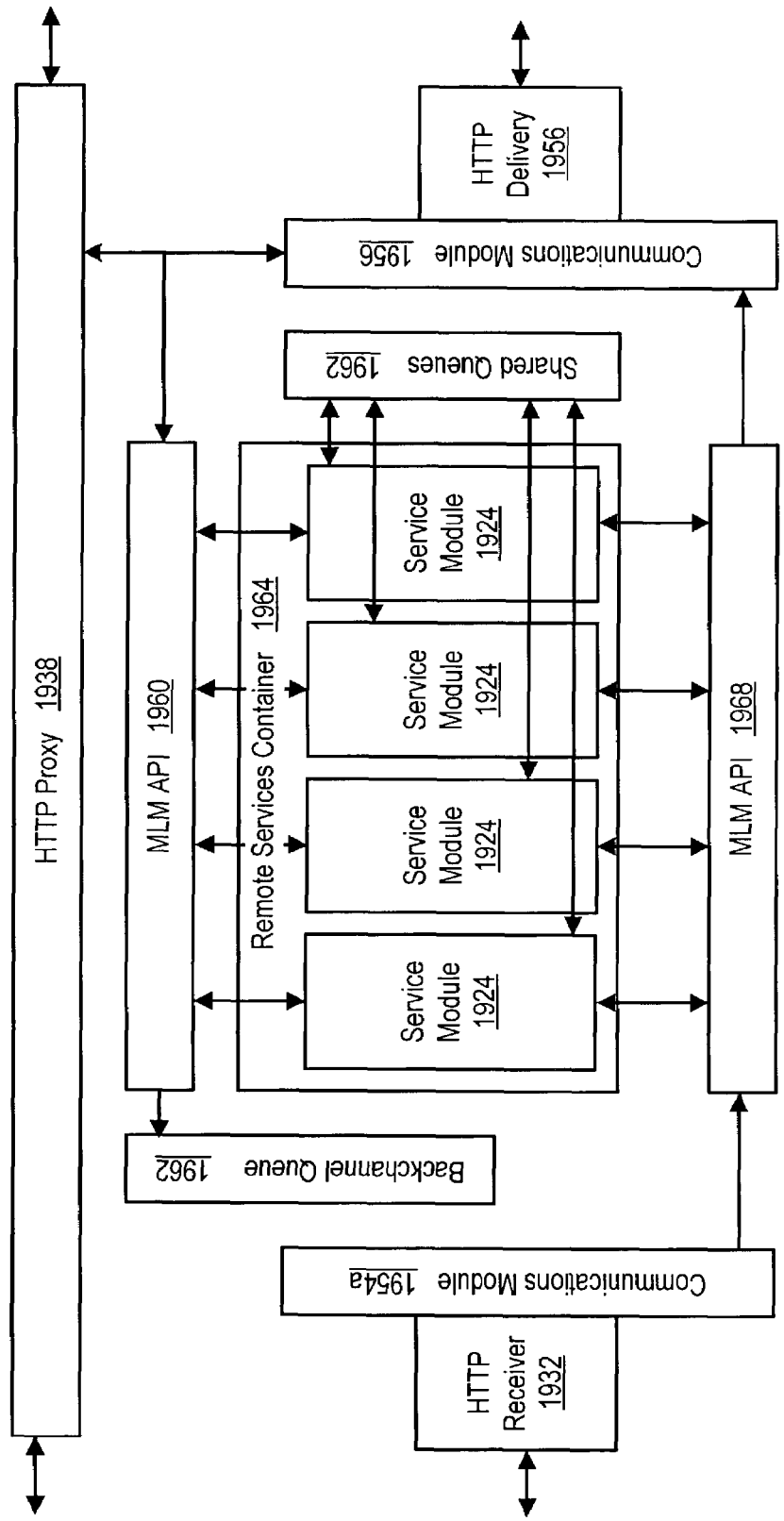
FIG. 20 shows a schematic block diagram of the data flow within an intermediate mid level manager.

FIG. 20 shows the data flow through an intermediate MLM 216. The MLM supports a plurality of different types of communication. The MLM supports a short message protocol, a bulk data transfer protocol, back-channel messages and software or configuration download. The MLM also supports an interactive session protocol and communication with the application server 226.

In the short message protocol XML messages are exchanged. With the bulk data transfer protocol, the connection between a proxy 210, an intermediate MLM 216 and an applications MLM 218 is uses for transferring large data objects. With back-channel messages, the communication mode of the MLM is based on a session mode. The back-channel messages enables the remote services system 100 to transmit messages to the customer via the HTTP back-channel. With software or configuration download is used when the communication mode of the MLM is based on session mode. This download enables the remote services system 100 to update the infrastructure 102. The four types of communication are discussed in more detail below.

The interactive session protocol is an open end to end connection between a proxy 210 and an applications MLM 218. this protocol is used for interactive applications such as a console login. The communications with the applications server 226 uses a web connector.

In all cases, the communication is initiated from the upstream (see FIG. 11). An MLM does not initiate communications with the proxy 210, an applications MLM 218 does not initiate communications with an intermediate MLM 216. Heartbeat messages are important for maintaining communications as the heartbeat messages enable establishing a back-channel communication path.

Because MLMs are the component transmitting and pre-processing data, the MLMs are horizontally scalable to provide MLM farms. Because multiple MLMs are implementing the same logical role, the MLMs share information when needed. The MLMs share a plurality of types of information: session statistics (for throttle control shared queue of short messages (for aggregation) and shared queue of back-channel short messages (for back-channel control).

The information is shared between MLMs from the same farm using the web server's session object. Each short message of a shared queue and the session statistics are represented using session objects and are automatically shared between all MLMs in the farm.

In a bulk data transfer in a farm environment, intermediate MLMs 216 of the same farm share information related to the transfer. More specifically, when an intermediate MLM 216 fetches the bulk data and sends the back-channel short messages to all the final destinations to request the final destinations to fetch the bulk data, the intermediate MLM 216 also stores the bulk data locally on the web server of the MLM and adds a shared session object describing this bulk data, including its local URL, the URL from which the data was fetched (e.g., from the applications MLM 218) and the reference of the bulk data.

When the destination of this bulk message receives the back-channel short message requesting the bulk data, the destination initiates the file download. Because the URL provided refers to the MLM farm, the bulk data transfer may be served by any MLM in that farm.

The MLM which receives the fetch request then looks at the session object to determine where this bulk data is stored, fetches the bulk data and sends the bulk data to the destination. This fetch is local between MLMs of the same farm, on the same LAN and without any network address translation or firewall.

If the MLM is not able to fetch the bulk data, then the MLM which originally fetched the data from the applications MLM 218 is down. In this case, a new MLM in the farm re-fetches the bulk data from the original applications MLM and updates the session object to show the new reference.

When the bulk data transfer is to a group of MLMs which are part of the same farm then the process starts by fetching the bulk data on one of the MLMs. The MLM then creates a session object to indicate to all other MLMs that are part of the same farm that these MLMs should fetch the bulk data. A similar recovery mechanism is used if the original receiver MLM crashes.

All of these bulk data distributions include the notion of acknowledgement of a download which then cleans-up the session object and the temporary fetched file. This acknowledgement includes an exception case where some destinations are not reachable. Providing the session object enables the MLM farms to be fully scalable and redundant.

Referring again to FIG. 12, the remote services infrastructure 102 supports classification of service modules. These classifications are based upon the communications characteristics and data typing of each service module. More specifically, the service classifications are built into the remote services system 100 to provide three functions.

An API function is provided for service creators who are creating services categorized by a service classification. Functionality is built into the infrastructure 102 to assist in the basic needs of the service.

A normalization function is provided to normalize data being sent. For example, the monitoring data classification defines the data types that are passed through the remote services infrastructure, with extensibility for specific service modules 103. This function allows the remainder of the remote services system 100 to manage the data irrespective of the systems management system being used.

A segmentation function is provided which provides segmentation of the communications system. The service classification may be used to model the communications systems within the remote services system 100. For example, remote access uses session based communications.

The service classifications are exposed into the remote services architecture in the remote services proxy 210, the intermediate MLM 216, the applications MLM 218 and the remote services application server 226. More specifically, the remote services proxy 210 constructs the data abstractions through the API calls made to it from the systems management integrator API 430. The intermediate MLM 216 exposes access to the service classifications through the service module API 432 that the intermediate MLM 216 hosts. The applications MLM 218 uses service classifications to decode the information that is arriving from the customer and to construct data that is mostly infrastructure information based for back-channel purposes. The applications MLM 218 uses service classifications to understand the type of communications that are used for the service requirements. The remote services application server 226 uses service classifications to present certain API functionality within the service module API 436.

The data that is sent through the remote services system 100 is separated into the layers set forth in FIG. 12.

To support the management of infrastructure components in the remote services system 100, the remote services API's support a plurality of actions. More specifically, the remote services API's support a heartbeat/getStatus action, a diagnostics action, and a software update action. The heartbeat getStatus action returns the status the various modules within the remote services system 100. The diagnostics action provides diagnostic services including ping (a very basic heartbeat), a cold start trap (when the remote service proxy is brought up) and shutdown (when the remote services proxy is shutdown. The software update action provides software update services to the service module 103, the remote services proxy 210, the integrator 212 and the MLM service module 103.

The remote services API's also supports the additional actions of disabling/enabling a support instance, disabling/enabling of a remote services proxy's forwarding of data, proxy or MLM configuration change, get configuration from system management proxy or MLM and deregister integration module (when the integration module is to be moved, removed etc.).

As shown in FIG. 12, all short messages between the application server 226 and the remote services proxy 210 are in XML format and are in two sections, a header section and a content section. The header represents information about the message itself such as source/destination, routing statistics, message type, etc. The content section holds the actual payload (i.e., the message from or to the systems management platform 1506).

Because the various MLM's may need to perform filtering and/or event aggregation, the actual body (content) of the message is represented as one of the following types: alarm, event, message response, bulk data request, bulk data response or data. An alarm is a systems management alarm. An event is a system management event. A message response is a response to a sent message. A bulk data request is a request to sent bulk data. A bulk data response is a response to send bulk data. Data is generic data content which is specified by class/subclass in the header.

The data type functions as a catch all and has no fields other than the content itself, whereas the other content elements contain specific attributes which allow for introspection for routing and other purposes by a service module 103.

The integrator API 430 is responsible for the creation and formatting of the XML message from the remote services proxy 210 to the remote services system 100. The integrator 212 may or may not send its systems management specific data in XML. However, if the content type is binary, the encoding is specified to ensure that the content can be decoded correctly by the server 226.

A message handling API is provided to simplify creation of and access to the content of a remote services message without the caller having to be concerned about the message format.

The document type definitions (DTDs) for the XML messages are for both forward and back-channel messages. The primary distinction is that the forward channel messages contain a source element which details where the message originated (in the remote services system 100) and some quality of services (QoS) parameters. The Back-channel message, however, contains the destination element which defines how the message is routed through the remote services system.

The envelope of the message wraps one or more remote services messages, each containing a single message header and a single message content element. In a forward channel request, there is typically a single rsmessage element contained in the envelope. However, because a back-channel request contains a response to the sent message as well as zero or more pending back-channel messages, the reenvelope may contain more than one rsmessage. A back-channel message contains at least one message, the response to the sent message.

The envelope is defined using MIME with a multipart/related media type, with each header and body block separated from the rest by a MIME boundary specifier. In specifying the envelope this way, parsing and processing of the remote services message header may be performed independently of the processing of the content. This allows faster handling of message routing, header manipulation and publishing in the application server 226.

The Content-Type header is split into two lines for readability. Each part of the message is separated from the other parts by a MIME boundary. The Content-ID for each part of the envelope defines its contents, either a header or body, together with the message ID.

The message includes a message header DTD and a message content DTD. The message DTD header tag encapsulates a number of elements which describe information such as source and destination, routing statistics and origination. A message includes one header element and one content element.

The content tag encapsulates the actual content of the remote services message. The content tag may be one of a number of distinct types. The specific content types allow service modules 103 in the MLM's to quickly decide whether or not they are interested in the content without having to introspect the whole content and understand the formats used by various system management platforms to represent their messages. The components of alarms and events are encapsulated in the attributes of the body of the content.

The data classification section allows for routing of a message to interested service modules 103 by specifying the message class and subclass. This data is used by the MLM's and service modules 103 to determine whether or not to process the message.

The locator tag contains an enumeration which specifies whether the header contains a source route (i.e., the message originates from the proxy 210) or a destination route (i.e., the message originates from the remote services system 100). For data originating from the proxy 210, the destination is configured into the communications layer and is not known to the proxy itself. Whereas, when a message is sent from the remote services system 100 to a specific integration module, the applications MLM 218 needs to know to which intermediate MLM 216 to route the data. The intermediate MLM also needs to know to which proxy 210 to route the data.

The source tag indicates that the message originates at the remote services proxy 210 and contains some attribute definitions defining where the message originated, together with the version of the originating component. The source element also contains a sub-element which defines some parameters used by the proxy 210 and possibly the MLM's in determining how and when to queue the message. The sub-element is the quality of service element.

The quality of service (QoS) tag defines an empty element with some attributes which help the proxy 210 and possibly the MLM to decide how to queue the message. This tag is valid for outgoing messages from the remote services system 100. The attributes to the QoS tag are expiry, precedence and persistence. The expiry attribute indicates the time at which the data in the message expires. The precedence attribute provides the priority of the message. The persistence attribute specifies whether or not the message should be held in a queue at the expense of others with equal precedence and expiry times.

The destination element is a backward message and its attributes specify the IDs for the customer MLM and proxies to which the message should be routed. Back-channel messages may have multiple destinations as they can be directed to an MLM group or to a proxy group. In case of multiple destinations, the addresses are expanded at the message creation by the remote services system and all the final destinations are entered.

A backward message cannot be targeted to multiple MLM groups and thus, the infrastructure component to reach the final destination is always unique. The one exception when multiple paths are possible is when the destination is a support instance reachable through a redundant systems management system integrated to redundant proxies. When a backward message targets multiple destinations, it is the role of the intermediate MLM 216 to duplicate the message, once per final destination.

The routing element contains information about the route a message takes to and from the proxy 210. The routing element is primarily used for debugging and statistical purposes so that the cause of any holdups in the infrastructure 102 to any customer may be readily determined. All modules which route a message append their own routing element to the message header.

The alarm element represents basic, generic information about an alarm from a support instance as well as any integration module specific information which may be used by the service modules 103 to provide more detailed information to the remote services system 100. Generic alarm information is set as attributes in the element and the textual contents of the element represent the actual alarm message. Integration module specific data is captured through the data sub-element. Data for the alarm element is captured through a sendAlarm function in the integration API.

An event differs from an alarm as the event has no state associated with it. That is, an event is a notification from a support instance of a change of state of some component. The event element encompasses the generic information about an event as its attributes, with the event message being the textual content of the element. Integration module specific content is specified in the data sub-element. Data for this element is captured through the sendEvent function of the integration API.

The message response element functions as a container for the return status of the processing of a message. The message response element contains attributes and sub-elements which specify any error condition and allow the receiver to determine how or whether to try to resend a message.

The bulk data request element specifies a request to a service module 103 (in the application server 226, intermediate MLM 216 or proxy 210) to transfer some arbitrary data whose size is (typically) greater than 4 Kbytes. The service module 103 which receives this request determines whether or not it is able to process the request (from the specified size and class/subclass) and if so, sends back an acknowledgement (i.e., a bulk data response) which indicates the location to which the bulk data message is sent. This location is likely an out of band URL.

The bulk data response element is sent as a response to the bulk data request message. The contents of the bulk data response element are attributes indicating whether or not the request was successful (and if not, why not), a URL to send the bulk data to when the request is approved and the message id of the request to allow the sender to associate the response with a particular request.

The data element is a catch all for any other type of data which is sent between the remote services proxy 210 and the application server 226 (or vice versa). The data element has attributes specifying the MIME type and data size.

The heartbeat or status message from any remote services component to the remote services application server 226 allows the infrastructure 102 to determine what components are alive and to generate notifications when a component or components appear to be failing or failed.

The heartbeat message is a well formed XML structure which is contained in the data section of a remote services message. The MIME type (set in the attributes of the data element) is text/xml. In the header of the message which contains the heartbeat content, the class is sent to infrastructure and the subclass to heartbeat. This enables such messages to be directed to interested service modules 103.

The structure of the message is a hierarchy where each component may be a subcomponent of another if that is how the relationship can be represented by the infrastructure. For example, the status for a proxy 210 includes the status of any integration modules currently registered. Each integration module includes the status of the systems management platform and may also contain the status of any support instances being managed.

Referring again to FIG. 11, dataflow within the remote services system 100 follows one of two paths. The first path is followed by a short message, reaching the remote services system 100 via the remote services proxy 210 to ultimately reach the remote services application server 226. Forward short messages are sent up the tree and no destination is needed to the application server as only one path exists. These messages need not be duplicated. These messages are not intended for multiple destinations, although multiple service modules 103 may ultimately process the contents of the message. In session mode, these communications are synchronous. Back-channel communications follow the other path, from the application server 226 to the remote services proxy 210. The communications may be targeted to multiple destinations and thus may be duplicated.

The remote services system 100 exchanges information between multiple components. The information is classified in two types, a short message type and bulk data type. With the short message type, short XML messages are used to send information harvested by the remote services proxy 210 to the application server 226 to acknowledge receipt of messages or to transmit control messages to request bulk transfer. Bulk data type is used to transfer data whose size is greater than, e.g., a few kilobytes, between both ends of the remote services system 100.

More specifically, a short message can contain monitoring data, such as events or alarms, a response to a message sent in the other direction, bulk data transfer request or response infrastructure control message or other data.

When in session module between components of the infrastructure 102, the delivery of a short message is synchronous between the send and the receiver. Thus, to ensure the delivery of a message, the message sender implements a spooling queue to store messages waiting to be delivered.

Short message content is visible to any component of the infrastructure 102. The components on the transit path of a message may trigger some action based on the message contant or other parameters like communication parameters, throttle, or time of day. These actions can include filtering (e.g., discarding) the message, aggregating the message, modifying the message, or creating a new message.

Aggregation is a special case where multiple messages are replaced by one message. Components implementing an aggregation function accept the message and return to the sender an acknowledgement (if in session mode), store the message in a processing queue, process this queue when the control triggers are reached, create a new message aggregating the queued messages, delete the queue and send the new message. The components that are acting as sender of the new message also provide, as any sender, a spooling queue in case the destination is not reachable.

Figure 21:
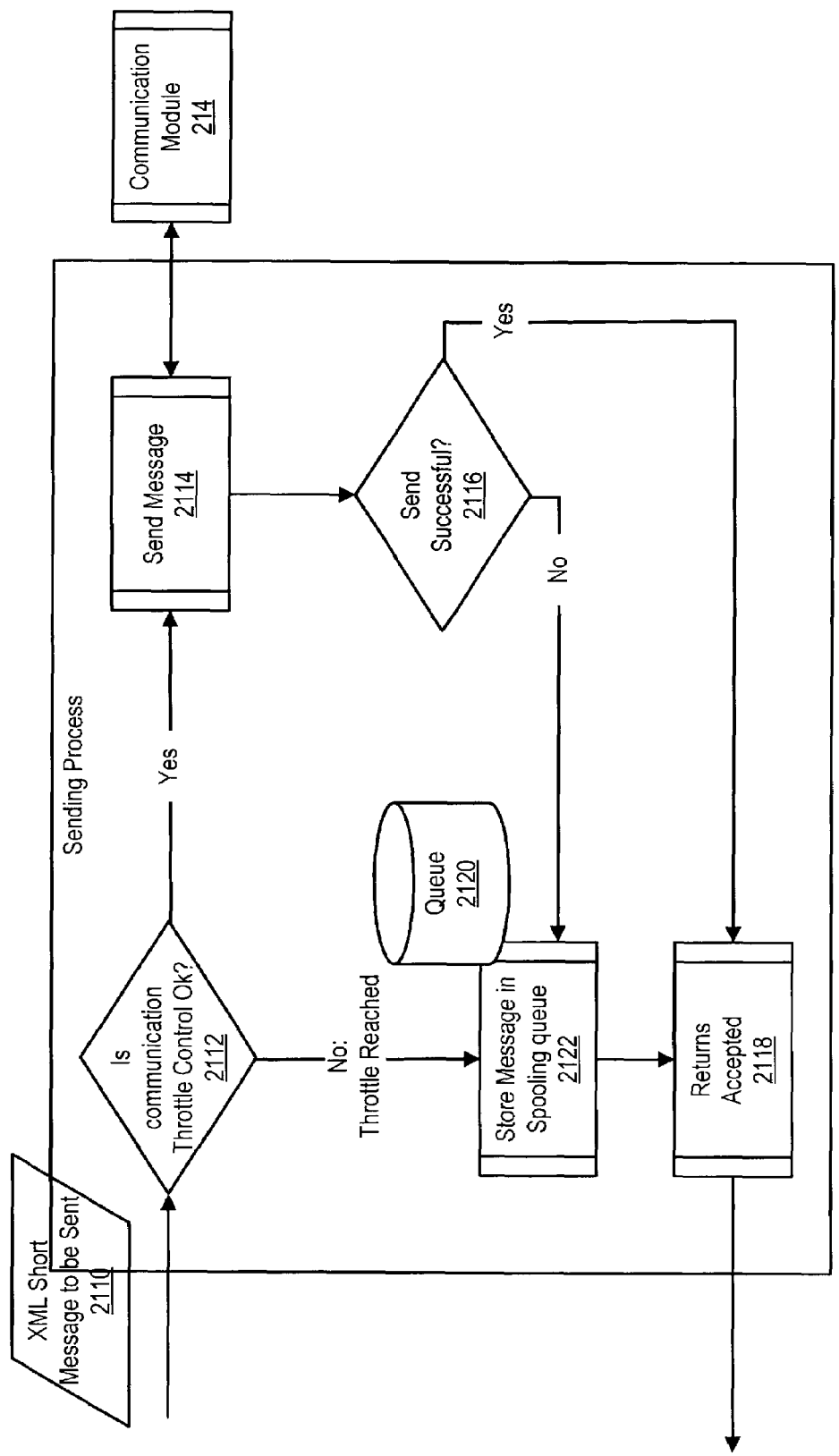
FIG. 21 shows a flow chart of the different tasks associated with the sender of a message.
Figure 22:
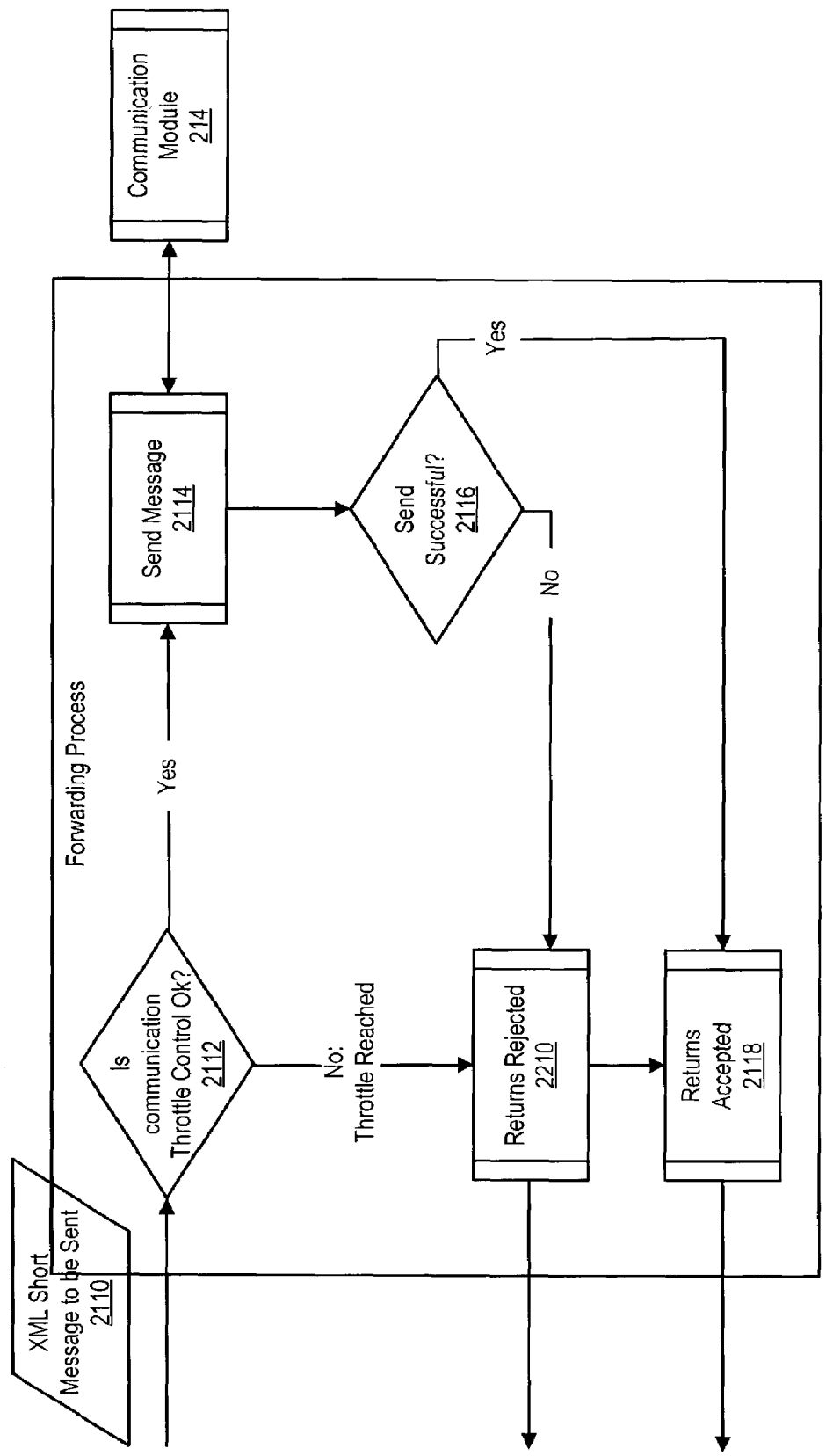
FIG. 22 shows a flow chart of the different tasks associated with a component forwarding a message.

FIG. 21 shows a flow chart of the different tasks associated with the sender of a message. FIG. 22 shows a flow chart for a component forwarding a message. More specifically, when a short message is sent at step 2110, the message is first checked to determine whether the communication throttle control is okay at step 2112. If the throttle control is okay, then the message is sent at send message step 2114 to communication module 214. The sent message is then analyzed to determine whether the send was successful at step 2116. If the send was successful, then the returns accepted message is generated at step 2118.

For the sender of a message, if the throttle control is not okay, i.e., the throttle has been reached, then the message is stored in spooling queue 2120 at step 2122. A returns accepted message is then generated at step 2118. The queue 2120 queues messages ready to be sent waiting for the communication channel to be available. No processing is done on these messages. The queue ensures that each message is delivered to its destination. Because the message is always either transmitted or spooled, the sender never returns a rejected code. It is up to the process managing the queue to return a rejected code whenever a queued message is pruned out.

With a component forwarding a message if the throttle has been reached, the message is not stored within a queue, but is returned to the sender at returns rejected step 2210.

Figure 23A:
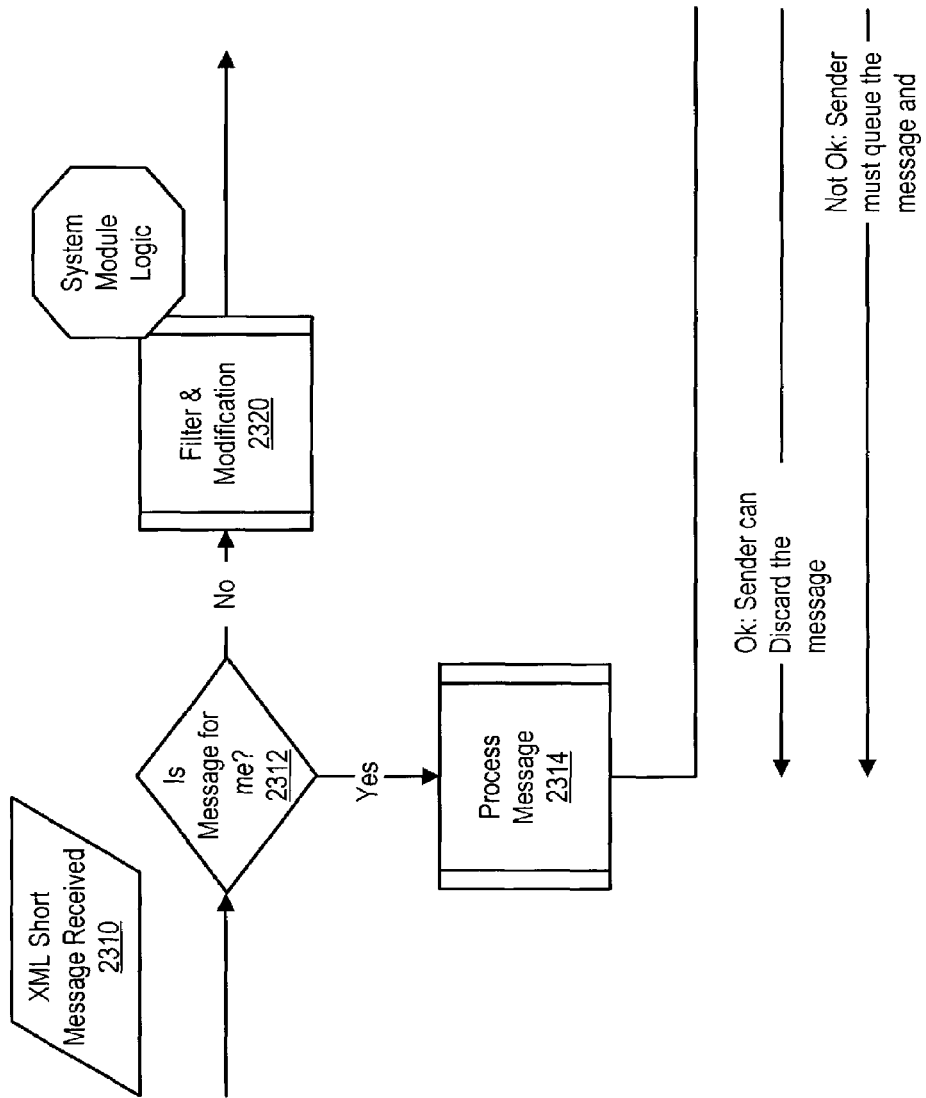
FIG. 23 shows a flow chart of an overview of the data flow of the intermediate receiver of a message.
Figure 23B:
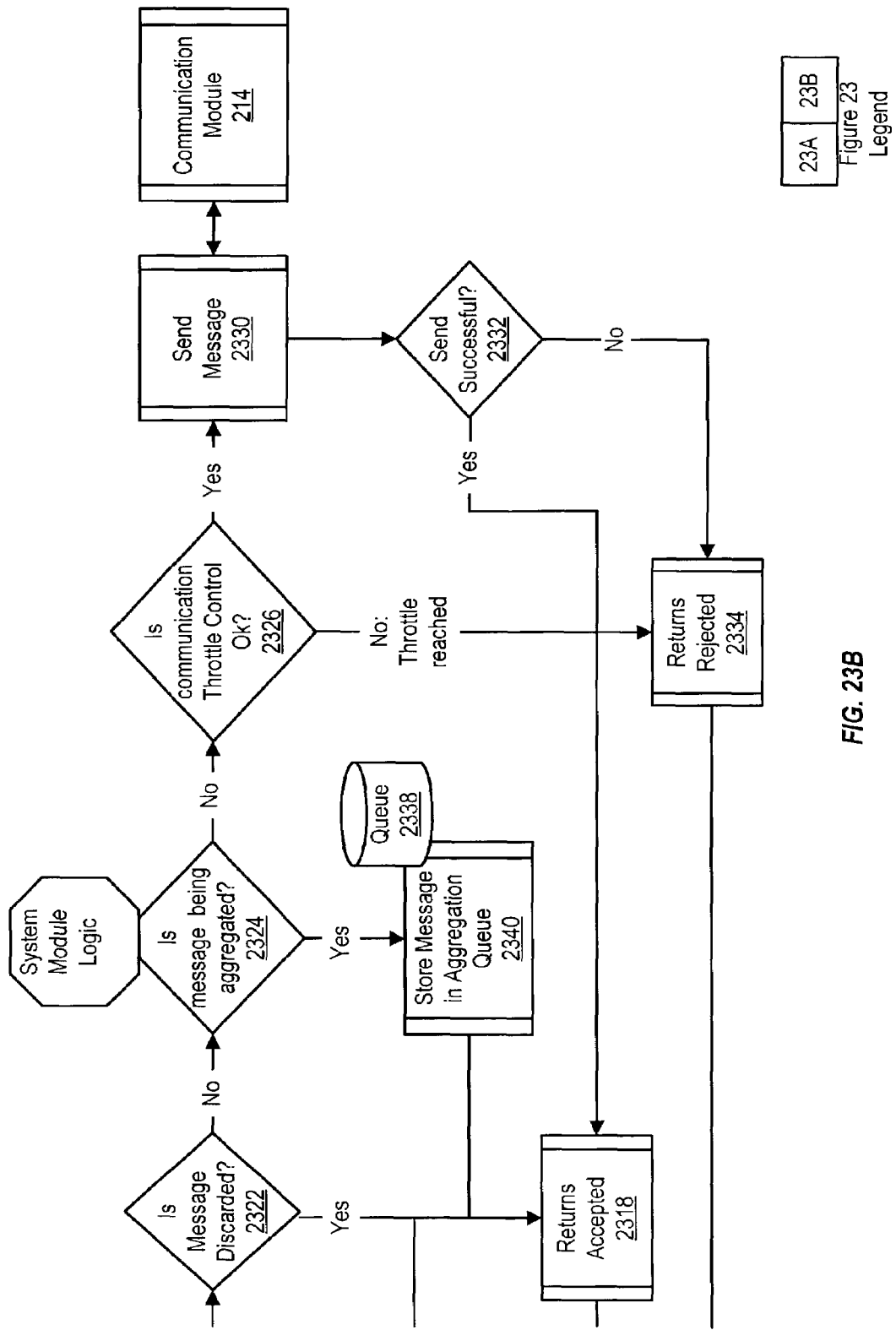

Referring to FIG. 23, a flow chart of the overview of the data flow of intermediate receiver is shown. The path from a sender to the final destination involves the intermediate MLM 216, be it a customer MLM or an aggregation MLM. When the message is received at step 2310, the intermediate MLM 216 determines whether the intermediate MLM 216 is the intended recipient of the message at step 2312. If yes, then the message is processed at step 2314 and a returns accepted message is generated at step 2316, thus indicating to the sender that the stored message can be discarded.

If the MLM is not the intended recipient, then the MLM then performs a filter and modification function at step 2320 using the system module logic of the MLM. The message is then reviewed to determine whether the message is to be discarded as a result of the filtering at step 2322. If the message is to be discarded then a returns accepted message is generated at step D16. If the message is not discarded then the MLM then determines whether the message is to be aggregated at step 2324.

If the message is not to be aggregated, then the communication channel is reviewed at step 2326 to determine whether the throttle control is okay. If so, then the message is sent at send message step 2330 via communication module 214. The message is also analyzed to determine whether the send was successful at step 2332. If the send was successful, then the returns accepted message is generated at step 2316. If the send was not successful, then a returns rejected message is generated at step 2334. The returns rejected message indicates that the sender should queue the message again and retry sending the message.

If the message is to be aggregated, then the message is stored in the MLM aggregation queue 2338 at step 2340. The result of the aggregating is a new message created from the queued messages. To send this new message, the intermediate MLM 216 functions as a sender and thus follows the process with respect to senders described above. The message is then recycled through step 2322 when the message is being aggregated. If the throttle control is not okay, then a returns rejected message is generated by step 2334.

Figure 24:
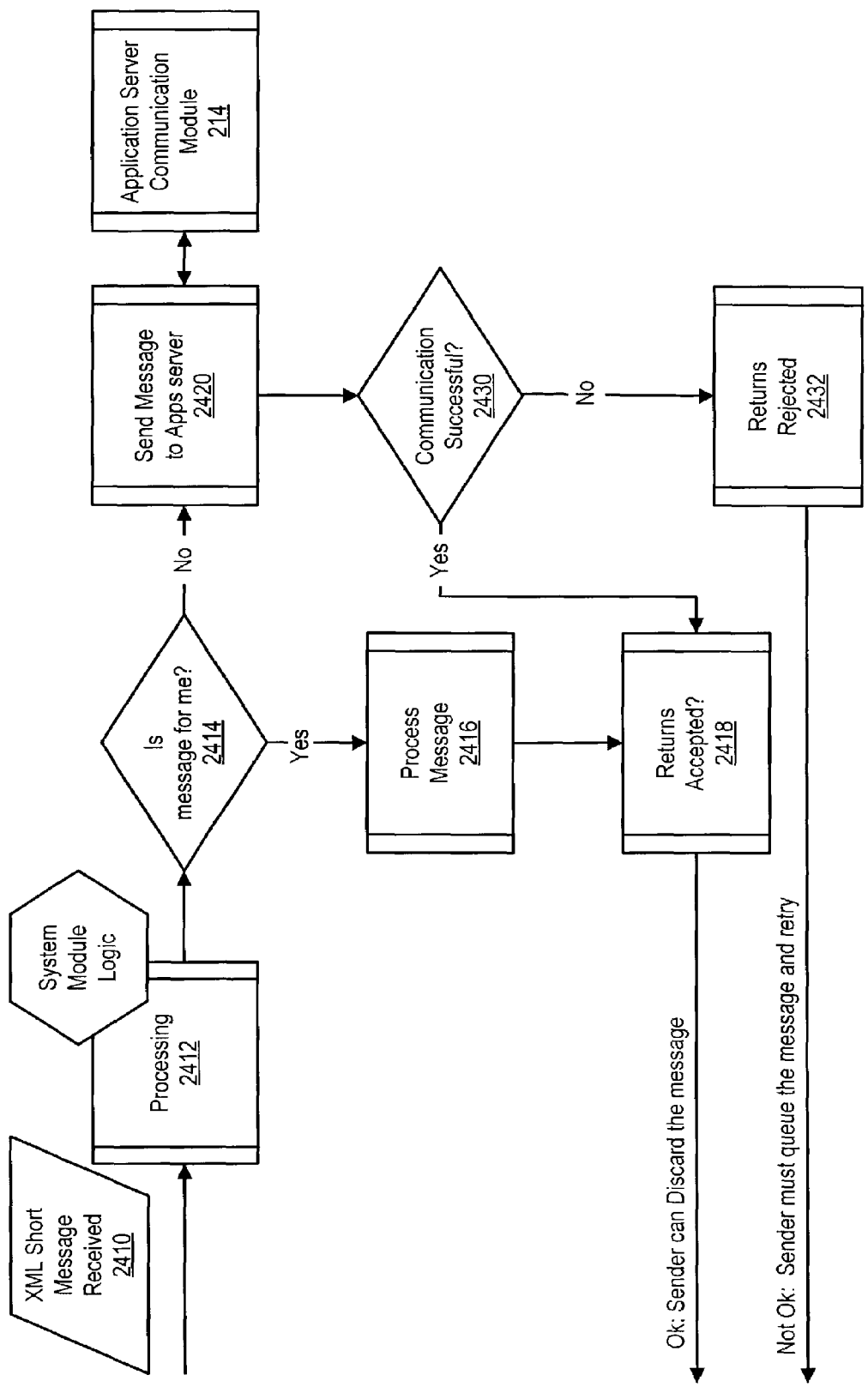
FIG. 24 shows a flow chart of the data flow of receiving a message.

FIG. 24 shows a flow chart of the data flow of receiving a message. The applications MLM 218 is an example of a module that receives messages. Because no aggregating or filtering is done, the data flow is simpler than that of an intermediate MLM. The communication is synchronous and does not involve any queue mechanism.

More specifically, the message is received at step 2410. Initial processing is performed at step 2412 using the system module logic of the receiver. The message is then reviewed to determine whether the receiver is the intended recipient at step 2414. If so, then the message is processed at step 2416 and a returns accepted message is generated at step 2418.

If the applications intermediate MLM 218 is not the intended recipient, then the message is sent to the application server 226 at step 2420 and communicates with the application server communication module 214. If the communication is successful as determined by step 2430, then a returns accepted message is generated at step 2418. If the communication is not successful, then a returns rejected message is generated at step 2432.

Referring again to FIG. 11, messages on the reverse (i.e., backward) path through the remote services system 100 (i.e., from the application server 226 toward the customer network) are transmitted over the back-channel. Back-channel communication applies to session mode communication as the message mode has no back-channel. Some message types (e.g., administrative control or bulk transfer request/response) may have multiple destinations, representing a group. The remote services system 100 optimizes the transfer of such messages to reduce network traffic.

Figure 25:
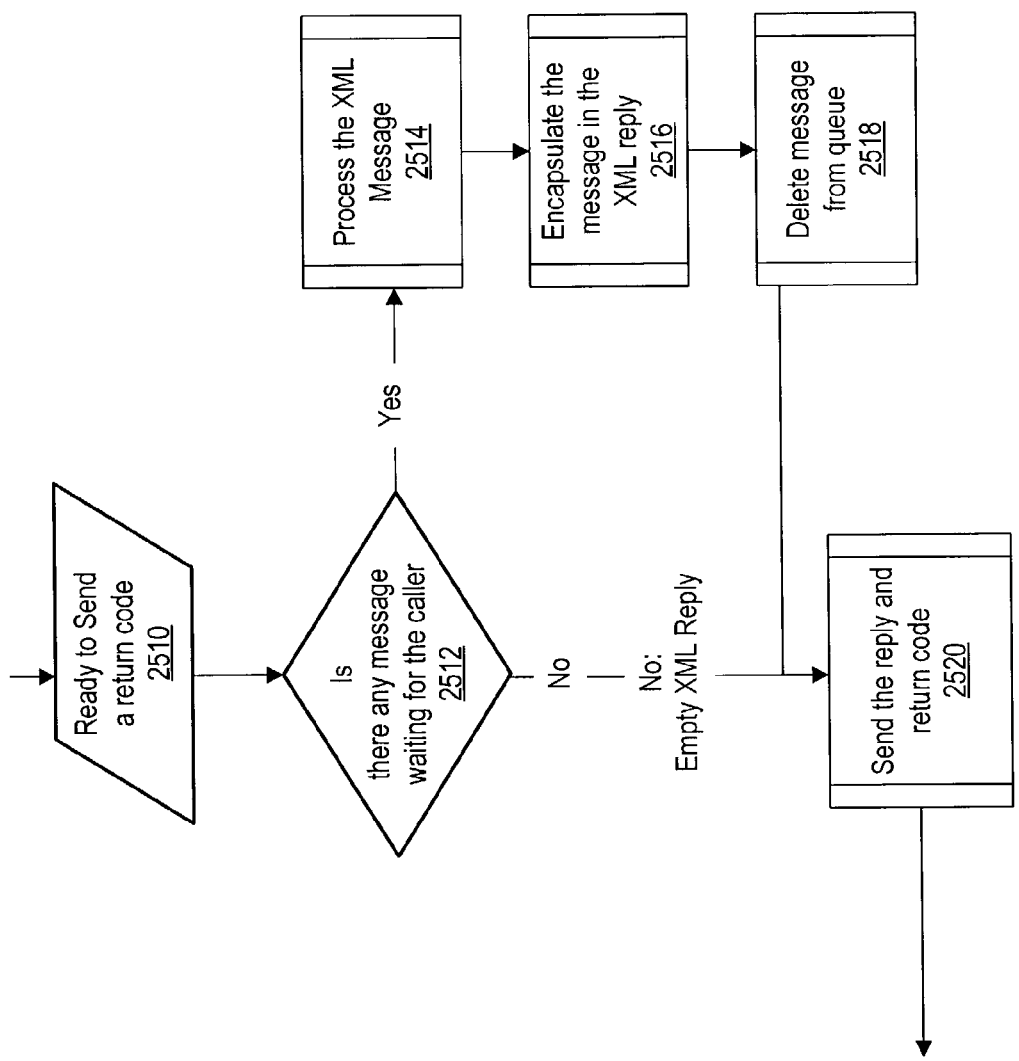
FIG. 25 shows the data flow for the back-channel sending process.

FIG. 25 shows the data flow for the back-channel sending process. Messages are transmitted from a downstream component to the other upstream components over the back-channel. Each HTTP post request may have in its reply a block of data, in this case an XML formatted message.

The back-channel data is transmitted as a reply to an existing request. To send data over the back-channel, the remote services system 100 has, on each component of the path from the data destination to its application MLM 218, to spool the back-channel data until the next component opens a connection. Sending back-channel data is part of the returns steps 2118, 2210, 2316, 2334, 2418, 2432.

During the back-channel process, the component determines whether the component is ready to send the return code at step 2510. In addition to returning the appropriate code to the sender, the component determines whether there are any messages waiting for this sender in reply at step 2512. If there are messages waiting, then the component processes the XML message at step 2514. The component then encapsulates the message in an XML reply at step 2516 and deletes the message from the queue at step 2518. The component then sends the message and return code at step 2520.

If there were no messages waiting, then the component sends the return code along with an empty XML reply at step 2520. Reception of the back-channel message is done while the requester is receiving a return status from a synchronous HTTP command. Back-channel queues are interrogated for any pending messages that belong to the caller. When an intermediate MLM 216 calls in, the intermediate MLM 216 receives all the back-channel messages for any component reachable through that MLM.

Figure 26A:
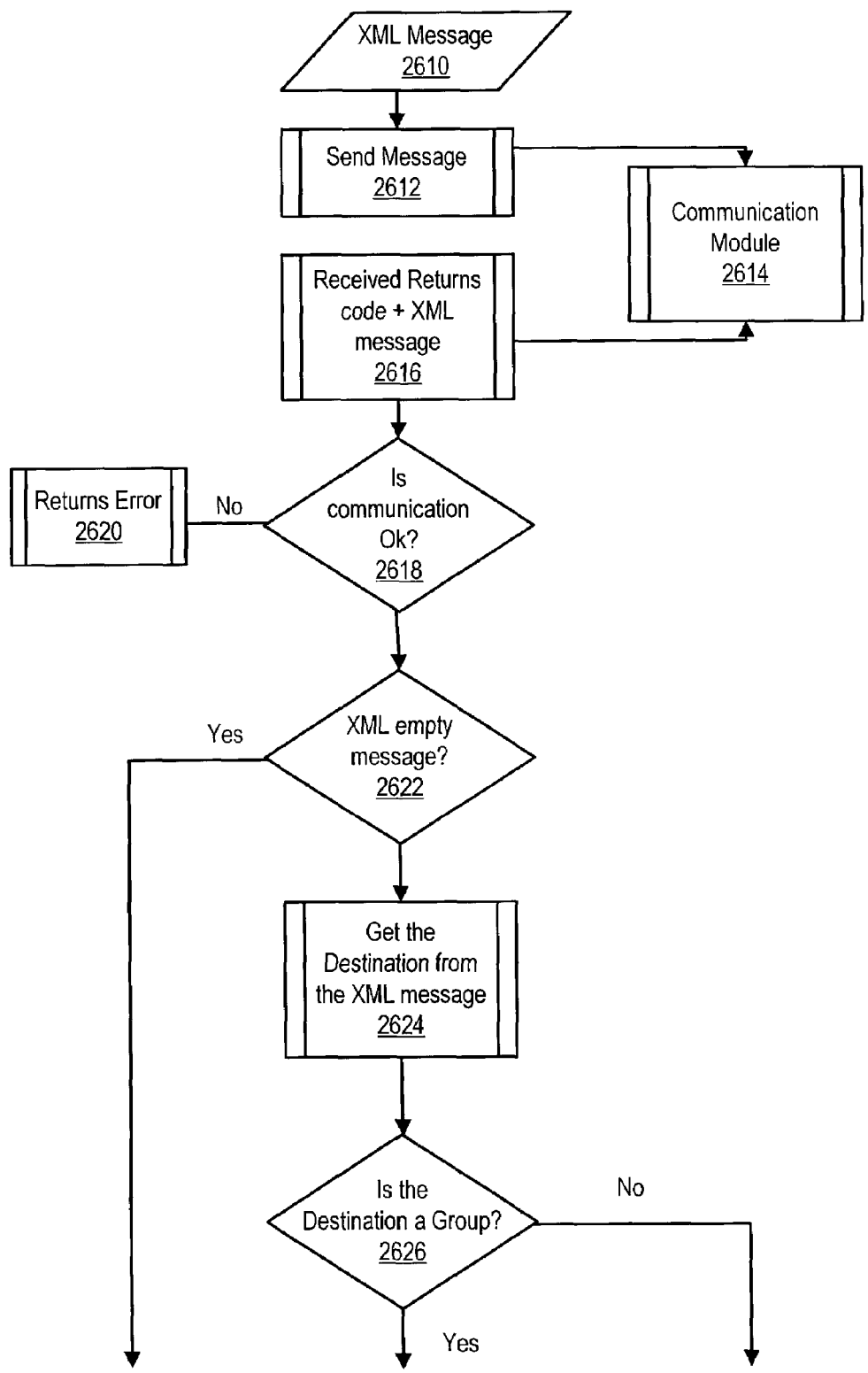
FIGS. 26A and 26B show a flow chart of controlling message address expansion for groups.
Figure 26B:
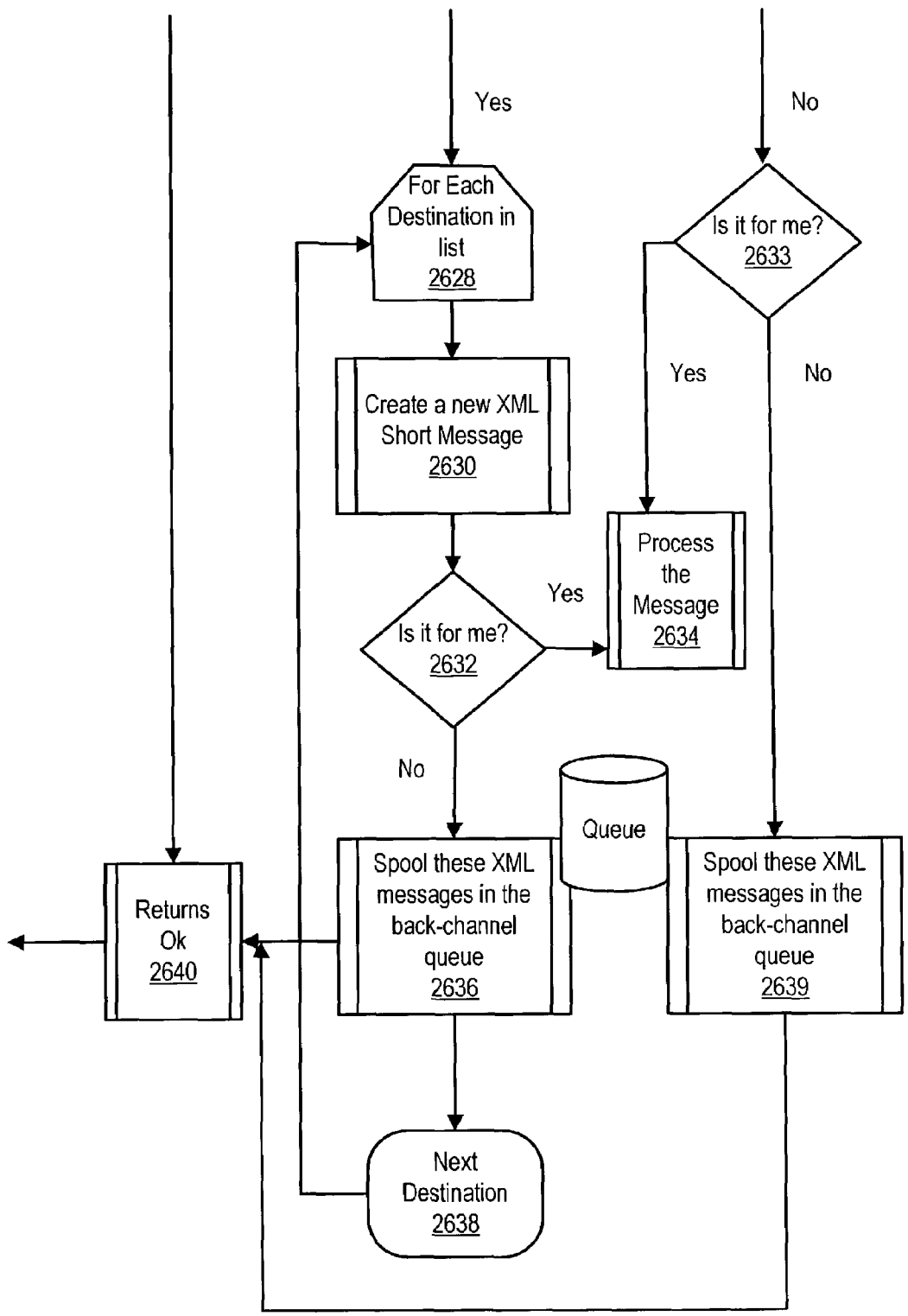

FIGS. 26A and 26B show a flow chart of controlling message address expansion for groups. More specifically, messages from the applications MLM 218 or other remote services components which are in the class of software update requests or configuration change requests (i.e., control messages) are often intended for a group of components rather than an individual component. The remote services system 100 optimizes network traffic by allowing such control messages to use a group as the destination of the control message. The intermediate MLM 216 expands this group and redistributes the control message to each of the group members.

More specifically, steps 2610-2624 are as describe above. When the destination is obtained at step 2624, then at step 2626 the MLM determines whether the destination is a group. If the destination is for a group, then a loop is entered for the group at step 2628. A new short message is created for each destination in the group at step 2630. The message is also reviewed to determine whether the message is intended for the MLM at step 2632. If the message is for intended for the MLM then the message is processed at step 2634. If the message is not intended for the MLM as determined at step 2632 then the short message is spooled to the queue at step 2636. After the message is spooled to the queue, then the group is reviewed to determine whether there are any additional destinations in the group at step 2638. If the message was not for a group, then the message is reviewed to determine whether the message is intended for the MLM at step 2633. If not, then the message is spooled in the back-channel queue at step 2639. After the loop has completed then control transfer to returns step 2640 which functions as discussed above.

While control messages are inserted into the back-channel queue in the send block, the control messages are redistributed to their destination by the return block as discussed with reference to FIG. 22. The remote services system 100 examines the content of a control message to optimize bulk data transfer when the destination of the transfer is a group.

Bulk data transfer may also occur in a number of situations including bulk data, software update and configuration change. With a bulk data situation, bulk data may be transferred from a serviced host (e.g., the host to which the systems management platform is coupled) to the applications MLM 218. With a software update situation, when new or updated software packages become available it is desirable to distribute the software update to the various remote services components. With a configuration change situation, when something has changed on the customer configuration, a new configuration file may be pushed out to all impacted remote services components. With the bulk data situation, the data is transferred from the customer network to the applications MLM 218. With the software update situation and the configuration change situation the data is transferred from the application server 226 to the remote services components on the path to the customer network.

Because bulk data transfers may be network and disk space intensive, the remote services system 100 uses a preauthorization process. With the preauthorization process each component wishing to perform a bulk data transfer first obtains an authorization before starting the actual transfer. The component uses a short message to request the bulk data transfer and provides the opportunity for any component on the transfer path to reject the authorization request. During a bulk data transfer, none of the components on the transfer path have access to the bulk data content, because this content has no meaning to the components other than to the intended recipient.

Figure 27:
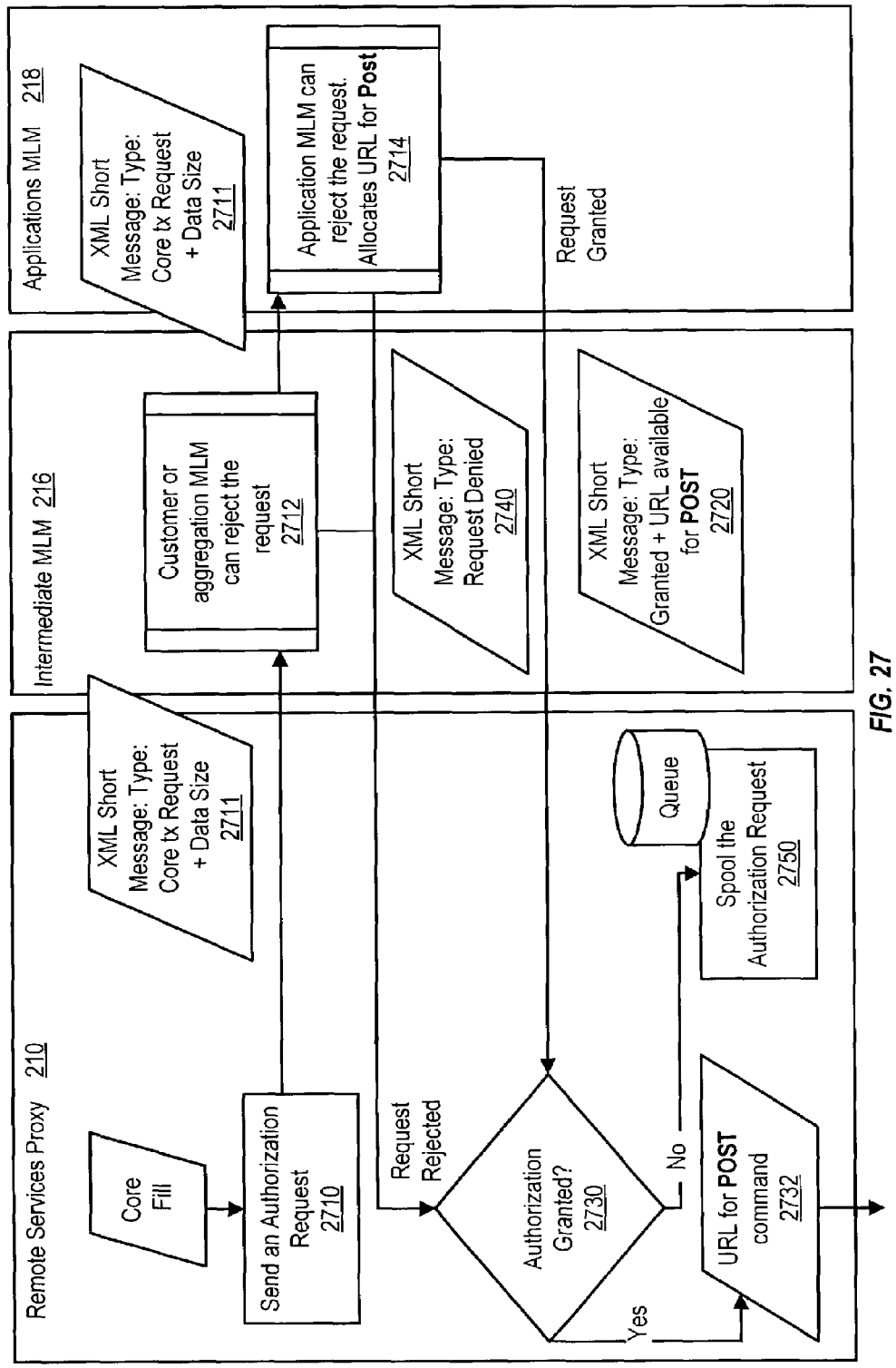
FIG. 27 shows a flow chart of the authorization process of a bulk data transfer from a customer.

More specifically, referring to FIG. 27, a bulk data transfer from the customer network is started by the proxy 210 sending an authorization request at step 2710 to the intermediate MLM 216 using an XML short message 2711. The short message includes the core request as well as the data size. The intermediate MLM 216 may reject the request at step 2712. The intermediate MLM 216 also passes the short message 2711 on to the applications MLM 218 which may reject the request at step 2714. If the request is granted then the applications MLM 218 allocates a URL for POST and sends a short message 2720 back to the proxy 210 indicating that the request was granted as well as the allocated URL available for the POST of the bulk data transfer. The proxy 210 reviews the returned message to determine whether the request was granted at step 2730. If the request was granted then the URL for the POST command is generated at step 2732.

If the authorization request is denied (e.g., via short message 2740), then the request is spooled at step 2750 by the proxy 210 for retry, a queue processing watchdog resubmits authorization request.

Figure 28:
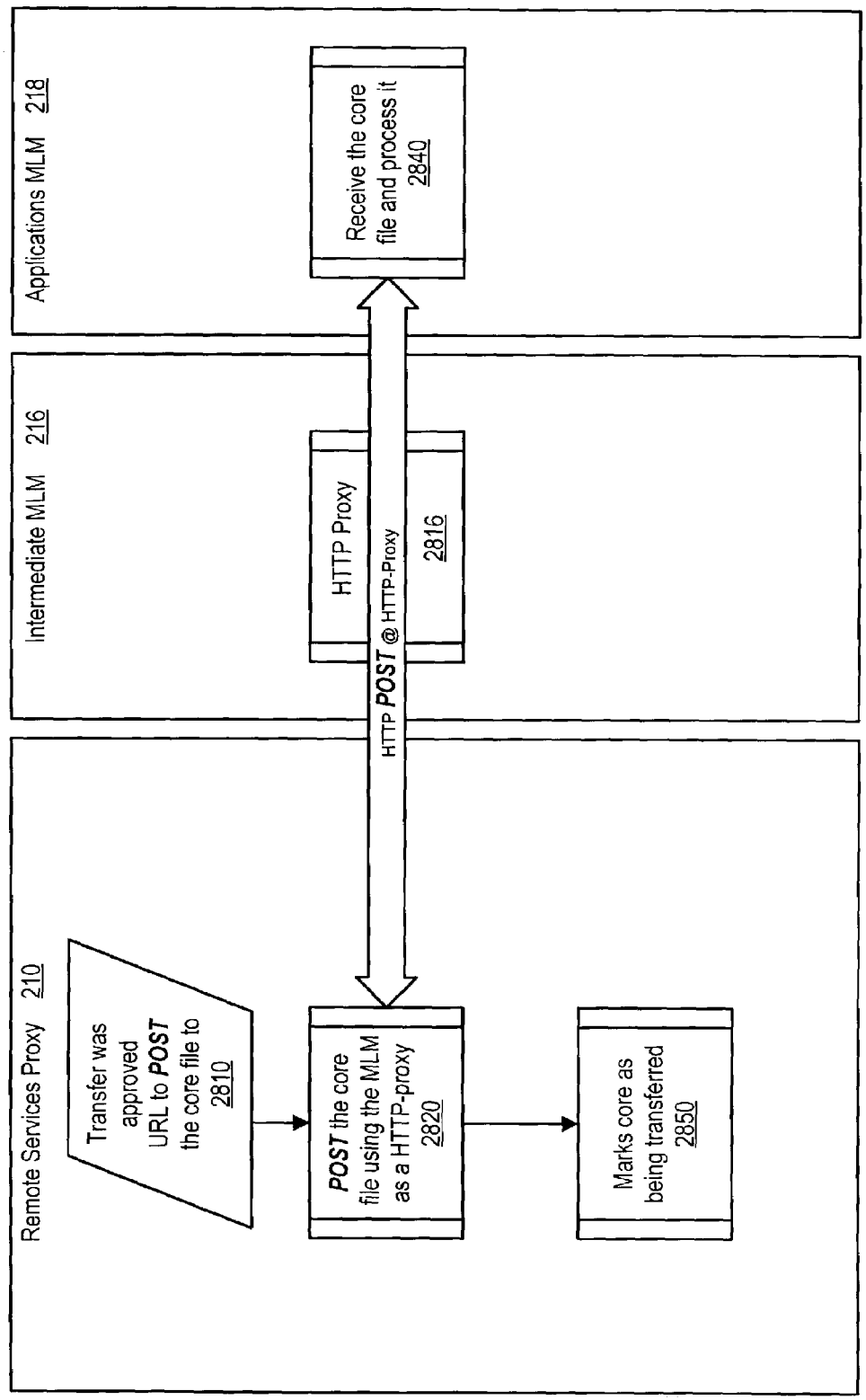
FIG. 28 shows a flow chart of the data flow of a bulk data transfer from a proxy.

Referring to FIG. 28, when the authorization has been approved at step 2810, the proxy 210 initiates the transfer. The transfer occurs between the proxy 210 and the applications MLM 218, which are coupled via the intermediate MLM 216. The bulk data transfer is a one to one transfer as compared to redistributing files to multiple destinations. The data flow of a bulk transfer is substantially the same as for short messages; however, the amount of data transferred may be extremely large. Accordingly, a protocol is used to avoid instantiating the bulk data in the intermediate MLM 216. The remote services system 100 POSTs the core file using the intermediate MLM 216 as an HTTP proxy 2816 at step 2820 to enable an efficient transmission of the bulk data. The applications MLM 218 receives the core file and processes the core file at step 2840. After the proxy 210 transfers the file, the proxy 210 marks the core as being transferred at step 2850.

Figure 29:
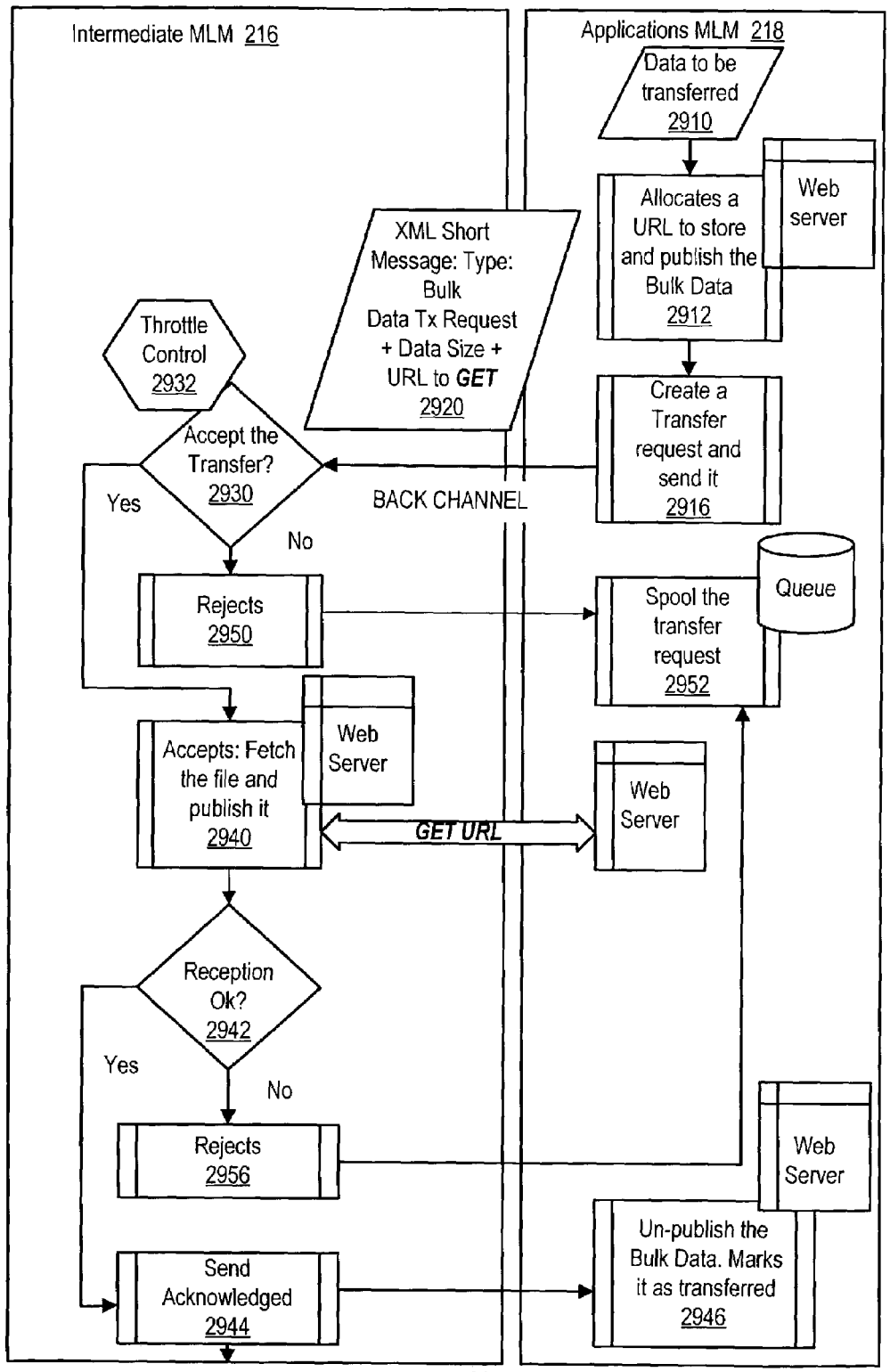
FIG. 29 shows a flow chart of the authorization process of a bulk data transfer from the remote services system.

Referring to FIG. 29, with the configuration or software download situation, the applications MLM 218 initiates the transfer request. To minimize network traffic and as most of these downloads target more than one component, the remote services system 100 proceeds by fetching the data to the nearest intermediate MLM 216 which is then responsible for redistributing the data to the final destination (i.e., the intermediate MLM 216 performs the multicast).

More specifically, the applications MLM allocates a URL to store and publish the bulk data to be transferred 2910 at step 2912 using a web server 2914. The applications MLM 218 then creates a transfer request and sends the request via the back-channel at step 2916. The short message 2920 requesting the transfer includes the data transfer request, the data size and the URL location for obtaining the data. The intermediate MLM 216 can then determine whether to accept the transfer at step 2930. The throttle control 2932 assists in determining whether to accept the transfer. If the intermediate MLM 216 accepts the transfer, then the intermediate MLM 216 fetches the file and publishes the file at step 2940. The intermediate MLM 216 then determines whether the reception was okay at step 2942. If the reception was okay, then the intermediate MLM 216 sends an acknowledgement at step 2944. The applications server then un-publishes the data and marks the data as transferred at step 2946.

If the intermediate MLM 216 rejects the transfer at step 2950, then the intermediate MLM 216 so informs the applications MLM 218, which spools the transfer request at step 2952. Additionally, if the reception of the data transfer was not okay as determined by step 2942, then the intermediate MLM 216 so informs the applications MLM 218 at rejects step 2956. The applications MLM 218 then spools the transfer request at step 2942.

Figure 30A:
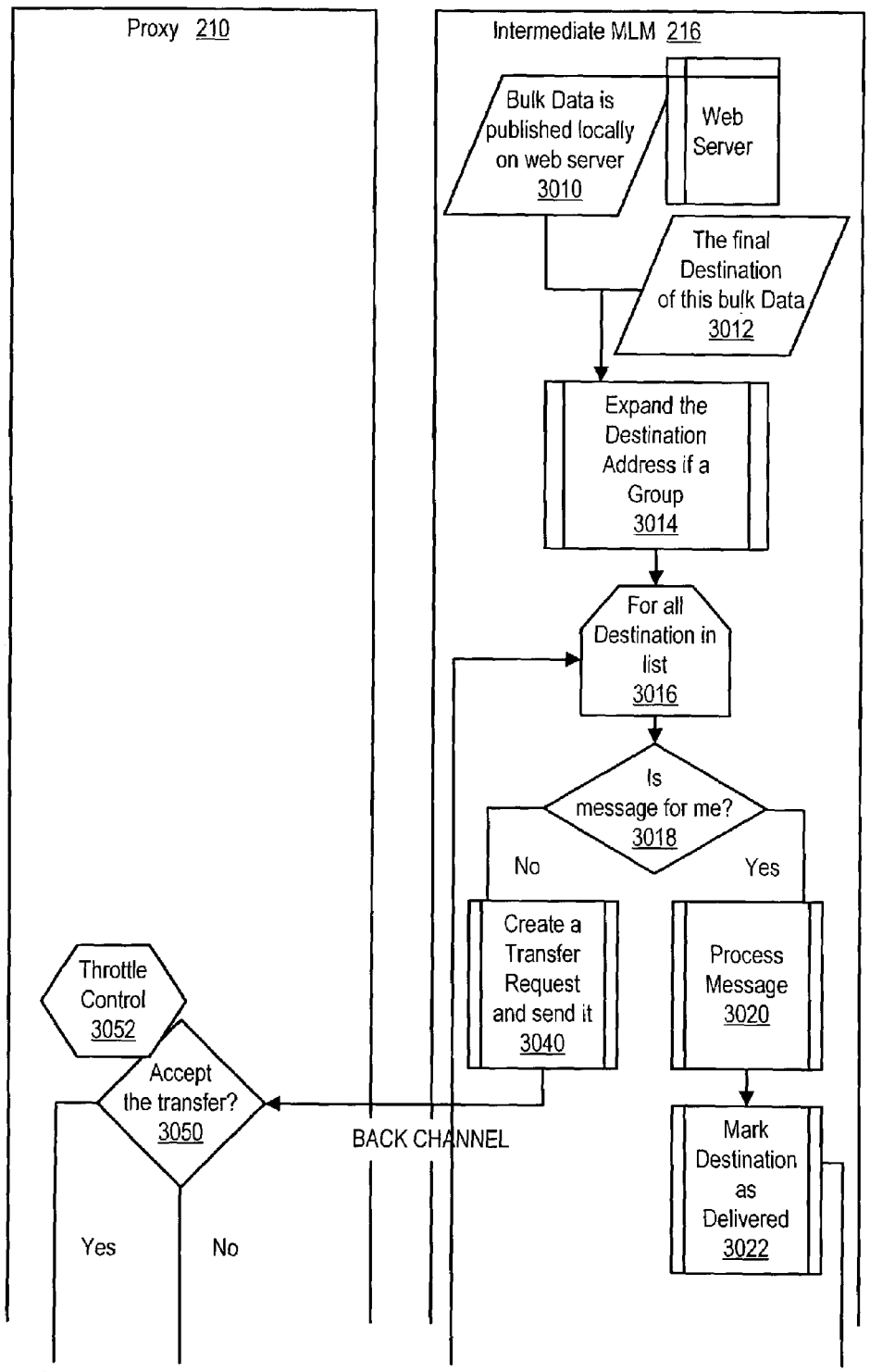
FIGS. 30A and 30B show a flow chart of the data flow of the bulk data transfer from the remote services system.
Figure 30B:
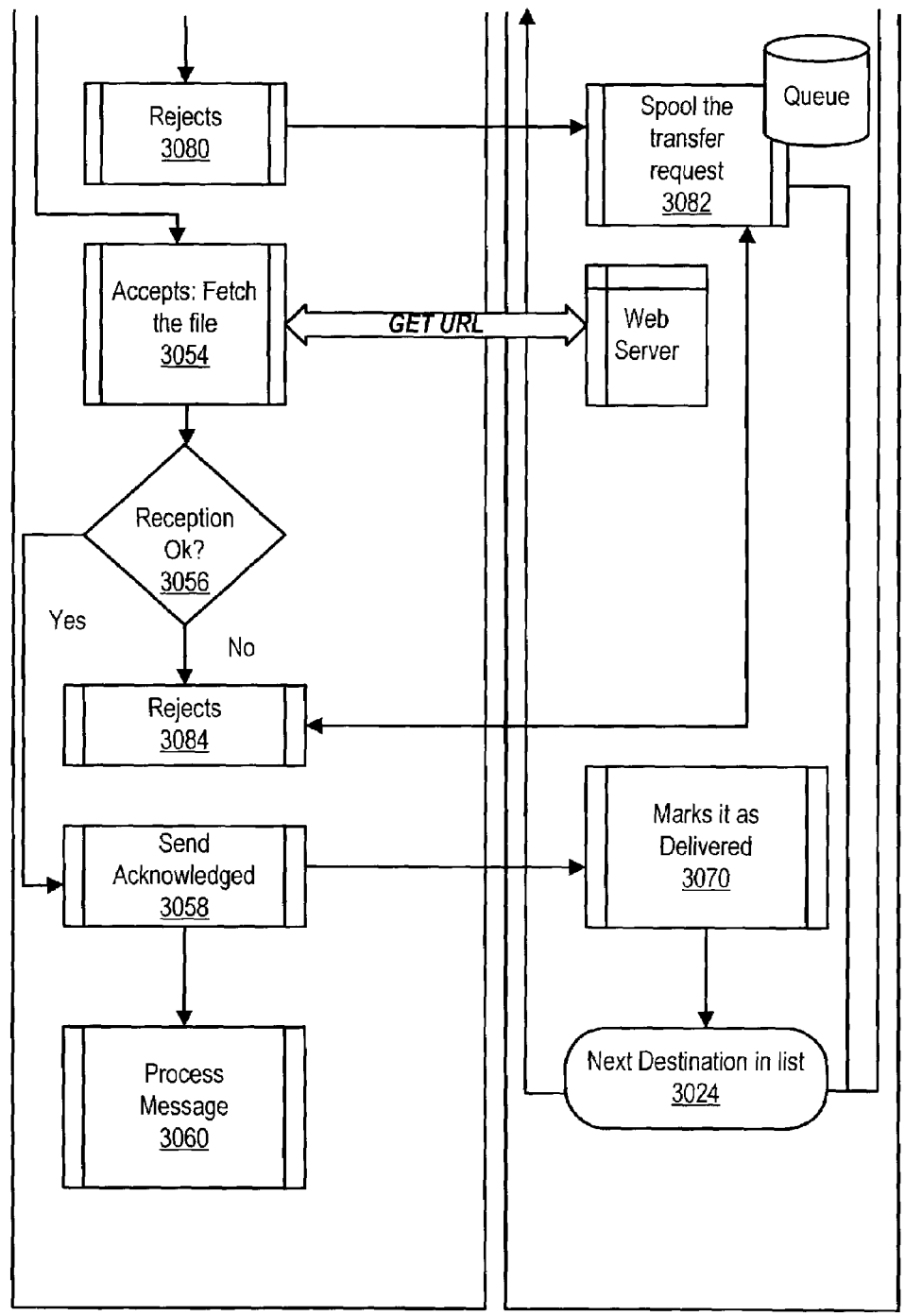

FIGS. 30A and 30B show the fetch in more detail. More specifically, the bulk data is published locally on the web server at step 3010. The final destination of the bulk data is determined at step 3012. If the destination address is a group, then the destination is expanded at step 3014. Next, the intermediate MLM 216 processes the data for all destinations that were expanded at step 3016. The intermediate MLM 216 determines whether the message is intended for the intermediate MLM 216 at step 3018. If so, then the message is processed at step 3020, the destination is marked as delivered at step 3022 and the loop proceeds to the next destination on the list at step 3024.

If the destination of the message is not the intermediate MLM 216, then the intermediate MLM 216 creates a transfer request and sends the request to the proxy 210 at step 3040. The proxy 210 then determines whether to accept the transfer at step 3050 using throttle control 3052. If the proxy 210 accepts the transfer then the proxy 210 fetches the file at step 3054 and determines whether the reception was okay at step 3056. If the reception was okay then the proxy 210 sends an acknowledgement to the intermediate MLM 216 at step 3058 and processes the message at step 3060. When the intermediate MLM 216 receives the acknowledgement then the intermediate MLM 216 marks the message as delivered at step 3070 and proceeds to the next destination on the list step 3024.

If the proxy 210 rejects the transfer at step 3080, then the proxy 210 so informs the intermediate MLM 216, which spools the transfer request at step 3082. Additionally, if the reception of the data transfer was not okay as determined by step 3056, then the proxy 210 so informs the intermediate MLM 216 at rejects step 3084. The intermediate MLM 216 then spools the transfer request at step 3082.

Regarding the throttle control, the remote services system 100 can limit network connections based on either static data or dynamically calculated parameters. Static data include, for example, time of day. Dynamically calculated parameters include, for example, total bytes sent, message sent, etc. For a customer MLM that is part of a customer MLM farm, these dynamic parameters are shared to reflect the total network usage. The throttle modules 2932, 3052 base their decision of whether to accept or reject a connection on this shared data and other local data such as disk space available.

OTHER EMBODIMENTS

Other embodiments are within the following claims.

What is claimed is:

1. A remote services system comprising:
a remote services proxy, the remote services proxy providing communications flow management;
an applications server coupled to the remote services proxy module, the application server providing persistent storage of remote services infrastructure information; and,
a communication module located within an intermediate mid level manager, the communication module including
a communication protocol module, the communication protocol module providing support for an application level protocol used in a remote services system;
a communication authentication module, the communication authentication module validating incoming connections with customers of the remote services system; and
a communication encryption module, the communication encryption module supporting plug-in encryption modules.

2. The remote services system of claim 1 wherein:
the communications authentication module validates the incoming connections via certificates.

3. The remote services system of claim 1 wherein the remote services communication module is located within the remote services proxy.

4. The remote services system of claim 1 wherein
the communication protocol module and the communication encryption module are unique to a particular remote services system.

5. The remote services system of claim 1 wherein
the communication protocol module supports email and HTTP communications protocols.

6. The remote services system of claim 1 wherein
the encryption module interfaces with remote services communications engineering personnel.

7. A remote services system comprising:
a remote services proxy, the remote services proxy providing communications flow management;
an applications server coupled to the remote services proxy module, the application server providing persistent storage of remote services infrastructure information; and,
a communication module located within an applications mid level manager
the communication module including
a communication protocol module, the communication protocol module providing support for an application level protocol used in a remote services system;
a communication authentication module, the communication authentication module validating incoming connections with customers of the remote services system; and
a communication encryption module, the communication encryption module supporting plug-in encryption modules.

8. The remote services system of claim 7 wherein the communication module further comprises a communication authentication module, the communication authentication module validating incoming connections with customers of the remote services system, and wherein the communications authentication module validates the incoming connections via certificates.

9. A remote services system comprising:
a remote services proxy, the remote services proxy module providing communications flow management;
an intermediate mid level manager, the intermediate mid level manager providing data queue management, transaction integrity and redundancy;
an applications mid level manager, the applications mid level manager providing data normalization, integration with a mail server data flow;
an application server coupled to the remote services proxy, the application server providing persistent storage of remote services infrastructure information; and,
a communication module, the communication module including
a communication protocol module, the communication protocol module providing support for an application level protocol used in a remote services system; and,
a communication encryption module, the communication encryption module supporting plug-in encryption modules.

10. The remote services system of claim 9 wherein the communication module further includes:
a communication authentication module, the communication authentication module validating incoming connections with customers of the remote services system.

11. The remote services system of claim 10 wherein
the remote services communication module is located within the remote services proxy.

12. The remote services system of claim 10 wherein
the remote services communication module is located within the intermediate applications mid level manager.

13. The remote services system of claim 9 wherein:
the communications authentication module validates the incoming connections via certificates.

14. The remote services system of claim 9 wherein
the remote services communication module is located within the remote services proxy.

15. The remote services system of claim 9 wherein
the remote services communication module is located within the intermediate mid level manager.

16. The remote services system of claim 9 wherein
the remote services communication module is located within the applications mid level manager.

17. The remote services system of claim 9 wherein
the communication protocol module and the communication encryption module are unique to a particular remote services system.

18. The remote services system of claim 9 wherein
the communication protocol module supports email and HTTP communications protocols.

19. The remote services system of claim 9 wherein
the encryption module interfaces with remote services communications engineering personnel.

20. The remote services system of claim 9 wherein
the remote services communication module is located within the applications mid level manager.

* * * * *